US012804310B2

(12) United States Patent
Kim et al.

(10) Patent No.: US 12,804,310 B2
(45) Date of Patent: Nov. 17, 2026

(54) SOUND APPARATUS FOR VEHICLE AND VEHICULAR APPARATUS INCLUDING THE SAME

(71) Applicant: LG Display Co., Ltd., Seoul (KR)

(72) Inventors: Daewon Kim, Paju-si (KR); YeongRak Choi, Paju-si (KR); Kwangho Kim, Paju-si (KR); Daeho Kim, Paju-si (KR); DoHyeong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 248 days.

(21) Appl. No.: 18/745,260

(22) Filed: Jun. 17, 2024

(65) Prior Publication Data

US 2024/0422473 A1 Dec. 19, 2024

(30) Foreign Application Priority Data

Jun. 19, 2023 (KR) ........................ 10-2023-0078529

(51) Int. Cl.
*H04R 1/28* (2006.01)
*H04R 1/02* (2006.01)

(52) U.S. Cl.
CPC ........... *H04R 1/2826* (2013.01); *H04R 1/025* (2013.01); *H04R 1/026* (2013.01); *H04R 2499/13* (2013.01)

(58) Field of Classification Search
CPC ........ H04R 1/025; H04R 17/00; H04R 7/045; H04R 7/04; H04R 2499/13; H04R 2440/05; H04R 2440/07; H04R 1/026; B60R 13/02; B60R 11/0217; B60R 2013/0287
See application file for complete search history.

(56) References Cited

U.S. PATENT DOCUMENTS

| | | | | |
|---|---|---|---|---|
| 4,161,995 A * | 7/1979 | Pohlmann | B60K 35/50 181/149 |
| 5,532,437 A * | 7/1996 | Simplicean | H04R 1/025 181/150 |
| 2003/0019989 A1* | 1/2003 | Linuma | B60R 11/0223 248/309.1 |
| 2008/0310668 A1* | 12/2008 | Koch | H04R 1/026 381/389 |
| 2020/0322716 A1* | 10/2020 | Kim | H04R 9/06 |

* cited by examiner

*Primary Examiner* — Kile O Blair
(74) *Attorney, Agent, or Firm* — Birch, Stewart, Kolasch & Birch, LLP

(57) ABSTRACT

A sound apparatus for a vehicle can include an enclosure having an internal space and a sound generating module disposed at the internal space, and a fixing part configured at the enclosure. The fixing part can be fixed to a supporting part at a vehicle structure.

29 Claims, 24 Drawing Sheets

I-I'

130: 130C, 130I, 130L 130L: 130L1, 130L2 30-1: 31C 30-2: 31I, 31L 230: 230B

130: 130C, 130E, 130N 130E: 130E2, 130E3 30-1: 31C, 31E 30-3: 31N 230B: 230B3, 230B4 230: 230B

SOUND APPARATUS FOR VEHICLE AND VEHICULAR APPARATUS INCLUDING THE SAME

CROSS-REFERENCE TO RELATED APPLICATIONS

This application claims priority to Korean Patent Application No. 10-2023-0078529 filed in the Republic of Korea on Jun. 19, 2023, the entire contents of which is hereby expressly incorporated by reference into the present application.

BACKGROUND

Technical Field

The present disclosure relates to a sound apparatus for a vehicle and a vehicular apparatus including the same.

Discussion of the Related Art

Vehicles include a sound apparatus which outputs a sound based on an audio signal output from a multimedia device, such sound apparatus can include a car audio device. For example, the sound apparatus applied to vehicles can include a front speaker and a rear speaker, which are configured as a coil type device.

SUMMARY OF THE DISCLOSURE

However, a sound apparatus in the vehicles can be limited when outputting a realistic sound or stereo sound of a multichannel through the front speaker and the rear speaker to limitations of the coil type device. Further, in the sound apparatus in vehicles, in a case where the number of speakers are increased, a stereo sound can be output, but due to a size of the speakers based on the coil type device and a limitation of a space in vehicles, there is a limitation in increasing the number of speakers so that a realistic sound or stereo sound cannot be provided using the coil type device.

The inventors of the present disclosure have recognized the problems and disadvantages of the related art and have performed extensive research and experiments for enhancing a sound characteristic and/or a sound pressure level characteristic of a sound apparatus for vehicles. Based on the extensive research and experiments, the inventors have invented a sound apparatus for a vehicle and a vehicular apparatus including the same, which can enhance a sound characteristic and/or a sound pressure level characteristic.

One or more aspects of the present disclosure are directed to providing a sound apparatus for a vehicle and a vehicular apparatus including the same, which can enhance a sound characteristic and/or a sound pressure level characteristic.

Additional features, advantages, and aspects will be set forth in the description that follows, and in part will be apparent from the description, or can be learned by practice of the inventive concepts provided herein. Other features, advantages, and aspects of the present disclosure can be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus for a vehicle can include an enclosure including an internal space and a sound generating module at the internal space, and a fixing part configured at the enclosure, the fixing part can be fixed to a supporting part at a vehicle structure.

In one or more aspects, a vehicular apparatus can comprise a vehicle structure, a supporting part at the vehicle structure, and a sound apparatus coupled to the supporting part and configured to vibrate a portion of the vehicle structure to generate a sound. The sound apparatus and the supporting part are concealed by the vehicle structure.

According to one or more embodiments of the present disclosure, a sound characteristic and/or a sound pressure level characteristic can be enhanced.

According to one or more embodiments of the present disclosure, a sound characteristic and/or a sound pressure level characteristic can be enhanced in a sound band including a sound of a low-pitched sound band.

According to one or more embodiments of the present disclosure, a sound apparatus can be implemented in an invisible or imperceptible structure which is not exposed at an interior space of a vehicle and the outside of the vehicle at all and is not seen with eyes of an occupant of the vehicle at all.

According to one or more embodiments of the present disclosure, a coupling process between a sound apparatus and a vehicle structure can be easily performed based on a screw coupling type or a hook coupling type, and a process of attaching or detaching the sound apparatus on or from the vehicle structure can be easily performed.

In a sound apparatus for vehicle and a vehicular apparatus including the same according to one or more embodiments of the present disclosure, a vibration member including at least one or more holes can be configured, and thus, a sound characteristic and/or a sound pressure level characteristic can be enhanced in a sound band including a sound of a low-pitched sound band.

According to one or more embodiments of the present disclosure, a signal supply member and a vibration generating part can be configured as one part (or one component), thereby realizing an effect of uni-materialization.

In a sound apparatus for a vehicle and a vehicular apparatus including the same according to one or more embodiments of the present disclosure, a support part and a vehicle interior material can be configured as one part (or one component), thereby realizing an effect of uni-materialization.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, and incorporated in and constitute a part of this disclosure, illustrate aspects and embodiments of the disclosure and together with the description serve to explain principles of the disclosure.

Figure 1:
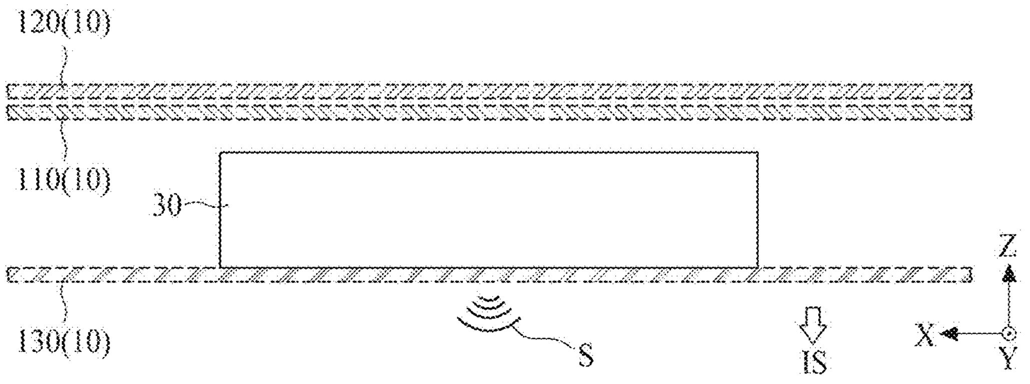
FIG. 1 illustrates a sound apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE DISCLOSURE

Reference is now made in detail to aspects of the present disclosure, examples of which can be illustrated in the accompanying drawings. In the following description, when a detailed description of well-known methods, functions, structures or configurations can unnecessarily obscure aspects of the present disclosure, a detailed description of such known functions or configurations can have been omitted for brevity. Further, repetitive descriptions can be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), dimensions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements can be added unless a term such as "only" or the like is used. The terms used in the present disclosure are merely used in order to describe example aspects, and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Aspects are example aspects. Further, in one or more implementations, "embodiments," "aspects," "examples," and the like should not be construed to be preferred or advantageous over other implementations. An aspect, an example, an example aspect, or the like can refer to one or more aspects, one or more examples, one or more example aspects, or the like, unless stated otherwise. Further, the term "can" encompasses all the meanings and coverages of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate (ly)," or "direct (ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element can denote a second element, and, similarly, a second element can denote a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, sequence, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," or the like in, on, with or to another element can be understood, for example, as that at least a portion of the element is provided, disposed, connected, coupled or the like in, on, with or to at least a portion of another element, or that the entirety of the element is provided, disposed in, connected, coupled or the like in, on, with or to another element. The phrase that an element (e.g., layer, film, region, component, section, or the like) "contacts," "overlaps," or the like with another element can be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item", can represent (i) a combination of items provided by one or more of the first item, the second item, and the third item or (ii) only one of the first item, the second item, and the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

In addition, “X-axis direction,” “Y-axis direction,” and “Z-axis direction,” should not be construed by a geometric relation only of a mutual vertical relation and can have broader directionality within the range that elements of the present disclosure can act functionally.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

FIG. 1 illustrates a sound apparatus according to an embodiment of the present disclosure. All components of each sound apparatus according to all embodiments of the present disclosure are operatively coupled and configured.

With reference to FIG. 1, a sound apparatus 30 for vehicles according to an embodiment of the present disclosure can be configured to output a sound S toward an interior space (or an indoor space) IS of a vehicle (or a vehicular apparatus) 10. For example, the sound apparatus 30 for vehicles can be configured to output a sound S to the interior space IS of the vehicle 10 and/or an external space of the vehicle 10 by using at least a portion of a vehicle structure as a vibration plate. In the following description, the sound apparatus 30 for vehicles can be a sound apparatus 30, and can be used interchangeably.

The vehicle (or the vehicular apparatus) 10 can be a vehicular apparatus which includes one or more seats and one or more windows (or windows). For example, the vehicle (or the vehicular apparatus) 10 can include a vehicle, an automobile, a train, a ship, or an aircraft, or the like, but embodiments of the present disclosure are not limited thereto, and can represent any element to which the sound apparatus of the present disclosure can be applied. The vehicle or the vehicle apparatus can be any other entity or elements in which the sound apparatus of the present application may be applied or used.

The vehicle (or the vehicular apparatus) 10 or the vehicle structure according to an embodiment of the present disclosure can include a main structure 110.

The main structure 110 can include a main frame, a sub-frame, a side frame, a door frame, an under-frame, and a seat frame, or the like, but embodiments of the present disclosure are not limited thereto. For example, the main structure 110 can be a vehicle body, a base structure, a vehicle body structure, or a frame structure, or the like, but embodiments of the present disclosure are not limited thereto.

The vehicle (or the vehicular apparatus) 10 or the vehicle structure according to an embodiment of the present disclosure can further include an exterior material 120.

The exterior material 120 of the vehicle 10 can be configured to cover an outer portion of the main structure 110. In the following description, the exterior material 120 can be a vehicle exterior material 120, and can be used interchangeably.

The vehicle exterior material 120 can include a hood panel, a front fender panel, a dash panel, a pillar panel, a trunk panel, a roof panel (or ceiling or ceiling panel), a floor panel, a door inner panel, and a door outer panel, or the like, but embodiments of the present disclosure are not limited thereto.

The exterior material 120 according to an embodiment of the present disclosure can include at least one or more of a planar portion (or a flat portion) and a curved portion (or a flexural portion or an uneven portion). For example, the exterior material 120 can have a structure corresponding to a structure of a corresponding main structure 110, or can have a structure which differs from a structure of a corresponding main structure 110.

The vehicle (or the vehicular apparatus) 10 or the vehicle structure according to an embodiment of the present disclosure can further include an interior material 130. In the following description, the interior material 130 can be a vehicle interior material 130, and can be used interchangeably.

The vehicle interior material 130 can include all elements (or components) configuring an inner portion of the vehicle 10, or can include all elements (or components) disposed at the interior space IS of the vehicle 10. For example, the vehicle interior material 130 can be an interior member or an interior finish material of the vehicle 10, but embodiments of the present disclosure are not limited thereto.

The vehicle interior material 130 according to an embodiment of the present disclosure can be configured to cover one or more of main structure 110 and the exterior material 120 in the interior space (or an inner portion) IS of the vehicle 10. For example, the vehicle interior material 130 can cover one or more of main structure 110 and the exterior material 120 in the interior space IS of the vehicle 10 and can be configured to be exposed at the interior space IS of the vehicle 10.

The vehicle interior material 130 according to an embodiment of the present disclosure can be configured to be exposed at the inner portion and/or the interior space IS of the vehicle 10 in the inner portion and/or the interior space IS of the vehicle 10. For example, the vehicle interior material 130 can be configured to cover one or more surfaces (or an interior surfaces) of at least one or more of a main frame (or a vehicle body), a side frame (or a side body), a door frame (or a door body), a handle frame (or a steering hub), and a seat frame, which are exposed at the interior space IS of the vehicle 10.

The vehicle interior material 130 according to an embodiment of the present disclosure can include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an illumination interior material), a rear view mirror, a glove box, and a sun visor, or the like, but embodiments of the present disclosure are not limited thereto.

The vehicle interior material 130 according to an embodiment of the present disclosure can include one or more materials of metal, wood, rubber, plastic, glass, fiber, cloth, paper, mirror, leather, and carbon, but embodiments of the present disclosure are not limited thereto.

The vehicle interior material 130 including a plastic material can be an injection material which is implemented by an injection process using a thermoplastic resin or a thermosetting resin, but embodiments of the present disclosure are not limited thereto. The vehicle interior material 130 including a fiber material can include at least one or more of a plastic composite fiber, a carbon fiber (or an aramid fiber), and a natural fiber, but embodiments of the present disclosure are not limited thereto.

The vehicle interior material 130 including the fiber material can include a textile sheet, a knit sheet, a nonwoven fabric, or the like, but embodiments of the present disclosure are not limited thereto. For example, the paper can be cone paper for speakers. For example, the cone paper can be pulp or foamed plastic, or the like, but embodiments of the present disclosure are not limited thereto.

The vehicle interior material 130 including a leather material can include natural leather or artificial leather, but embodiments of the present disclosure are not limited thereto.

The vehicle interior material 130 according to an embodiment of the present disclosure can include at least one or more of a planar portion (or a flat portion) and a curved portion. For example, the vehicle interior material 130 can have a structure corresponding to a structure (or an inner surface structure) of a corresponding main structure 110, or can have a structure which differs from a structure of a corresponding main structure 110.

The sound apparatus 30 for vehicles can be disposed at one or more of a region between the main structure 110 and the vehicle interior material 130, a region between the vehicle exterior material 120 and the vehicle interior material 130, a region between the main structure 110 and the vehicle exterior material 120, the vehicle exterior material 120, and the vehicle interior material 130, and can be configured to vibrate or to directly vibrate one or more of the vehicle exterior material 120 and the vehicle interior material 130 to output a sound S. For example, one or more of the vehicle exterior material 120 and the vehicle interior material 130 can vibrate based on driving (or vibration or displacement) of the sound apparatus 30 to output the sound S.

According to an embodiment of the present disclosure, the sound apparatus 30 for vehicles can be disposed at a region between the main structure 110 and the vehicle exterior material 120 or a region between the vehicle exterior material 120 and the vehicle interior material 130, or can be connected (or coupled) to the vehicle exterior material 120, and can vibrate the vehicle exterior material 120 to generate or output sound S based on a vibration of the vehicle exterior material 120, but embodiments of the present disclosure are not limited thereto. For example, the sound apparatus 30 for vehicles can be configured to vibrate the vehicle exterior material 120 to output a virtual engine sound toward the external space of the vehicle 10. The sound apparatus 30 for vehicles can use the vehicle exterior material 120 as a sound vibration plate, a sound diaphragm, or an acoustic diaphragm. For example, the vehicle exterior material 120 can be a vibration plate, a sound vibration plate, or a sound generating plate for outputting the sound S. For example, the vehicle exterior material 120 can have a size which is greater than the sound apparatus 30, but embodiments of the present disclosure are not limited thereto.

According to an embodiment of the present disclosure, the sound apparatus 30 for vehicles can be disposed at a region between the main structure 110 and the vehicle interior material 130 and can vibrate or directly vibrate the vehicle interior material 130 to generate or output sound S based on a vibration of the vehicle interior material 130. For example, the sound apparatus 30 for vehicles can be configured to vibrate the vehicle interior material 130 to output the sound S toward the inner portion and/or the interior space IS of the vehicle 10. Thus, the sound apparatus 30 for vehicles can use the vehicle interior material 130 as a sound vibration plate, a sound diaphragm, or an acoustic diaphragm. The vehicle interior material 130 can be a vibration plate, a sound vibration plate, or a sound generating plate for outputting the sound S. For example, the vehicle interior material 130 can have a size which is greater than the sound apparatus 30, but embodiments of the present disclosure are not limited thereto.

According to an embodiment of the present disclosure, the sound apparatus 30 for vehicles can be connected (or coupled) to the vehicle interior material 130, and can vibrate or directly vibrate the vehicle exterior material 130 to generate or output sound S based on a vibration of the vehicle interior material 130. For example, the sound apparatus 30 for vehicles can be configured to vibrate the vehicle interior material 130 to output the sound S toward the inner portion and/or the interior space IS of the vehicle 10.

According to an embodiment of the present disclosure, the sound apparatus 30 for vehicles can be disposed at or connected (or coupled) to at least one or more of a dashboard, a pillar interior material, a floor interior material, a roof interior material, a door interior material, a handle interior material, and a seat interior material, or can be disposed at or connected (or coupled) to at least one or more of a rear package interior material, an overhead console, a rear view mirror, a glove box, and a sun visor.

The vehicle 10 or the sound apparatus 30 for vehicles according to an embodiment of the present disclosure can include at least one or more sound apparatuses. The sound apparatus 30 for vehicles can vibrate a corresponding vehicle interior material 130 by at least one or more of at least one or more sound apparatuses 30 disposed at the vehicle interior material 130 to output a realistic sound S and/or stereo sound including a multichannel toward the interior space IS of the vehicle 10.

Figure 2:
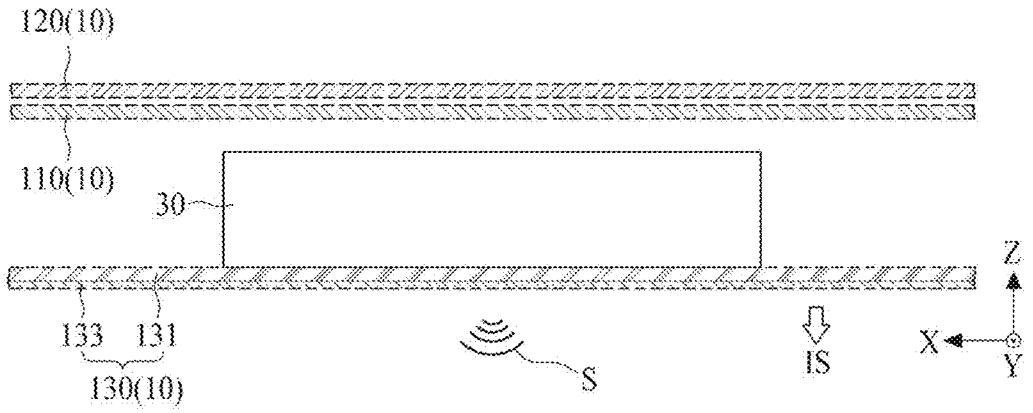
FIG. 2 illustrates a sound apparatus according to another embodiment of the present disclosure.

FIG. 2 illustrates a sound apparatus according to another embodiment of the present disclosure. FIG. 2 illustrates an embodiment implemented by modifying the vehicle interior material on which the sound apparatus described above with reference to FIG. 1 is disposed. Therefore, in the following description, repeated descriptions of elements other than a vehicle interior material can be omitted or will be briefly given below.

With reference to FIG. 2, the sound apparatus 30 according to another embodiment of the present disclosure can vibrate a vehicle interior material 130 including one or more materials of metal, wood, rubber, plastic, carbon, glass, fiber, cloth, paper, a mirror, and leather to output a sound S. But embodiments of the present disclosure are not limited thereto.

The vehicle interior material 130 according to another embodiment of the present disclosure can include a base member 131 and an outer member (or a surface member)

133. For example, the base member 131 can be an injection material, a first interior material, an inner interior material, or a rear interior material, but embodiments of the present disclosure are not limited thereto. The outer member 133 can be a second interior material, an outer interior material, a front interior material, an outer surface member, a reinforcement member, or a decoration member, but embodiments of the present disclosure are not limited thereto.

The base member 131 can include a plastic material. The base member 131 according to an embodiment of the present disclosure can include an injection material. For example, the base member 131 can be an injection material which is implemented by an injection process using a thermoplastic resin or a thermosetting resin, but embodiments of the present disclosure are not limited thereto. The vehicle interior material 130 or the base member 131 can be configured to cover an inner portion of a vehicle 10. For example, the vehicle interior material 130 or the base member 131 can be configured to cover one or more of the main structure 110 and the exterior material 120 in an interior space IS of the vehicle 10. For example, the vehicle interior material 130 or the base member 131 can be configured to cover one surface (or an inner surface) of at least one or more of a main frame, a side frame, a door frame, and a handle frame, which are exposed at the interior space IS of the vehicle 10.

The base member 131 can include at least one or more of a planar portion (or a flat portion) and a curved portion. For example, the base member 131 can have a structure corresponding to a structure (or a rear structure) of a corresponding main structure 110, or can have a structure which differs from a structure of a corresponding main structure 110.

The outer member 133 can be disposed on the base member 131. For example, the outer member 133 can be disposed to cover the base member 131. The outer member 133 can cover the base member 131 at the inner portion or the interior space IS of the vehicle 10 and can be configured to be exposed at the inner portion or the interior space IS of the vehicle 10. For example, the outer member 133 can be disposed at or coupled to a front surface (or an interior surface) of the base member 131 exposed at the interior space IS of the vehicle 10.

The vehicle interior material 130 or the outer member 133 according to an embodiment of the present disclosure can include any one or more materials of plastic, glass, fiber, leather, cloth, rubber, a mirror, wood, paper, carbon, and metal, but embodiments of the present disclosure are not limited thereto. For example, the outer member 133 can be a fiber material. For example, the outer member 133 including the fiber material can include at least one or more of a synthetic fiber, a carbon fiber (or an aramid fiber), and a natural fiber, but embodiments of the present disclosure are not limited thereto. For example, the outer member 133 including the fiber material can be a textile sheet, a knit sheet, or a nonwoven fabric, but embodiments of the present disclosure are not limited thereto. For example, the outer member 133 including the fiber material can be a fabric member, but embodiments of the present disclosure are not limited thereto.

The synthetic fiber can be a thermoplastic resin and can include a polyolefin-based fiber which is an eco-friendly material which does not relatively release a harmful substance. For example, the polyolefin-based fiber can include a polyethylene fiber, a polypropylene fiber, or a polyethylene terephthalate fiber, but embodiments of the present disclosure are not limited thereto. The polyolefin-based fiber can be a fiber of a single resin or a fiber of a core-shell structure, but embodiments of the present disclosure are not limited thereto. The natural fiber can be a composite fiber of any one or more or two or more of a jute fiber, a kenaf fiber, an abaca fiber, a coconut fiber, and a wood fiber, but embodiments of the present disclosure are not limited thereto.

The sound apparatus 30 can be covered by the vehicle interior material 130. The sound apparatus 30 can be configured to vibrate the vehicle interior material 130 including the base member 131 and the outer member 133 to output a sound S toward the inner portion and/or the interior space IS of the vehicle 10.

The sound apparatus 30 according to another embodiment of the present disclosure can output the sound S toward the interior space IS of the vehicle 10 using the vehicle interior material 130 as a vibration plate or a sound vibration plate and can output a realistic sound S or stereo sound including a multichannel toward the interior space IS of the vehicle 10.

According to another embodiment of the present disclosure, the sound apparatus 30 can be configured to be surrounded by an enclosure. A space can be provided between the sound apparatus 30 and the enclosure, and a sound (or a sound pressure level) can be output based on a vibration of the vehicle interior material 130 based on air between the sound apparatus 30 and the enclosure. However, there can be a problem where a sound of the low-pitched sound band based on a vibration of the vehicle interior material 130 is not output, and there can be a problem where the flatness of a sound pressure level is reduced because the number of peaks and dips occurring in a reproduction frequency band of a sound (or a sound pressure level) generated based on a vibration of the vehicle interior material 130 increases and each of a highest sound pressure level and a lowest sound pressure level occurring in a reproduction frequency band of a sound (or a sound pressure level) generated based on a vibration of the vehicle interior material 130 increases. The peak can be a phenomenon where a sound pressure level bounces in a specific frequency, and the dip can be a phenomenon where a low sound pressure level is generated as the occurrence of a sound having a specific frequency is reduced. The flatness of a sound characteristic can be a level of a deviation between a highest sound pressure and a lowest sound pressure.

The inventors of the present disclosure have performed extensive research and experiments for implementing a sound apparatus for vehicles and a vehicular apparatus including the same, in which a sound characteristic of the low-pitched sound band can be improved and a flatness characteristic of a sound pressure level can be enhanced. Based on the extensive research and experiments, the inventors of the present disclosure have invented a sound apparatus for vehicles and a vehicular apparatus including the same, which can output a sound including a high-pitched sound band to the low-pitched sound band and can enhance the flatness characteristic of a sound pressure level. This will be described below in detail.

Figure 3:
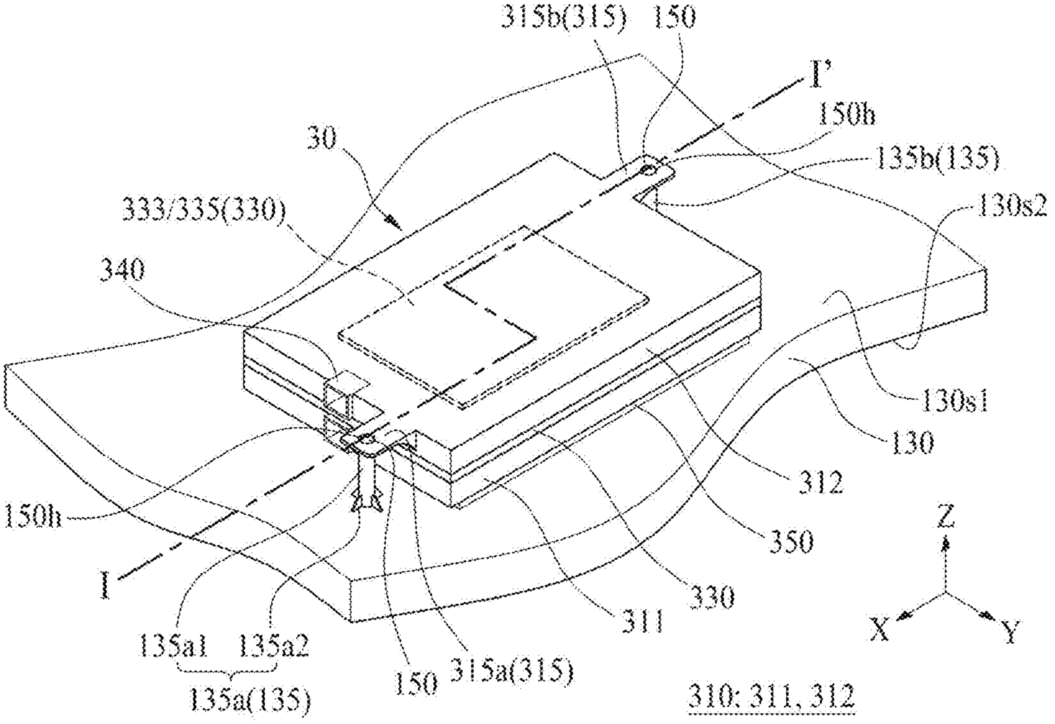
FIG. 3 illustrates a sound apparatus for a vehicle and a vehicular apparatus including the same according to an embodiment of the present disclosure.
Figure 4:
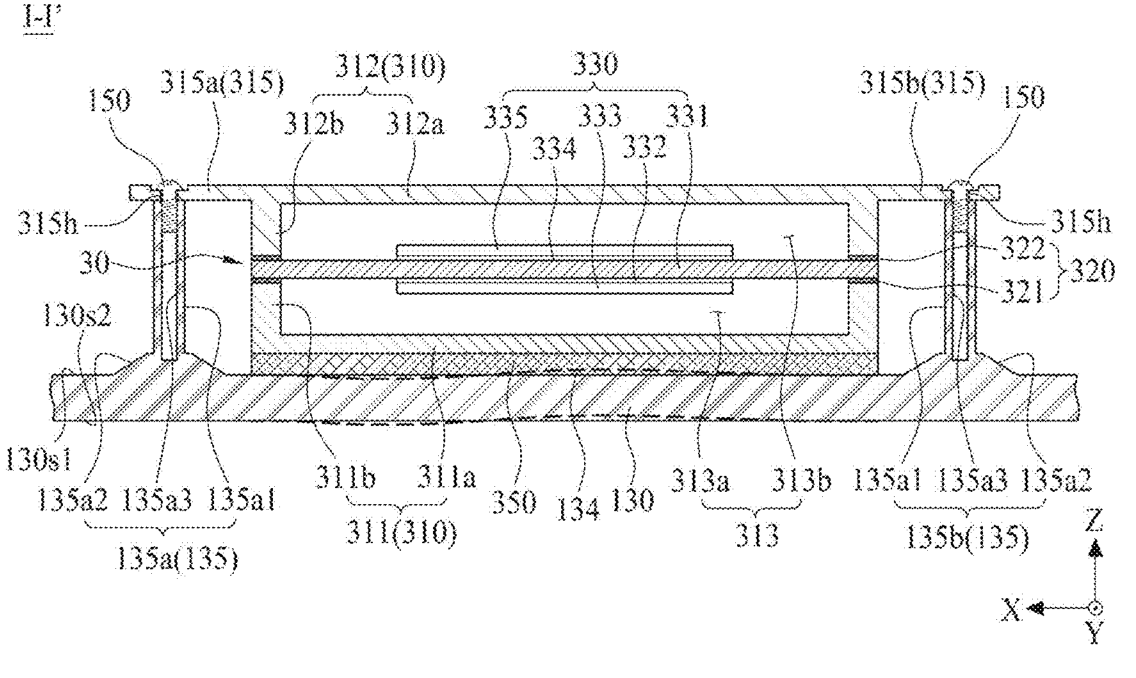
FIG. 4 is a cross-sectional view taken along line I-I' illustrated in FIG. 3 according to an embodiment of the present disclosure.

FIG. 3 illustrates a sound apparatus for a vehicle and vehicular apparatus including the same according to an embodiment of the present disclosure. FIG. 4 is a cross-sectional view taken along line I-I' illustrated in FIG. 3 according to an embodiment of the present disclosure. FIGS. 3 and 4 illustrate a sound apparatus connected to an interior material of the vehicular apparatus according to an embodiment of the present disclosure.

With reference to FIGS. 3 and 4, in the sound apparatus for a vehicle and vehicular apparatus including the same, a sound apparatus 30 can be configured to be connected (or coupled) to a vehicle structure. For example, the sound apparatus 30 can be configured to vibrate a portion of any one of the main structure 110, the exterior material 120, and the interior material 130 illustrated in FIG. 1 or 2 to generate a sound.

The vehicular apparatus according to an embodiment of the present disclosure can include the sound apparatus 30 which is supported by (or fixed to) the vehicle structure, is connected (or coupled) to the vehicle structure, and is configured to vibrate a portion of the vehicle structure to generate (or output) a sound. The vehicular apparatus according to an embodiment of the present disclosure can include the sound apparatus 30 which is connected (or coupled) to the vehicle structure and is covered or occluded by the vehicle structure. For example, the vehicular apparatus can include the sound apparatus 30 which is connected (or coupled) to the vehicle structure and is fully (or completely) covered or occluded by the vehicle structure.

According to an embodiment of the present disclosure, the vehicle structure can be configured to include a function of a sound generating member (or a vibration plate) which generates a sound or a vibration, based on driving (or vibration or displacement) of the sound apparatus 30 and a function of a concealment member which occludes or conceals the sound apparatus 30. Accordingly, the sound apparatus 30 can be implemented in an invisible or imperceptible structure which is not exposed at the inner portion (or interior space IS) of a vehicle 10 and the outside of the vehicle 10 at all and is not seen with eyes of an occupant of the vehicle 10 at all.

Hereinafter, in describing embodiments of the present disclosure, for convenience of description, an example where a vehicle structure is an interior material 130 of a vehicle will be described, but embodiments of the present disclosure are not limited thereto. For example, in the following descriptions of embodiments of the present disclosure, a vehicle interior material can be replaced with the main structure 110 or the exterior material 120 of the vehicle 10 illustrated in FIG. 1 or 2.

The sound apparatus 30 for a vehicle according to an embodiment of the present disclosure can be configured to be connected (or coupled) to the vehicle interior material 130. For example, the vehicular apparatus according to an embodiment of the present disclosure can include the sound apparatus 30 which is supported by (or fixed to) the vehicle interior material 130, is connected (or coupled) to the vehicle interior material 130, and is configured to vibrate at least a portion of the vehicle interior material 130 to generate (or output) a sound. For example, the vehicular apparatus according to an embodiment of the present disclosure can include the sound apparatus 30 which is connected (or coupled) to the vehicle interior material 130 and is covered or occluded by the vehicle interior material 130. For example, the vehicle interior material 130 can be configured to include a function of a sound generating member (or a vibration plate) which generates a sound or a vibration, based on driving (or vibration or displacement) of the sound apparatus 30 and a function of a concealment member (or an invisible member) which occludes or conceals or hides the sound apparatus 30. Accordingly, the sound apparatus 30 can be implemented in an invisible or imperceptible structure which is not exposed at the inner portion and/or the interior space IS of a vehicle 10 and the outside of the vehicle 10 at all and is not seen with eyes of an occupant of the vehicle 10 at all.

The vehicular apparatus according to an embodiment of the present disclosure can include a supporting part 135 configured at the interior material 130 and a sound apparatus 30 which is coupled to the supporting part 135 of the interior material 130 and is configured to vibrate the interior material 130.

The interior material 130 of the vehicle 10 (or the vehicular apparatus) can include a first surface **130*s*1 and a second surface 130*s*2 opposite to the first surface 130*s*1. In the vehicle interior material 130, as illustrated in FIG. 1 or 2, the first surface 130*s*1 can be disposed toward the vehicle exterior material 120 or the main structure 110 of the vehicle 10, and the second surface 130*s*2 can be disposed toward the inner portion and/or the interior space IS of the vehicle 10. For example, in the vehicle interior material 130, the first surface 130*s*1 can be an outdoor surface (or an outside surface or a rear surface) facing the main structure 110 or the vehicle exterior material 120, and the second surface 130*s*2 can be an indoor surface (or a front surface or an interior surface or an exposure surface) exposed at the inner portion and/or the interior space IS of the vehicle 10**.

The supporting part 135 can be configured at the vehicle interior material 130 to support (or fix) the sound apparatus 30. For example, the supporting part 135 can be configured at the first surface **130*s*1 of the vehicle interior material 130. For example, the supporting part 135 can be configured to have a certain length (or height) in a third direction Z parallel to a thickness direction of the vehicle interior material 130 from the first surface 130*s*1 of the vehicle interior material 130. For example, the supporting part 135 can protrude from the first surface 130*s*1 of the vehicle interior material 130 or can be coupled (or attached) to the first surface 130*s*1 of the vehicle interior material 130. For example, the supporting part 135 can protrude from the first surface 130*s*1 of the vehicle interior material 130 or can be coupled (or attached) to the first surface 130*s*1 of the vehicle interior material 130, based on a material of the vehicle interior material 130**.

According to an embodiment of the present disclosure, the supporting part 135 and the vehicle interior material 130 can be configured as one body or an integration type. For example, the supporting part 135 can protrude from the first surface **130*s*1 of the vehicle interior material 130. For example, the supporting part 135 and the vehicle interior material 130 can be configured as one element or one component, thereby realizing an effect of uni-materialization. For example, when the vehicle interior material 130 includes one or more materials of metal, wood, plastic, carbon, and glass, the supporting part 135 can protrude from the first surface 130*s*1 of the vehicle interior material 130**.

According to another embodiment of the present disclosure, the supporting part 135 and the vehicle interior material 130 can be configured by double injection molding using different materials, but embodiments of the present disclosure are not limited thereto. Accordingly, the supporting part 135 and the vehicle interior material 130 can be configured as one element, thereby realizing an effect of uni-materialization.

According to another embodiment of the present disclosure, the supporting part 135 can be coupled (or attached) to the first surface **130*s*1 of the vehicle interior material 130. For example, when the vehicle interior material 130 includes one or more materials of metal, wood, rubber, plastic, carbon, glass, fiber, cloth, paper, mirror, and leather, the supporting part 135 can be coupled (or attached) to the first surface 130*s*1 of the vehicle interior material 130 by an attachment member. The attachment member can be directly coupled (or attached) to a rear surface (or a back surface) of the supporting part 135 and directly coupled (or attached) to the first surface 130*s*1 of the vehicle interior material 130**.

For example, the attachment member can include a double-sided tape, an adhesive, a double-sided adhesive, a double-sided foam tape, a double-sided cushion tape, or a bond, but embodiments of the present disclosure are not limited thereto.

The supporting part 135 according to an embodiment of the present disclosure can include two or more or a plurality of supporting members 135*a* and 135*b*. For example, the supporting part 135 can include first and second supporting members 135*a* and 135*b* or a pair of supporting members 135*a* and 135*b*.

The first supporting member 135*a* and the second supporting member 135*b* can be configured at the first surface 130*s*1 of the vehicle interior material 130 with the sound apparatus 30 therebetween. For example, the first supporting member 135*a* can be configured at the first surface 130*s*1 of the vehicle interior material 130 adjacent to a first side of the sound apparatus 30. The second supporting member 135*b* can be configured at the first surface 130*s*1 of the vehicle interior material 130 adjacent to a second side, which is parallel or opposite to the first side, of the sound apparatus 30. For example, in the sound apparatus 30, the first side can be a first side surface, a first sidewall, a first short side, or a first long side, and the second side can be a second side surface, a second sidewall, a second short side, or a second long side, but embodiments of the present disclosure are not limited thereto.

According to an embodiment of the present disclosure, the first supporting member 135*a* and the second supporting member 135*b* can be configured at the first surface 130*s*1 of the vehicle interior material 130 to be staggered with the sound apparatus 30 therebetween. For example, the first supporting member 135*a* and the second supporting member 135*b* can be configured at the first surface 130*s*1 of the vehicle interior material 130 along a diagonal direction with the sound apparatus 30 therebetween. For example, the diagonal direction can be a direction between a first direction X parallel to a long side of the sound apparatus 30 and a second direction Y parallel to a short side of the sound apparatus 30. For example, a first virtual line passing through the first supporting member 135*a* along the first direction X can be spaced apart from a second virtual line, passing through the second supporting member 135*b* along the first direction X, in the second direction Y.

According to an embodiment of the present disclosure, the first supporting member 135*a* can be configured at the first surface 130*s*1 of the vehicle interior material 130 so as to be adjacent to a periphery of a first corner of the sound apparatus 30. For example, the first corner of the sound apparatus 30 can be a connection portion between a first short side and a first long side of the sound apparatus 30. The first supporting member 135*a* can be configured at the first surface 130*s*1 of the vehicle interior material 130 so as to be adjacent to a region between the first corner and a center portion of the first short side of the sound apparatus 30. The second supporting member 135*b* can be configured at the first surface 130*s*1 of the vehicle interior material 130 so as to be adjacent to a periphery of a second corner of the sound apparatus 30. For example, the second corner of the sound apparatus 30 can be a connection portion between a second short side and a second long side of the sound apparatus 30. The second supporting member 135*b* can be configured at the first surface 130*s*1 of the vehicle interior material 130 so as to be adjacent to a region between the second corner and a center portion of the second short side of the sound apparatus 30.

The supporting part 135 according to an embodiment of the present disclosure can include the first supporting member 135*a* and the second supporting member 135*b*, which are arranged to be staggered or in a diagonal direction, and thus, can stably support or fix the sound apparatus 30.

Each of the first supporting member 135*a* and the second supporting member 135*b* of the supporting part 135 according to an embodiment of the present disclosure can include a pillar portion 135*a*1 and a prop portion (or a rib) 135*a*2.

The pillar portion 135*a*1 can be configured to have a certain length along a third direction Z. For example, the pillar portion 135*a*1 can be a pillar having a circular shape, an oval shape, or a polygonal shape, but embodiments of the present disclosure are not limited thereto. The pillar portion 135*a*1 can include a screw hole 135*a*3 having a screw thread. For example, the screw hole 135*a*3 can be formed to pass through a center portion of the pillar portion 135*a*1 along the third direction Z, but embodiments of the present disclosure are not limited thereto.

The prop portion 135*a*2 can be configured as four. The four prop portions 135*a*2 can be configured to stably maintain a vertical state of the pillar portion 135*a*1. The four prop portions 135*a*2 can be configured between the first surface 130*s*1 of the vehicle interior material 130 and the pillar portion 135*a*1. The four prop portions 135*a*2 can protrude from a lateral surface of the pillar portion 135*a*1. The four prop portions 135*a*2 can protrude from the lateral surface of the pillar portion 135*a*1 to have a 90-degree interval. Accordingly, the pillar portion 135*a*1 can be fixed or maintained in a vertical state by the four prop portions 135*a*2.

In FIG. 3, each of the first supporting member 135*a* and the second supporting member 135*b* is illustrated as including the four prop portions 135*a*2, but embodiments of the present disclosure are not limited thereto and each of the first supporting member 135*a* and the second supporting member 135*b* can include one prop portion 135*a*2. For example, the one prop portion 135*a*2 can be configured between the first surface 130*s*1 of the vehicle interior material 130 and a lower lateral surface of the pillar portion 135*a*1 to surround the lower lateral surface of the pillar portion 135*a*1. The one prop portion 135*a*2 can be configured between the first surface 130*s*1 of the vehicle interior material 130 and the lower lateral surface of the pillar portion 135*a*1 to have a shape which is equal to or different from that of the pillar portion 135*al*. For example, the one prop portion 135*a*2 can have a circular shape, an oval shape, or a polygonal shape, but embodiments of the present disclosure are not limited thereto.

The sound apparatus 30 can be coupled to the supporting part 135 of the vehicle interior material 130 and configured to vibrate the vehicle interior material 130. For example, the sound apparatus 30 can be a sound generating apparatus, a sound output apparatus, a speaker apparatus, an audio apparatus, or a car audio device, but embodiments of the present disclosure are not limited thereto.

The sound apparatus 30 according to an embodiment of the present disclosure can include an enclosure 310 and a sound generating module 330.

The enclosure 310 can be coupled to the supporting part 135 of the vehicle interior material 130 and configured to be connected (or coupled) to the vehicle interior material 130. The enclosure 310 can be configured to support or accommodate (or receive) the sound generating module 330. The enclosure 310 can be configured to vibrate based on driving (or vibration or displacement) of the sound generating module 330. For example, the enclosure 310 can be configured to vibrate the vehicle interior material 130 based on driving (or vibration or displacement) of the sound generating module 330.

The enclosure 310 according to an embodiment of the present disclosure can include one or more of a metal material and a nonmetal material (or a composite nonmetal material), but embodiments of the present disclosure are not limited thereto. For example, the enclosure 310 can include one or more materials of a metal material, plastic, fiber, carbon, and wood, but embodiments of the present disclosure are not limited thereto. For example, the enclosure 310 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, and styrene.

The enclosure 310 can include an internal space 313. The enclosure 310 can be at the sound generating module 330 with the internal space 313 therebetween. For example, the enclosure 310 can be connected to the sound generating module 330 with the internal space 313 therebetween. For example, the enclosure 310 can be configured to cover the sound generating module 330 with the internal space 313 therebetween. The enclosure 310 can be configured to cover a first surface (or a rear surface or a lower surface) of the sound generating module 330 and a second surface (or a front surface or an upper surface) opposite to the first surface. The enclosure 310 can be configured to support the sound generating module 330 with the internal space 313 therebetween. For example, the enclosure 310 can be configured to support or to cover each of the first surface (or the rear surface or the lower surface) of the sound generating module 330 and the second surface (or the front surface or the upper surface) opposite to the first surface. For example, the enclosure 310 can be a housing, a case, an outer case, a case member, a housing member, a cabinet, or a sound box, but embodiments of the present disclosure are not limited thereto.

The enclosure 310 according to an embodiment of the present disclosure can include at least one or more enclosures (or enclosure members). For example, the enclosure 310 can include a first enclosure 311 and a second enclosure 312. For example, the at least one or more enclosures can include a first enclosure 311 and a second enclosure 312.

The first enclosure 311 can be at the sound generating module 330 with the internal space 313 therebetween. The first enclosure 311 can be connected to the sound generating module 330 with the internal space 313 therebetween. The first enclosure 311 can be disposed at or connected to a first surface side (or a rear surface side or a lower surface side) of the sound generating module 330 with the internal space 313 therebetween. For example, the first enclosure 311 can be connected (or coupled) to a periphery portion of the first surface of the sound generating module 330 with the internal space 313 therebetween. The first enclosure 311 can support the first surface of the sound generating module 330 with the internal space 313 therebetween. The first enclosure 311 can be disposed (or configured) between the vehicle interior material 130 and the sound generating module 330. For example, the first enclosure 311 can be configured to surround the first surface of the sound generating module 330. The first enclosure 311 can be configured to cover the first surface of the sound generating module 330.

The first enclosure 311 can be connected (or coupled) to the vehicle interior material 130. For example, the first enclosure 311 can be connected (or coupled) to a first surface **130*s*1 of the vehicle interior material 130. A rear surface (or a lower surface) of the first enclosure 311 can be connected (or coupled) to the first surface 130*s*1 of the vehicle interior material 130. The rear surface (or the lower surface) of the first enclosure 311 can be connected (or coupled) to the first surface 130*s*1 of the vehicle interior material 130 corresponding to a region (or vibration region or vibration transfer region) between first and second supporting members 135*a* and 135*b* of a supporting part 135 at the vehicle interior material 130**.

The first enclosure 311 can vibrate based on driving (or vibration or displacement) of the sound generating module 330, and the vehicle interior material 130 can vibrate based on a vibration of the first enclosure 311 to generate or output a sound. Accordingly, according to an embodiment of the present disclosure, a sound can be generated based on a vibration of the vehicle interior material 130 having a size which is greater than that of the sound apparatus 30, thereby enhancing a sound characteristic and/or a sound pressure level characteristic of a sound band including a low-pitched sound band generated by driving (or vibration or displacement) of the sound apparatus 30.

The first enclosure 311 according to an embodiment of the present disclosure can include a plate **311*a* and a sidewall portion 311*b*. For example, the first enclosure 311 can have a box shape where one side (or an upper portion) is opened by the plate 311*a* and the sidewall portion 311*b***.

The plate **311*a* can be disposed at a lower portion (or a rear side) of the sound generating module 330. The plate 311*a* can be disposed spaced apart from a rear surface (or a lower surface) of the sound generating module 330. For example, the plate 311*a* can be configured to cover the rear surface (or the lower surface) of the sound generating module 330. For example, the plate 311*a*** can be a bottom portion, a bottom plate, a plate member, a first plate, or a first plate member.

The plate **311*a* can be connected (or coupled) to the vehicle interior material 130. For example, a rear surface (or a lower surface) of the plate 311*a* can be connected (or coupled) to the first surface 130*s*1 of the vehicle interior material 130. The rear surface (or a lower surface) of the plate 311*a* can be connected (or coupled) to the first surface 130*s*1 of the vehicle interior material 130 corresponding to a region (or a vibration region or a vibration transfer region) between the first and second supporting members 135*a* and 135*b* of the supporting part 135 at the vehicle interior material 130**.

The sidewall portion **311*b* can be configured along a periphery portion of the plate 311*a*. The sidewall portion 311*b* can be configured to be connected to the periphery portion of the plate 311*a* and connected (or coupled) to the rear surface of the sound generating module 330. Accordingly, the plate 311*a* can be spaced apart from the sound generating module 330 by the sidewall portion 311*b*. For example, the sidewall portion 311*b*** can be a sidewall member, a first sidewall portion, a sidewall frame, or a first sidewall frame, but embodiments of the present disclosure are not limited thereto.

The second enclosure 312 can be at the sound generating module 330 with the internal space 313 therebetween. The second enclosure 312 can be connected to the sound generating module 330 with the internal space 313 therebetween. The second enclosure 312 can be disposed at or connected to a second surface side (or a front surface side or an upper surface side) opposite to the first surface side of the sound generating module 330 with the internal space 313 therebetween. For example, the second enclosure 312 can be connected (or coupled) to a periphery portion of a second surface of the sound generating module 330 with the internal space 313 therebetween. The second enclosure 312 can support the second surface of the sound generating module 330 with the internal space 313 therebetween. The second enclosure 312 can be configured to surround the second surface of the sound generating module 330. The second enclosure 312 can be configured to cover the second surface of the sound generating module 330.

The second enclosure 312 according to an embodiment of the present disclosure can include a plate 312*a* and a sidewall portion 312*b*. For example, the second enclosure 312 can have a box shape where one side (or a lower portion) is opened by the plate 312*a* and the sidewall portion 312*b*. For example, the second enclosure 312 can be configured to have a shape opposite to that of the first enclosure 311. For example, the first enclosure 311 and the second enclosure 312 can be configured to have a symmetric shape or have a symmetric structure with the sound generating module 330 therebetween, but embodiments of the present disclosure are not limited thereto.

The plate 312*a* can be disposed at an upper portion (or an upper side) of the sound generating module 330. The plate 312*a* can be disposed spaced apart from a front surface (or an upper surface) of the sound generating module 330. The plate 312*a* can be disposed to cover the front surface (or the upper surface) of the sound generating module 330. For example, the plate 312*a* can be a ceiling portion, a ceiling plate, a lid plate, a cover member, a cover plate, a plate member, a second plate, or a second plate member, but embodiments of the present disclosure are not limited thereto.

The sidewall portion 312*b* can be configured along a periphery portion of the plate 312*a*. The sidewall portion 312*b* can be configured to be connected to the periphery portion of the plate 312*a* and connected (or coupled) to the front surface of the sound generating module 330. Accordingly, the plate 312*a* can be spaced apart from the sound generating module 330 by the sidewall portion 312*b*. For example, the sidewall portion 312*b* can be a sidewall member, a second sidewall portion, a sidewall frame, or a second sidewall frame, but embodiments of the present disclosure are not limited thereto.

According to an embodiment of the present disclosure, the internal space 313 of the enclosure 310 can be between the sound generating module 330 and the enclosure 310. For example, the internal space 313 can be an accommodation space, a receiving space, a gap space, an air space, a vibration space, a sound space, a sound pressure level space, or a sound box, or the like, but embodiments of the present disclosure are not limited thereto.

The internal space 313 of the enclosure 310 according to an embodiment of the present disclosure can include a first space 313*a* and a second space 313*b*.

The first space 313*a* can be between the sound generating module 330 and the first enclosure 311. For example, the first space 313*a* can be between the first surface of the sound generating module 330 and the first enclosure 311. For example, the first space 313*a* can be a first gap space, a first air space, a first vibration space, a first sound space, a first sound pressure level space, a first sound box, or the like, but embodiments of the present disclosure are not limited thereto.

The second space 313*b* can be between the sound generating module 330 and the second enclosure 312. For example, the second space 313*b* can be between the second surface of the sound generating module 330 and the second enclosure 312. For example, the second space 313*b* can be a second gap space, a second air space, a second vibration space, a second sound space, a second sound pressure level space, a second sound box, or the like, but embodiments of the present disclosure are not limited thereto.

The sound apparatus for a vehicle and the vehicular apparatus including the same according to an embodiment of the present disclosure can further include a fixing part 315. For example, the enclosure 310 or the sound apparatus 30 according to an embodiment of the present disclosure can further include a fixing part 315. The fixing part 315 can be fully (or completely) occluded or fully (or completely) concealed by the vehicle interior material 130 together with the connection member 350 and the sound apparatus 30.

The fixing part 315 can be configured at a side surface of the enclosure 310. For example, the fixing part 315 can be configured at a side surface of the first enclosure 311 or a side surface of the second enclosure 312. The fixing part 315 can be configured at the enclosure 310 corresponding to the supporting part 135 of the vehicle interior material 130. The fixing part 315 can be configured at the enclosure 310 so as to be fixed (or coupled) to the supporting part 135 of the vehicle interior material 130. The fixing part 315 can be configured at the enclosure 310 so as to be fixed (or coupled) to the supporting part 135 of the vehicle interior material 130 by a fastening member 150. For example, the fixing part 315 can be configured at the second enclosure 312 of the enclosure 310 so as to be fixed (or coupled) to the supporting part 135 of the vehicle interior material 130 by the fastening member 150. For example, the fastening member 150 can be fastened to the supporting part 135 through a hole 315*h* formed at the fixing part 315. For example, the fastening member 150 can be a screw or a bolt, but embodiments of the present disclosure are not limited thereto.

The fixing part 315 according to an embodiment of the present disclosure can include two or more or a plurality of fixing members 315*a* and 315*b*. For example, the fixing part 315 can include first and second fixing members 315*a* and 315*b* or a pair of fixing members 315*a* and 315*b*. For example, the fixing members 315*a* and 315*b* can be a protrusion portion, a protrusion member, a protrusion bar, a coupling means, a coupling bar, a protrusion piece, a coupling piece, a wing member, or a cantilever, but embodiments of the present disclosure are not limited thereto.

The first fixing member 315*a* can be configured in a bar shape at a first side of the enclosure 310. For example, the first fixing member 315*a* can be configured at a first side of the second enclosure 312 of the enclosure 310. For example, the first fixing member 315*a* can be configured at a first side of the plate 312*a* or the sidewall portion 312*b* of the second enclosure 312.

The first fixing member 315*a* can extend or protrude to have a bar shape from the first side of the enclosure 310. For example, the first fixing member 315*a* can extend or protrude to have a bar shape from the first side of the second enclosure 312. For example, the first fixing member 315*a* can extend or protrude to have a bar shape having a certain length along the first direction X from the first side of the plate 312*a* or the sidewall portion 312*b* of the second enclosure 312.

The first fixing member 315*a* can be connected (or coupled) to the first side of the enclosure 310 to have a cantilever structure. For example, the first fixing member 315*a* can be connected (or coupled) to the first side of the second enclosure 312 to have the cantilever structure. For example, the first fixing member 315*a* can have the cantilever structure having a certain length along the first direction X at the first side of the plate 312*a* or the sidewall portion 312*b* of the second enclosure 312.

One side of the first fixing member 315*a* can be coupled (or fixed) to or integrated into the first side of the enclosure 310. The other side of the first fixing member 315*a* can be supported by the first supporting member 135*a* of the supporting part 135 at the vehicle interior material 130. The other side of the first fixing member 315*a* can be supported by or coupled to the first supporting member 135*a* by the fastening member (or a first fastening member) 150. The fastening member 150 can pass through (or via) a hole 315*h* provided at the other side of the first fixing member 315*a* and can be fastened to a screw hole 135*a*3 of the first supporting member 135*a*, and thus, the other side of the first fixing member 315*a* can be supported by or fixed to the first supporting member 135*a* by the fastening member 150 fastened to the screw hole 135*a*3 of the first supporting member 135*a*. For example, the fastening member 150 can be fastened to the screw hole 135*a*3 of the first supporting member 135*a* through the hole 315*h* formed at the other side of the first fixing member 315*a*.

The second fixing member 315*b* can be configured in a bar shape at a second side, which is opposite to the first side, of the enclosure 310. For example, the second fixing member 315*b* can be configured at a second side of the second enclosure 312 of the enclosure 310. For example, the second fixing member 315*b* can be configured at a second side of the plate 312*a* or the sidewall portion 312*b* of the second enclosure 312.

The second fixing member 315*b* can extend or protrude to have a bar shape from the second side of the enclosure 310. For example, the second fixing member 315*b* can extend or protrude to have a bar shape from the second side of the second enclosure 312. For example, the second fixing member 315*b* can extend or protrude to have a bar shape having a certain length along the first direction X from the second side of the plate 312*a* or the sidewall portion 312*b* of the second enclosure 312.

The second fixing member 315*b* can be connected (or coupled) to the second side of the enclosure 310 to have a cantilever structure. For example, the second fixing member 315*b* can be connected (or coupled) to the second side of the second enclosure 312 to have the cantilever structure. For example, the second fixing member 315*b* can have the cantilever structure having a certain length along the first direction X at the second side of the plate 312*a* or the sidewall portion 312*b* of the second enclosure 312.

One side of the second fixing member 315*b* can be coupled (or fixed) to or integrated into the second side of the enclosure 310. The other side of the second fixing member 315*b* can be supported by the second supporting member 135*b* of the supporting part 135 at the vehicle interior material 130. The other side of the second fixing member 315*b* can be supported by or coupled to the second supporting member 135*b* by the fastening member (or a second fastening member) 150. The fastening member 150 can pass through (or via) a hole 315*h* provided at the other side of the second fixing member 315*b* and can be fastened to a screw hole 135*a*3 of the second supporting member 135*b*, and thus, the other side of the second fixing member 315*b* can be supported by or fixed to the second supporting member 135*b* by the fastening member 150 fastened to the screw hole 135*a*3 of the second supporting member 135*b*. For example, the fastening member 150 can be fastened to the screw hole 135*a*3 of the second supporting member 135*b* through the hole 315*h* formed at the other side of the second fixing member 315*b*.

According to an embodiment of the present disclosure, the fixing part 315 of the enclosure 310 can be supported by (or fixed to) the supporting part 135 of the vehicle interior material 130 by the fastening member 150, and thus, the sound apparatus 30 or the enclosure 310 can be supported by (or fixed to) the vehicle interior material 130 and can be connected (or coupled) to the vehicle interior material 130. For example, the enclosure 310 or the first enclosure 311 can be pressed by a fastening force of the fastening member 150 fastened to the supporting part 135 of the vehicle interior material 130 and can be connected to (or coupled or contact) the first surface 130*s*1 of the vehicle interior material 130. Accordingly, a coupling process between the sound apparatus 30 and a vehicle structure can be easily performed based on a screw coupling scheme using the fastening member 150. For example, a process of attaching or mounting the sound apparatus 30 on the vehicle interior material 130 and/or a process of separating or detaching the sound apparatus 30 on the vehicle interior material 130 can be easily performed based on the screw coupling scheme.

The sound generating module 330 can be configured to indirectly vibrate the vehicle interior material 130. The sound generating module 330 can generate or output a sound or a vibration based on driving (or vibration or displacement) of the vehicle interior material 130. For example, the sound generating module 330 can be configured to vibrate the enclosure 310 to vibrate the vehicle interior material 130. For example, in a state where the enclosure 310 is supported by (or fixed to) the supporting part 136 by the fastening member 160 and is connected (or coupled) to the first surface 130*s*1 of the vehicle interior material 130, the sound generating module 330 can be configured to vibrate the first enclosure 311 to vibrate the vehicle interior material 130. For example, the sound generating module 330 can be a sound generating unit, a sound generating member, a sound reproduction module, a sound reproduction unit, a speaker module, a speaker unit, a car audio module, or a car audio unit, but embodiments of the present disclosure are not limited thereto.

The sound generating module 330 can generate a sound pressure level (or sound or sound wave) in the internal space 313 of the enclosure 310 to vibrate the enclosure 310 and can vibrate the vehicle interior material 130 based on a vibration of the enclosure 310. For example, the sound generating module 330 can be configured to vibrate the first enclosure 311 of the enclosure 310 to vibrate the vehicle interior material 130. For example, the sound generating module 330 can generate the sound pressure level (or sound or sound wave) in the internal space 313 of the enclosure 310 to vibrate the first enclosure 311 and can vibrate the vehicle interior material 130 based on a vibration of the first enclosure 311.

The sound generating module 330 according to an embodiment of the present disclosure can include a vibration apparatus and a vibration member 331.

The vibration apparatus can be configured to generate the sound pressure level (or sound or sound wave) in the internal space 313 of the enclosure 310. The vibration apparatus can be configured to vibrate the vibration member 331. For example, the vibration apparatus can be disposed at or configured at the vibration member 331. The vibration apparatus can vibrate (or displace or drive) based on a driving signal (or a vibration driving signal or a voice signal) applied thereto to vibrate (or displace or drive) the vibration member 331. The vibration apparatus can be disposed with the vibration member 331 therebetween. The vibration apparatus can include one or more vibration apparatuses. For example, one or more vibration apparatuses can be configured at the vibration member 331.

The vibration apparatus according to an embodiment of the present disclosure can include a first vibration apparatus 333 and a second vibration apparatus 335. The first vibration apparatus 333 and the second vibration apparatus 335 can be configured at the vibration member 331.

The vibration member 331 can generate a vibration or can output the sound (or sound pressure level or sound wave) based on the displacements (or driving) of the first vibration apparatus 333 and the second vibration apparatus 335. For example, the vibration member 331 can be a plate, a vibration plate, a vibration substrate, a vibration object, a vibration panel, a sound plate, a sound panel, a passive vibration plate, a passive vibration member, a passive vibration panel, a sound output plate, or a sound vibration plate, but embodiments of the present disclosure are not limited thereto. For example, the vibration member 331 can include a metal material, or can include a single nonmetal material or a composite nonmetal material of one or more of wood, rubber, plastic, carbon, glass, fiber, cloth, paper, mirror, and leather, but embodiments of the present disclosure are not limited thereto. For example, the paper can be cone paper for speakers. For example, the cone paper can be pulp or foamed plastic, or the like, but embodiments of the present disclosure are not limited thereto.

According to an embodiment of the present disclosure, the metal material of the vibration member 331 can include one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the vibration member 331 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, and styrene. For example, the vibration member 331 can be carbon fiber reinforced plastic (CFRP), polypropylene, polycarbonate, or the like, but embodiments of the present disclosure are not limited thereto.

According to an embodiment of the present disclosure, the vibration member 331 can include a tetragonal shape (or a square shape), but embodiments of the present disclosure are not limited thereto. For example, the vibration member 331 can have a rectangular shape including a long side and a short side. The vibration apparatus can correspond to the vibration member 331, or have a same shape as that of the vibration member 331, but embodiments of the present disclosure are not limited thereto. For example, each of a first vibration apparatus 333 and a second vibration apparatus 335 of the vibration apparatus can be a same shape as that of the vibration member 331. According to an embodiment of the present disclosure, each of the first vibration apparatus 333 and the second vibration apparatus 335 can have a rectangular shape which is smaller size than the vibration member 331.

The vibration member 331 can be disposed at the internal space 313 of the enclosure 310. The vibration member 331 can be disposed at the internal space 313 of the enclosure 310 and can be connected to the vibration apparatus. For example, the vibration member 331 can be disposed at the internal space 313 of the enclosure 310 and can be connected to one or more of the first vibration apparatus 333 and the second vibration apparatus 335. For example, the first vibration apparatus 333 and the second vibration apparatus 335 can be disposed with the vibration member 331 therebetween.

The vibration member 331 can be disposed or configured at a region between the first enclosure 311 and the second enclosure 312 of the enclosure 310. The vibration member 331 can be configured to divide the internal space 313 of the enclosure 310 into the first space **313*a* and the second space 313*b*. For example, the internal space 313 of the enclosure 310 can be divided into the first space 313*a* and the second space 313*b* by the vibration member 331. For example, the first space 313*a* of the internal space 313 can be provided at a region between the first enclosure 311 of the enclosure 310 and the vibration member 331 and can be covered by the vibration member 331. The second space 313*b* of the internal space 313 can be provided at a region between the second enclosure 312 of the enclosure 310 and the vibration member 331 and can be covered by the vibration member 331**.

The vibration member 331 can include a first surface and a second surface different from (or opposite to) the first surface. The first vibration apparatus 333 can be disposed at the first surface (or the rear surface) of the vibration member 331. The second vibration apparatus 335 can be disposed at the second surface (or the front surface) of the vibration member 331.

The first surface of the vibration member 331 can be connected (or coupled) to the first enclosure 311 of the enclosure 310. For example, a periphery portion (or edge portion) of the first surface of the vibration member 331 can be connected (or coupled) to the first enclosure 311. The periphery portion of the first surface of the vibration member 331 can be connected (or coupled) to the sidewall portion **311*b* of the first enclosure 311. Accordingly, the first space 313*a* of the enclosure 310 can be a space surrounded by the plate 311*a* and the sidewall portion 311*b* of the first enclosure 311 and the first surface of the vibration member 331**.

The second surface of the vibration member 331 can be connected (or coupled) to the second enclosure 312 of the enclosure 310. For example, a periphery portion (or edge portion) of the second surface of the vibration member 331 can be connected (or coupled) to the second enclosure 312. The periphery portion of the second surface of the vibration member 331 can be connected (or coupled) to the sidewall portion **312*b* of the second enclosure 312. Accordingly, the second space 313*b* of the enclosure 310 can be a space surrounded by the plate 312*a* and the sidewall portion 312*b* of the second enclosure 312, and the second surface of the vibration member 331**.

Each of the first vibration apparatus 333 and the second vibration apparatus 335 can include a piezoelectric material having a piezoelectric characteristic. The first vibration apparatus 333 and the second vibration apparatus 335 can vibrate (or displace or drive) based on driving signals (or a vibration driving signal or a voice signal) applied thereto to vibrate (or displace or drive) the vibration member 331. For example, the driving signals (or the vibration driving signal or the voice signal) applied to the first vibration apparatus 333 and the second vibration apparatus 335 can be a same or different. For example, the driving signals applied to the first vibration apparatus 333 and the second vibration apparatus 335 can have a same phase or different phases. For example, the first vibration apparatus 333 and the second vibration apparatus 335 can have a bimorph structure where the first and second vibration apparatuses 333 and 335 are disposed with the vibration member 331 therebetween. Each of the first vibration apparatus 333 and the second vibration apparatus 335 can independently vibrate the vibration member 331, and thus, an influence thereof on a sound characteristic based on a material and a characteristic of the vibration member 331 can be reduced. Accordingly, a sound characteristic and/or a sound pressure level characteristic of the sound apparatus 30 can be enhanced.

Each of the first vibration apparatus 333 and the second vibration apparatus 335 can vibrate the vibration member 331 to generate a sound (or sound pressure level or sound wave) in the internal space 313 of the enclosure 310, the enclosure 310 can vibrate by the sound (or sound pressure level or sound wave) generated at the internal space 313 of the enclosure 310, and the vehicle interior material 130 can vibrate based on a vibration of the enclosure 310 to generate (or output) a sound. For example, the vehicle interior material 130 can vibrate by a vibration of the first enclosure 311 based on the sound (or sound pressure level or sound wave) generated at the internal space 313 of the enclosure 310 to generate (or output) a sound.

According to another embodiment of the present disclosure, the first vibration apparatus 333 and the second vibration apparatus 335 can be configured at any one of the first surface and the second surface of the vibration member 331. For example, the first vibration apparatus 333 can be configured at any one of the first surface and the second surface of the vibration member 331. For example, the first vibration apparatus 333 can be connected to or configured at the first surface of the vibration member 331. For example, the second vibration apparatus 335 can be can be connected to or configured at the second surface different from the first surface. For example, the second vibration apparatus 335 can be connected to or configured at the first vibration apparatus 333. For example, the second vibration apparatus 335 can be stacked on the first vibration apparatus 333.

The sound apparatus 30 or the sound generating module 330 according to an embodiment of the present disclosure can further include an adhesive member. The adhesive member can include a first adhesive member 332 and a second adhesive member 334.

The first adhesive member 332 can be disposed between the vibration member 331 and the first vibration apparatus 333. The first vibration apparatus 333 can be connected (or coupled) to the vibration member 331 by the first adhesive member 332. For example, the first vibration apparatus 333 can be connected (or coupled) to the first surface of the vibration member 331 by the first adhesive member 332.

The second adhesive member 334 can be disposed between the vibration member 331 and the second vibration apparatus 335. The second vibration apparatus 335 can be connected (or coupled) to the vibration member 331 by the second adhesive member 334. For example, the second vibration apparatus 335 can be connected (or coupled) to the second surface of the vibration member 331 by the second adhesive member 334.

The first adhesive member 332 and the second adhesive member 334 can include an adhesive layer (or a tacky layer) which has a good adhesive force or attaching force. For example, the first adhesive member 332 and the second adhesive member 334 can include a same or different adhesive layers (or tacky layers). For example, the first adhesive member 332 and the second adhesive member 334 can include an adhesive, a double-sided adhesive, a double-sided tape, a double-sided adhesive tape, a double-sided adhesive foam tape, a double-sided pad, a double-sided foam pad, a double-sided adhesive foam pad, a double-sided cushion tape, or a tacky sheet, but embodiments of the present disclosure are not limited thereto.

The sound apparatus 30 according to an embodiment of the present disclosure can further include a coupling member 320.

The coupling member 320 can be configured to connect or couple the vibration member 331 and the enclosure 310 to each other. The coupling member 320 can be between the vibration member 331 and the enclosure 310. For example, the coupling member 320 can be between the periphery portion of the vibration member 331 and the enclosure 310. For example, the coupling member 320 can be between the periphery portion of the first surface of the vibration member 331 and the sidewall portion 311*b* of the first enclosure 311, and can be between the periphery portion of the second surface of the vibration member 331 and the sidewall portion 312*b* of the second enclosure 312.

The coupling member 320 according to an embodiment of the present disclosure can include a first coupling member 321 and a second coupling member 322.

The first coupling member 321 can be between the vibration member 331 and the first enclosure 311. The first coupling member 321 can be between the periphery portion of the vibration member 331 and a periphery portion of the first enclosure 311. For example, the periphery portion of the first enclosure 311 can be connected (or coupled) to the periphery portion of the first surface of the vibration member 331 by the first coupling member 321. For example, the sidewall portion 311*b* of the first enclosure 311 can be connected (or coupled) to the periphery portion of the vibration member 331 by the first coupling member 321. For example, the sidewall portion 311*b* of the first enclosure 311 can be connected (or coupled) to the periphery portion of the first surface of the vibration member 331 by the first coupling member 321.

The second coupling member 322 can be between the vibration member 331 and the second enclosure 312. The second coupling member 322 can be between the periphery portion of the vibration member 331 and a periphery portion of the second enclosure 312. For example, the periphery portion of the second enclosure 312 can be connected (or coupled) to the periphery portion of the second surface of the vibration member 331 by the second coupling member 322. For example, the sidewall portion 312*b* of the second enclosure 312 can be connected (or coupled) to the periphery portion of the vibration member 331 by the second coupling member 322. For example, the sidewall portion 312*b* of the second enclosure 312 can be connected (or coupled) to the periphery portion of the second surface of the vibration member 331 by the second coupling member 322.

According to an embodiment of the present disclosure, the coupling member 320 can be configured to minimize or prevent the transfer of a vibration of the vibration member 331 to the enclosure 310. The coupling member 320 can include a material characteristic suitable for blocking (or isolating or reducing) a vibration. For example, the coupling member 320 can include a material having elasticity. For example, the coupling member 320 can include a material having elasticity for vibration absorption (or impact absorption). The coupling member 320 according to an embodiment of the present disclosure can be configured as (or comprise) polyurethane materials and/or polyolefin materials, but embodiments of the present disclosure are not limited thereto. For example, the coupling member 320 can include one or more of an adhesive, a double-sided adhesive, a double-sided tape, a double-sided adhesive tape, a double-sided foam tape, a double-sided adhesive foam tape, a double-sided pad, a double-sided foam pad, a double-sided adhesive foam pad, and a double-sided cushion tape, but embodiments of the present disclosure are not limited thereto.

The coupling member 320 according to another embodiment of the present disclosure can be configured to minimize or prevent the transfer of a vibration of the vibration member 331 to the enclosure 310 and to decrease the reflection of an incident sound wave which is generated based on a vibration of the vibration member 331.

The sound apparatus 30 according to an embodiment of the present disclosure can include the sound generating module 330 having the bimorph structure by the first vibration apparatus 333 and the second vibration apparatus 335, and thus, a sound characteristic and/or a sound pressure level characteristic of a sound including the low-pitched sound band generated by the sound generating module 330 can be enhanced.

The sound apparatus for a vehicle and the vehicular apparatus including the same according to an embodiment of the present disclosure can further include a connection member 350. For example, the sound apparatus 30 according to an embodiment of the present disclosure can further include a connection member 350. The connection member 350 can be disposed at the rear surface of the enclosure 310. The connection member 350 can be disposed or interposed between the enclosure 310 and the vehicle interior material 130. The vehicle interior material 130 can be connected (or coupled) to the enclosure 310 by the connection member 350. For example, the connection member 350 can be disposed or interposed between the first surface **130*s*1 of the vehicle interior material 130 and the first enclosure 311 of the enclosure 310. For example, the connection member 350** can be a coupling member, an intermediate member, a buffer member, a pad member, or a vibration transfer member, but embodiments of the present disclosure are not limited thereto.

The connection member 350 can be configured to transfer a vibration of the first enclosure 311 based on a vibration of the sound generating apparatus 330 to the vehicle interior material 130. Accordingly, the vehicle interior material 130 can vibrate based on a vibration transferred through the connection member 350 to generate (or output) a sound.

The connection member 350 and the sound apparatus 30 can be fully (or completely) occluded or fully (or completely) concealed by the vehicle interior material 130. Accordingly, the connection member 350 and the sound apparatus 30 can be implemented in an invisible or imperceptible structure which is not exposed at the inside (or an indoor space IS) of the vehicle 10 and the outside of the vehicle 10 at all and is not seen with eyes of an occupant of the vehicle 10 at all.

The connection member 350 can include a material which differs from that of the first coupling member 321. For example, the connection member 350 can include a material having an adhesive force which differs from that of the first coupling member 321. Because the connection member 350 includes a material having an adhesive force which differs from that of the first coupling member 321, a separation or detachment process (or rework) of the connection member 350 from the vehicle interior material 130 can be easily performed in a separation or detachment process (or rework) of the sound apparatus 30 attached on the vehicle interior material 130. Accordingly, a process of attaching or mounting the sound apparatus 30 on the vehicle interior material 130 or a process of separating or attaching/detaching the sound apparatus 30 from the vehicle interior material 130 can be easily performed.

The connection member 350 can be coupled (or attached) to the rear surface of the enclosure 310 and can contact (or surface-contact) a first surface **130*s*1 of the vehicle interior material 130, but embodiments of the present disclosure are not limited thereto. For example, in a case where the connection member 350 is coupled (or attached) to the rear surface of the enclosure 310 and simply contacts (or surface-contacts) the first surface 130*s*1 of the vehicle interior material 130, a process of separating or detaching (or rework) the connection member 350 from the vehicle interior material 130 without damage of the sound apparatus 30 or the vehicle interior material 130 can be easily performed in a process of separating and detaching (or rework) the sound apparatus 30 from the vehicle interior material 130**.

The connection member 350 according to an embodiment of the present disclosure can include a relatively stiff material (or a hard material). Accordingly, the vehicle interior material 130 can vibrate based on a vibration transferred through the connection member 350 to generate (or output) a sound. For example, when the connection member 350 includes the relatively stiff material (or the hard material), a vibration of the first enclosure 311 can be transmitted to the vehicle interior material 130 more efficiently.

The connection member 350 according to an embodiment of the present disclosure can include rubber, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, the connection member 350 can include high-elasticity rubber, but embodiments of the present disclosure are not limited thereto. According to an embodiment of the present disclosure, because the connection member 350 includes rubber or the like, when a vibration of the enclosure 310 or the first enclosure 311 is transferred to the interior material 130, the loss of the vibration can be prevented or minimized, and thus, a sound characteristic and/or a sound pressure level characteristic of a low-pitched sound band can be further improved.

According to an embodiment of the present disclosure, a thickness of the connection member 350 can differ from that of at least one of the first coupling member 321 and the second coupling member 322. For example, the thickness of the connection member 350 can be thicker than that of at least one of the first coupling member 321 and the second coupling member 322. The thickness of the connection member 350 can be 0.5 mm or more, but embodiments of the present disclosure are not limited thereto. For example, the thickness of the connection member 350 can be 0.5 mm to 3 mm, but embodiments of the present disclosure are not limited thereto.

The vehicle interior material 130 according to another embodiment of the present disclosure can include a flexural portion (or at least one or more curved portions) 134 illustrated by a dotted line in FIG. 4. For example, the vehicle interior material 130 can include a vibration region which is vibrated by the sound apparatus 30 (or a connection region (or a coupling region) which is connected (or coupled) to the sound apparatus 30). The vibration region of the vehicle interior material 130 can include one or more of the flexural portion (or one or more curved portions) 134 and one or more planar portions. For example, the flexural portion 134 can include one or more concave portions which are concave from the planar portion and one or more convex portions which are convex from the planar portion. For example, the planar portion can be configured between the flexural portion 134 and another flexural portion.

The connection member 350 according to an embodiment of the present disclosure can include a relatively soft material (or a smooth material), for a connection (or coupling) with the vehicle interior material 130 including the flexural portion 134 and the planar portion. For example, when the flexural portion (or one or more curved portions) 134 includes the vibration region of the vehicle interior material 130, the connection member 350 can include the relatively soft material (or the smooth material). For example, the connection member 350 according to another embodiment of the present disclosure including the relatively soft material (or the smooth material) can be a ductile member or a soft member.

The connection member 350 can contact an entire vibration region of the vehicle interior material 130. The connection member 350 can directly contact an entire vibration region of the vehicle interior material 130. For example, the connection member 350 can directly contact the entire vibration region of the vehicle interior material 130 without a medium or an intermediate member. A vibration generated by the sound generating module 330 can be transferred, by the connection member 350, to the entire vibration region of the vehicle interior material 130 including the flexural portion 134 and the planar portion, and thus, a sound can be generated (or output) based on a vibration of the entire vibration region of the vehicle interior material 130, thereby enhancing a sound characteristic and/or a sound pressure level characteristic of a sound band including a low-pitched sound band generated by the sound generating module 330.

According to another embodiment of the present disclosure, the connection member 350 which is configured the relatively soft material (or smooth material) can be configured as a single-sided tape, a single-sided sponge tape, a single-sided porous tape, a single-sided cushion tape, a double-sided tape, a double-sided sponge tape, a double-sided porous tape, a double-sided cushion tape, or the like, but embodiments of the present disclosure are not limited thereto. The connection member 350 can be filled in the flexural portion 134 of the vehicle interior material 130, or can be configured to cover or completely cover the flexural portion 134 of the vehicle interior material 130. For example, the connection member 350 can be filled into the concave portion of the flexural portion 134, or can be configured to fully (or completely) cover or surround the convex portion of the flexural portion 134. Accordingly, the connection member 350 according to another embodiment of the present disclosure can be filled in the flexural portion 134 of the vehicle interior material 130 and/or can cover the flexural portion 134 of the vehicle interior material 130 and can absorb an external impact, thereby protecting the sound apparatus 30 from an external impact.

The sound apparatus 30 according to an embodiment of the present disclosure can further include a line part 340.

The line part 340 can be configured at one lateral surface of the sound apparatus 30. The line part 340 can be configured at one lateral surface of the enclosure 310. For example, the line part 340 can be configured to pass through the one lateral surface of the enclosure 310. For example, the line part 340 can be configured to pass through one lateral surface of each of the first enclosure 311 and the second enclosure 312 of the enclosure 310. For example, the line part 340 can be configured to pass through one lateral surface of each of the sidewall portion 311*b* of the first enclosure 311 and the sidewall portion 312*b* of the second enclosure 312. The line part 340 can be a lead-out hole of a signal cable connected to each of the first and second vibration apparatuses 333 and 335 of the vibration apparatus. For example, the line part 340 can be a line lead-out part or a line unload part, but embodiments of the present disclosure are not limited thereto.

According to another embodiment of the present disclosure, when the vibration apparatus is configured at the first space 313*a* or the second space 313*b* of the internal space 313, the line part 340 can be configured to pass through the one lateral surface of each of the sidewall portion 311*b* of the first enclosure 311 and the sidewall portion 312*b* of the second enclosure 312.

The sound apparatus 30 according to an embodiment of the present disclosure can further include a waterproof member which covers the line part 340. For example, the waterproof member can be a breathable membrane through which air passes and which blocks liquids, but embodiments of the present disclosure are not limited thereto. For example, the signal cable connected to each of the first and second vibration apparatuses 333 and 335 of the vibration apparatus can sequentially pass through the waterproof member and the line part 340 and can be unloaded to the outside.

The sound apparatus for a vehicle and the vehicular apparatus including the same according to an embodiment of the present disclosure can vibrate at least a portion of a vehicle structure to generate (or output) a sound, based on driving (or vibration or displacement) of the sound apparatus 30 which is connected (or coupled or contact) to the at least a portion of the vehicle structure and is supported (or fixed) to the vehicle structure by the fastening member 150, and thus, a sound characteristic and/or a sound pressure level characteristic of a sound band including a low-pitched sound band generated by driving (or vibration or displacement) of the sound apparatus 30 can be enhanced.

In the sound apparatus for a vehicle and the vehicular apparatus including the same according to an embodiment of the present disclosure, the sound apparatus 30 can be supported by (or fixed to) and connected (or coupled) to the vehicle structure by the fastening member 150 such as a screw or the like, and thus, a process of attaching or mounting the sound apparatus 30 on the vehicle interior material 130 and/or a process of separating or detaching the sound apparatus 30 on the vehicle interior material 130 can be easily performed.

Figure 5:
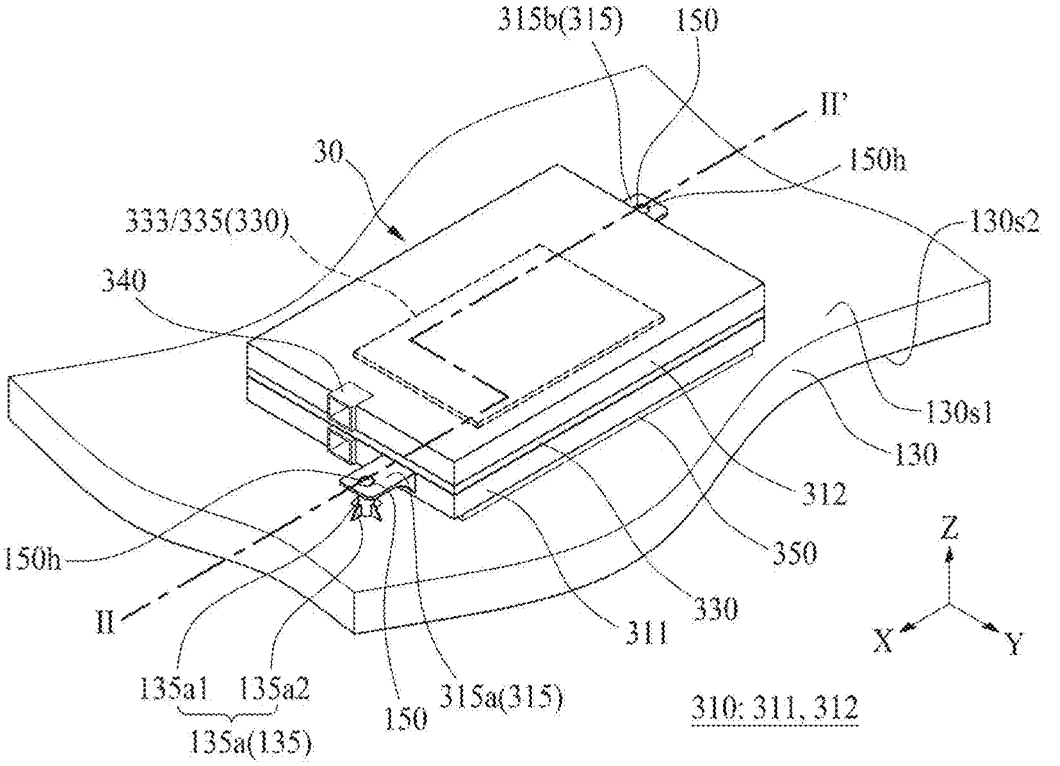
FIG. 5 illustrates a sound apparatus for a vehicle and a vehicular apparatus including the same according to another embodiment of the present disclosure.
Figure 6:
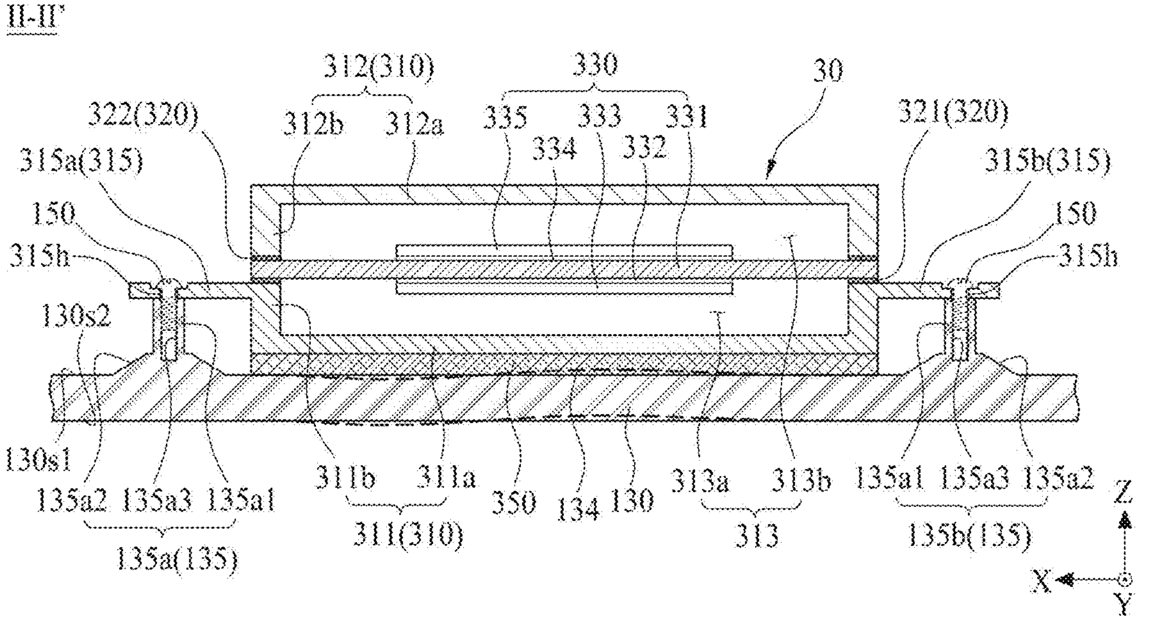
FIG. 6 is a cross-sectional view taken along line II-II' illustrated in FIG. 5 according to an embodiment of the present disclosure.

FIG. 5 illustrates a sound apparatus for a vehicle and a vehicular apparatus including the same according to another embodiment of the present disclosure. FIG. 6 is a cross-sectional view taken along line II-II' illustrated in FIG. 5 according to an embodiment of the present disclosure. FIGS. 5 and 6 illustrate an embodiment implemented by modifying a fixing part and a supporting part in the sound apparatus for a vehicle and the vehicular apparatus including the same according to an embodiment of the present disclosure described above with reference to FIGS. 3 and 4. Therefore, in describing FIGS. 5 and 6, the other elements except the fixing part and the supporting part are referred to by like reference numerals, and repeated descriptions can be omitted or will be briefly given below. The descriptions of the fixing part and the supporting part described above with reference to FIGS. 3 and 4 can be included in descriptions to FIGS. 5 and 6.

With reference to FIGS. 5 and 6, in the sound apparatus for a vehicle and the vehicular apparatus including the same according to another embodiment of the present disclosure, a supporting part 135 of a vehicle interior material 130 can be configured at a first surface **130*s*1 of the vehicle interior material 130 to support (or fix) a sound apparatus 30. Except for that the supporting part 135 is configured to have a length (or height) corresponding to a thickness (or height) of a first enclosure 311 of an enclosure 310, the supporting part 135 can be substantially the same as the supporting part 135 described above with reference to FIGS. 3 and 4, and thus, repeated descriptions can be omitted or will be briefly given below. Therefore, descriptions of the supporting part 135 illustrated in FIGS. 3 and 4 can be included in the descriptions of the supporting part 135 illustrated in FIGS. 5 and 6**.

The supporting part 135 can include two or more or a plurality of supporting members **135*a* and 135*b*. For example, the supporting part 135 can include first and second supporting members 135*a* and 135*b* or a pair of supporting members 135*a* and 135*b*. The first supporting member 135*a* and the second supporting member 135*b* can be configured at the first surface 130*s*1 of the vehicle interior material 130 with the sound apparatus 30** therebetween.

The first supporting member **135*a* can be configured at the first surface 130*s*1 of the vehicle interior material 130 adjacent to a first side of the sound apparatus 30. The second supporting member 135*b* can be configured at the first surface 130*s*1 of the vehicle interior material 130 adjacent to a second side, which is parallel or opposite to the first side, of the sound apparatus 30. The first supporting member 135*a* and the second supporting member 135*b* can be configured at the first surface 130*s*1 of the vehicle interior material 130 to be staggered with the sound apparatus 30 therebetween. For example, the first supporting member 135*a* and the second supporting member 135*b* can be configured at the first surface 130*s*1 of the vehicle interior material 130 along a diagonal direction with the sound apparatus 30** therebetween.

In the sound apparatus for a vehicle (or vehicular apparatus) according to another embodiment of the present disclosure, the fixing part 315 can be configured to correspond the supporting part 135 of the vehicle interior material 130. The fixing part 315 can be configured to be fixed (or coupled) to the supporting part 135 of the vehicle interior material 130. Except for that the fixing part 315 is configured at the first enclosure 311 of the enclosure 310, the fixing part 315 can be substantially a same as the fixing part 315 described above with reference to FIGS. 3 and 4, and thus, repeated descriptions can be omitted or will be briefly given below. Accordingly, descriptions of the fixing part 315 illustrated in FIGS. 3 and 4 can be included in descriptions of the fixing part 315 illustrated in FIGS. 5 and 6.

The fixing part 315 can include two or more or a plurality of fixing members **315*a* and 315*b*. For example, the fixing part 315 can include first and second fixing members 315*a* and 315*b* or a pair of fixing parts 315*a* and 315*b***.

The first fixing member **315*a* can be configured at a first side of the first enclosure 311. The first fixing member 315*a* can be configured in a bar shape at the first side of the first enclosure 311. For example, the first fixing member 315*a* can be configured at a first side of the plate 311*a* or the sidewall portion 311*b* of the first enclosure 311. For example, the first fixing member 315*a* can extend or protrude to have a bar shape from the first side of the first enclosure 311. For example, the first fixing member 315*a* can be connected (or coupled) to the first side of the first enclosure 311** to have a cantilever structure.

One side of the first fixing member **315*a* can be coupled (or fixed) to or integrated into the first side of the first enclosure 311. The other side of the first fixing member 315*a* can be supported by or coupled to the first supporting member 135*a* by the fastening member 150. The fastening member 150 can pass through (or via) a hole 315*h* provided at the other side of the first fixing member 315*a* and can be fastened to a screw hole 135*a*3 of the first supporting member 135*a*, and thus, the other side of the first fixing member 315*a* can be supported by or fixed to the first supporting member 135*a* by the fastening member 150 fastened to the screw hole 135*a*3 of the first supporting member 135*a*. For example, the fastening member 150 can be fastened to the screw hole 135*a*3 of the first supporting member 135*a* through the hole 315*h* formed at the other side of the first fixing member 315*a***.

The second fixing member **315*b* can be configured at a second side of the first enclosure 311. The second fixing member 315*b* can be configured in a bar shape at the second side of the first enclosure 311. The second fixing member 315*b* can be configured at a second side of the plate 311*a* or the sidewall portion 311*b* of the first enclosure 311. For example, the second fixing member 315*b* can extend or protrude to have a bar shape from the second side of the first enclosure 311. For example, the second fixing member 315*b* can be connected (or coupled) to the second side of the first enclosure 311** to have a cantilever structure.

One side of the second fixing member **315*b* can be coupled (or fixed) to or integrated into the second side of the first enclosure 311. The other side of the second fixing member 315*b* can be supported by the second supporting member 135*b* of the supporting part 135 at the vehicle interior material 130. The other side of the second fixing member 315*b* can be supported by or coupled to the second supporting member 135*b* by the fastening member 150. The fastening member 150 can pass through (or via) a hole 315*h* provided at the other side of the second fixing member 315*b* and can be fastened to a screw hole 135*a*3 of the second supporting member 135*b*, and thus, the other side of the second fixing member 315*b* can be supported by or fixed to the second supporting member 135*b* by the fastening member 150 fastened to the screw hole 135*a*3 of the second supporting member 135*b*. For example, the fastening member 150 can be fastened to the screw hole 135*a*3 of the second supporting member 135*b* through the hole 315*h* formed at the other side of the second fixing member 315*b***.

According to an embodiment of the present disclosure, the fixing part 315 of the first enclosure 311 can be supported by (or fixed to) the supporting part 135 of the vehicle interior material 130 by the fastening member 150, and thus, the sound apparatus 30 or the enclosure 310 can be supported by (or fixed to) the vehicle interior material 130 and can be connected (or coupled) to the vehicle interior material 130. For example, the enclosure 310 or the first enclosure 311 can be pressed by a fastening force of the fastening member 150 fastened to the supporting part 135 of the vehicle interior material 130 and can be connected (or coupled) to the vehicle interior material 130. Accordingly, a process of attaching or mounting the sound apparatus 30 on the vehicle interior material 130 and/or a process of separating or detaching the sound apparatus 30 on the vehicle interior material 130 can be easily performed.

The sound apparatus for a vehicle and vehicular apparatus including the same according to another embodiment of the present disclosure can have a same effect as that of the sound apparatus for a vehicle and vehicular apparatus including the same according to an embodiment of the present disclosure described above with reference to FIGS. 3 and 4.

Figure 7:
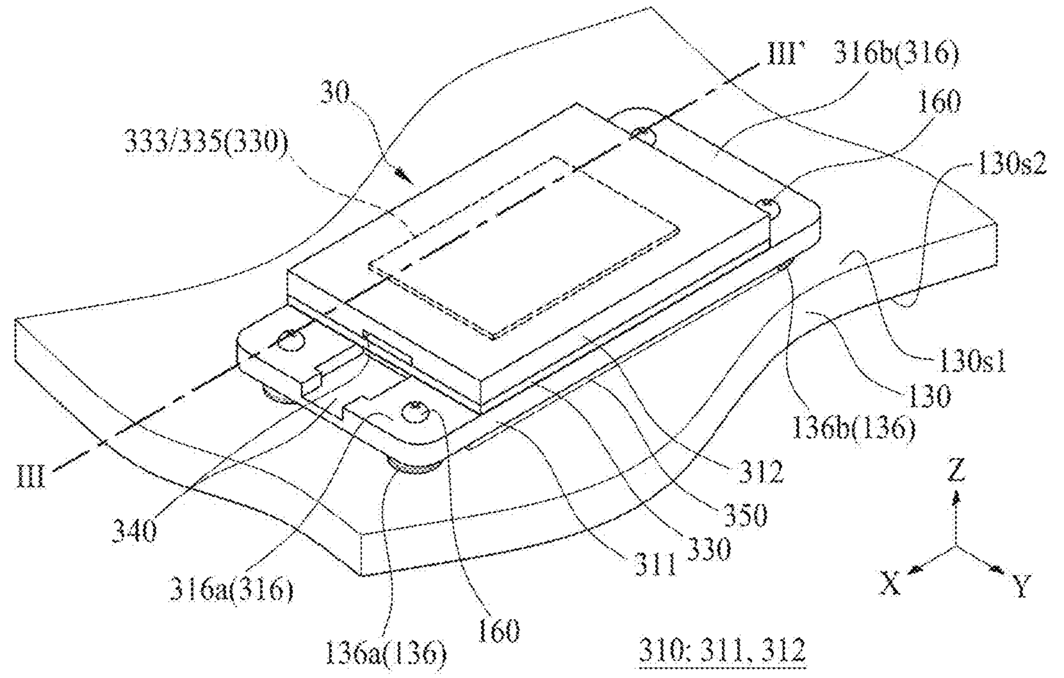
FIG. 7 illustrates a sound apparatus for a vehicle and a vehicular apparatus including the same according to another embodiment of the present disclosure.
Figure 8:
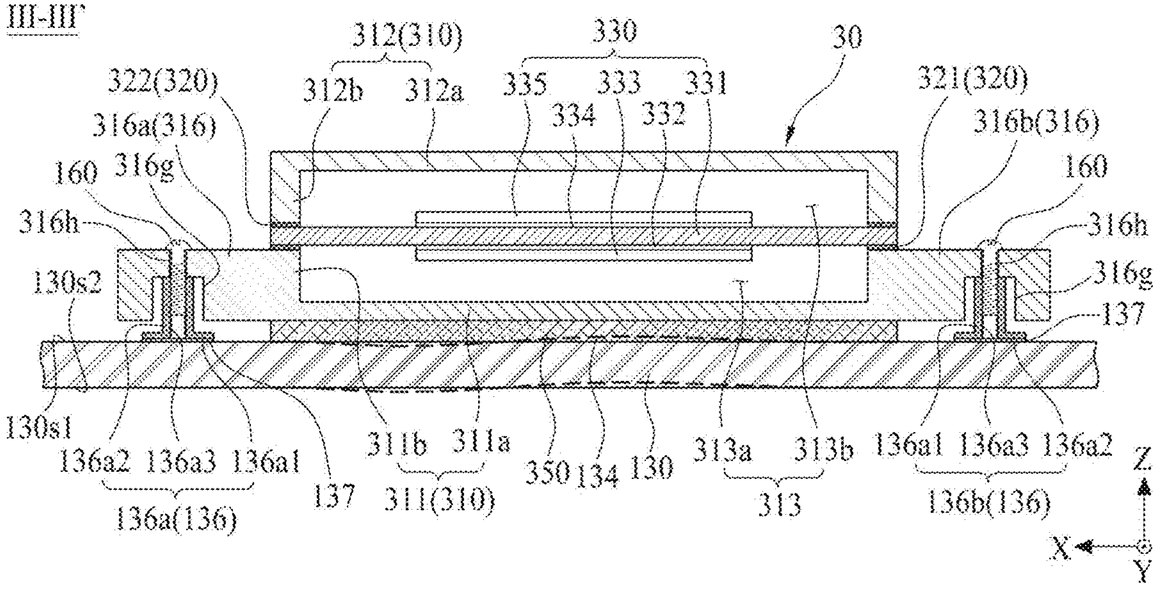
FIG. 8 is a cross-sectional view taken along line III-III' illustrated in FIG. 7 according to another embodiment of the present disclosure.
Figure 9:
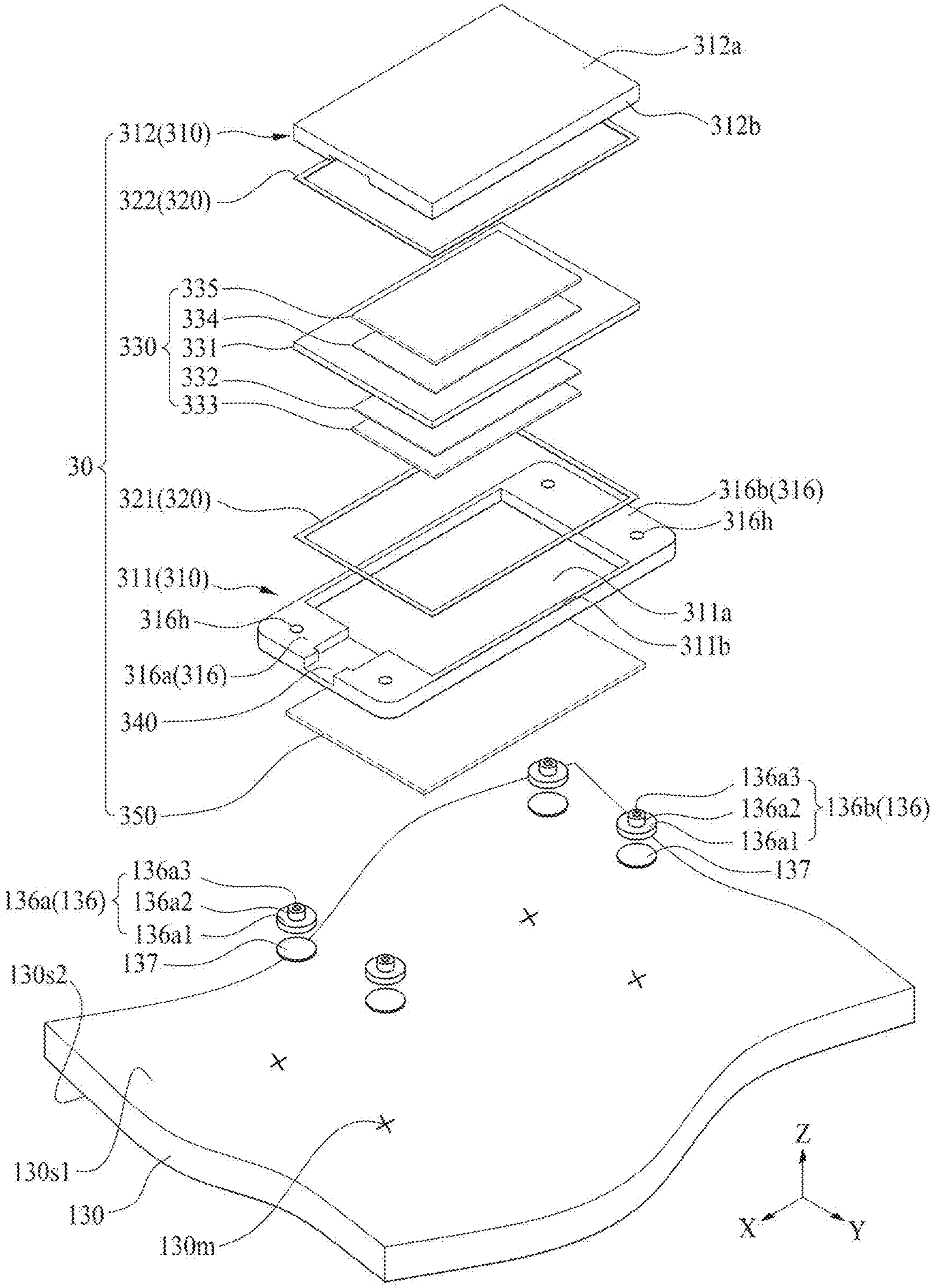
FIG. 9 is an exploded perspective view of a sound apparatus for a vehicle illustrated in FIG. 7 according to another embodiment of the present disclosure.

FIG. 7 illustrates a sound apparatus for a vehicle and a vehicular apparatus including the same according to another embodiment of the present disclosure. FIG. 8 is a cross-sectional view taken along line III-III' illustrated in FIG. 7 according to another embodiment of the present disclosure. FIG. 9 is an exploded perspective view of a sound apparatus for a vehicle illustrated in FIG. 7 according to another embodiment of the present disclosure.

With reference to FIGS. 7 to 9, a sound apparatus for a vehicle and a vehicular apparatus including the same according to another embodiment of the present disclosure can include a vehicle structure, a supporting part 136, and a sound apparatus 30.

The vehicle structure can include the main structure 110, the exterior material 120, and the interior material 130 of the vehicle 10 illustrated in FIG. 1 or 2. The main structure 110, the exterior material 120, and the interior material 130 are substantially the same as that of described with reference to FIG. 1 or 2, and thus, repeated descriptions can be omitted. Hereinafter, in describing embodiments of the present disclosure, for convenience of description, an example where a vehicle structure is an interior material 130 of a vehicle will be described, but embodiments of the present disclosure are not limited thereto. For example, in the following descriptions of embodiments of the present disclosure, a vehicle interior material can be replaced with the main structure 110 or the exterior material 120 of the vehicle 10 illustrated in FIG. 1 or 2.

The supporting part 136 can be configured at the vehicle interior material 130 to support (or fix) the sound apparatus 30. The supporting part 136 can be configured (or interposed) between the vehicle structure and the sound apparatus 30 to support (or fix) the sound apparatus 30. Accordingly, the supporting part 136 can be occluded or concealed by the vehicle interior material 130 together with the connection member 350 and the sound apparatus 30. Further, the supporting part 136 can be fully (or completely) occluded or fully (or completely) concealed by the vehicle interior material 130 together with the connection member 350 and the sound apparatus 30.

The supporting part 136 can be coupled (or attached) to a first surface 130*s*1 of the vehicle interior material 130 to support (or fix) the sound apparatus 30. For example, the supporting part 136 can be coupled (or attached) to the first surface 130*s*1 of the vehicle interior material 130 by an attachment member 137. For example, the supporting part 136 can be a supporting structure, a supporting means, or a boss member, but embodiments of the present disclosure are not limited thereto. For example, the attachment member 137 can be a double-sided tape, an adhesive, a double-sided adhesive, or a bond, but embodiments of the present disclosure are not limited thereto.

The supporting part 136 according to an embodiment of the present disclosure can include one or more first supporting members 136*a* and one or more second supporting members 136*b*. For example, the supporting part 136 can include two (a pair of) first supporting members 136*a* and two (or a pair of) second supporting members 136*b*, but embodiments of the present disclosure are not limited thereto. For example, each of the first supporting member 136*a* and the second supporting members 136*b* can be a bracket, a supporting bracket, a screw fastening member, a screw bracket, a nut member, or a nut bracket, but embodiments of the present disclosure are not limited thereto. For example, each of the first supporting member 136*a* and the second supporting members 136*b* can include one or more materials of a metal, wood, plastic, and carbon, but embodiments of the present disclosure are not limited thereto.

One or more first supporting members 136*a* can be coupled (or attached) to the first surface 130*s*1 of the vehicle interior material 130 overlapping a first periphery portion of the sound apparatus 30 or a first periphery portion of an enclosure 310. The one or more first supporting members 136*a* can be coupled (or attached) to a predetermined first region (or one region or left region) of the first surface 130*s*1 of the vehicle interior material 130. For example, the one or more first supporting members 136*a* can be coupled (or attached) to the first region of the first surface 130*s*1 of the vehicle interior material 130 by the attachment member 137. The one or more first supporting members 136*a* can be coupled (or attached) to one align mark 130*m* formed at the first region of the first surface 130*s*1 of the vehicle interior material 130. For example, the one or more first supporting members 136*a* can be coupled (or attached) to the align mark 130*m* by an attachment process using the attachment member 137. For example, the align mark 130*m* can align positions of the one or more first supporting member 136*a*. For example, the align mark 130*m* can be configured based on the number of first supporting members 136*a*.

Each of the two first supporting members 136*a* according to another embodiment of the present disclosure can be coupled (or attached) to the predetermined first region of the first surface 130*s*1 of the vehicle interior material 130 so as to be spaced apart from each other along a second direction Y. Each of the two first supporting members 136*a* can be coupled (or attached) to the first region of the first surface 130*s*1 of the vehicle interior material 130 by the attachment member 137. For example, each of the two first supporting members 136*a* can be coupled (or attached) to each of two align mark 130*m* formed at the first region of the first surface 130*s*1 of the vehicle interior material 130.

One or more second supporting members 136*b* can be spaced apart from one or more first supporting members 136*a* along the first direction X. The one or more second supporting members 136*b* can be coupled (or attached) to a second periphery portion, which is opposite to the first periphery portion, of the sound apparatus 30 or the first surface 130*s*1 of the vehicle interior material 130 overlapping a second periphery portion of the enclosure 310. The one or more second supporting members 136*b* can be coupled (or attached) to a predetermined second region (or the other region or right region) of the first surface 130*s*1 of the vehicle interior material 130. For example, the one or more second supporting members 136*b* can be coupled (or attached) to the second region of the first surface 130*s*1 of the vehicle interior material 130 by the attachment member 137. For example, the one or more second supporting members 136*b* can be coupled (or attached) to one align mark 130*m* formed at the second region of the first surface 130*s*1 of the vehicle interior material 130. For example, the one or more second supporting members 136*b* can be coupled (or attached) to the align mark 130*m* by an attachment process using the attachment member 137. For example, the align mark 130*m* can align positions of the one or more second supporting member 136*b*. For example, the align mark 130*m* can be configured based on the number of second supporting members 136*b*.

Each of the two second supporting members 136*b* can be spaced apart from each of the two first supporting members 136*a* along a first direction X. Each of the two second supporting members **136*b* according to another embodiment of the present disclosure can be coupled (or attached) to the predetermined second region of the first surface 130*s*1 of the vehicle interior material 130 so as to be spaced apart from each other along a second direction Y. Each of the two second supporting members 136*b* can be coupled (or attached) to the second region of the first surface 130*s*1 of the vehicle interior material 130 by the attachment member 137. For example, each of the two second supporting members 136*b* can be coupled (or attached) to each of two align mark 130*m* formed at the second region of the first surface 130*s*1 of the vehicle interior material 130**.

Each of the one or more first supporting members **136*a* and the one or more second supporting members 136*b* can be coupled (or attached) to the first surface 130*s*1 of the vehicle interior material 130 after position alignment based on the align mark 130*m*, and thus, a process of coupling (or attaching) each of the one or more first supporting members 136*a* and the one or more second supporting members 136*b* to the vehicle interior material 130 can be easily performed, thereby enhancing productivity of the sound apparatus 30**.

Each of the one or more first supporting members **136*a* and the one or more second supporting members 136*b* can include a prop portion 136*al* and a pillar portion 136*a*2**.

The prop portion **136*al* can include a plate shape. The prop portion 136*al* can have a certain size. For example, the prop portion 136*al* can be a plate having a circular shape, an oval shape, or a polygonal shape, but embodiments of the present disclosure are not limited thereto. The prop portions 136*al* can be coupled (or attached) to the first surface 130*s*1 of the vehicle interior material 130 by an attachment member 137. For example, the prop portion 136*al*** can be a prop frame, a supporting plate, a base frame, a base member, or a base plate, but embodiments of the present disclosure are not limited thereto.

The pillar portion **136*a*2 can be vertically connected (or coupled) to the prop portion 136*a*1. The pillar portion 136*a*2 can be configured to have a certain length (or height) from the prop portion 136*al* along a third direction Z. For example, the pillar portion 136*a*2 can be a pillar having a circular shape, an oval shape, or a polygonal shape, but embodiments of the present disclosure are not limited thereto. The pillar portion 136*a*2 and the prop 136*al* can be configured as one body or an integration type. For example, the pillar portion 136*a*2 can vertically protrude (or extend) to have a certain length (or height) from the prop portion 136*al*** along the third direction Z.

The pillar portion **136*a*2 can include a screw hole 136*a*3 including a screw thread. The screw hole 136*a*3 can be formed to pass through a center portion of each of the pillar portion 136*a*2 and the prop portion 136*al* along the third direction Z. For example, each of the one or more first supporting members 136*a* and the one or more second supporting members 136*b* can include a hollow hole passing through the center portion of each of the pillar portion 136*a*2 and the prop portion 136*a*1, and the screw hole 136*a*3** can be formed at an inner surface of the hollow hole.

According to an embodiment of the present disclosure, the screw hole **136*a*3 or the hollow hole can be used to align positions of the supporting members 136*a* and 136*b* at the align mark 130*m* in the vehicle interior material 130 when coupling (or attaching) the supporting members 136*a* and 136*b* to the vehicle interior material 130, and thus, the supporting members 136*a* and 136*b* can be more accurately attached on a predetermined position of the first surface 130*s*1 of the vehicle interior material 130**.

The sound apparatus 30 according to another embodiment of the present disclosure can be coupled (or fixed) to the supporting part 136 and can be configured to vibrate the vehicle interior material 130. For example, the sound apparatus 30 can be coupled (or fixed) to the supporting part 136 so as to contact (or connect) the first surface **130*s*1 of the vehicle interior material 130 and can vibrate the vehicle interior material 130** to output a sound.

The sound apparatus for a vehicle and the vehicular apparatus including the same according to an embodiment of the present disclosure can further include a fixing part 316. For example, the enclosure 310 or the sound apparatus 30 can include the fixing part 316 coupled (or fixed) to the supporting part 136. In the sound apparatus 30 according to another embodiment of the present disclosure, the other elements except the fixing part 316 and relevant elements can be substantially the same as the sound apparatus 30 described above with reference to FIGS. 3 to 6, and thus, the other elements except the fixing part 316 and relevant elements are referred to by like reference numerals, and repeated descriptions can be omitted or will be briefly given below.

The sound apparatus 30 can include an enclosure 310 and a sound generating module 330. The enclosure 310 can include a first enclosure 311 and a second enclosure 312.

The first enclosure 311 can include a plate **311*a* and a sidewall portion 311*b*. The second enclosure 312 can include a plate 312*a* and a sidewall portion 312*b*. The first enclosure 311 can be configured to include the fixing part 316. The first enclosure 311 can have a size which is greater than that of the second enclosure 312, based on (or due to) the fixing part 316**.

The sound generating module 330 according to an embodiment of the present disclosure can include a vibration apparatus and a vibration member 331. The sound generating module 330 including the vibration apparatus and the vibration member 331 can be substantially the same as the sound generating module 330 described above with reference to FIGS. 3 and 4, and thus, repeated descriptions can be omitted. Descriptions of the sound generating module 330 illustrated in FIGS. 3 and 4 can be included in the descriptions of the sound generating module 330 illustrated in FIGS. 7 to 9.

The fixing part 316 can be configured at the enclosure 310 to correspond to the supporting part 136. The fixing part 316 can be configured at the first enclosure 311 of the enclosure 310 to correspond to the supporting part 136. The fixing part 316 can be configured at both periphery portions of the first enclosure 311. For example, the fixing part 316 can be configured at a first periphery portion, which is adjacent to a first short side, of the first enclosure 311 and a second periphery portion, which is adjacent to a second short side, of the first enclosure 311.

The fixing part 316 can be configured at the enclosure 310 so as to be fixed (or coupled) to the supporting part 136 by a fastening member 160. For example, the fixing part 316 can be configured at the first enclosure 311 of the enclosure 310 so as to be fixed (or coupled) to the supporting part 136 which is fixed (or attached) to the vehicle interior material 130 by the fastening member 160. For example, the fastening member 160 can be fastened to the supporting part 136 through a hole **316*h* formed at the fixing part 316. For example, the fixing part 316 can be a connection part or a fastening part, but embodiments of the present disclosure are not limited thereto. For example, the fastening member 160** can be a screw or a bolt, but embodiments of the present disclosure are not limited thereto.

The fixing part 316 according to another embodiment of the present disclosure can be occluded or concealed by the vehicle interior material 130 together with the connection member 350 and the sound apparatus 30. For example, the fixing part 316 can be fully (or completely) occluded or fully (or completely) concealed by the vehicle interior material 130 together with the connection member 350 and the sound apparatus 30. The fixing part 316 can include a first fixing part 316*a* and a second fixing part 316*b*.

The first fixing part 316*a* can be configured at a first side of the first enclosure 311. The first fixing part 316*a* can be configured at a plate 311*a* and a first side of a sidewall portion 311*b* of the first enclosure 311. For example, the first fixing part 316*a* can extend (or protrude) to have a certain length along the first direction X from the plate 311*a* and the first side of the sidewall portion 311*b* of the first enclosure 311. For example, the first fixing part 316*a* can extend (or protrude) to have a certain length along the first direction X from a first short side of the first enclosure 311. The first fixing part 316*a* can be provided as one body with the first side of the first enclosure 311. The first fixing part 316*a* and the first side of the first enclosure 311 can be configured as one body or an integration type.

The second fixing part 316*b* can be configured at a second side, which is opposite to the first side, of the first enclosure 311. The second fixing part 316*b* can be configured at the plate 311*a* and the second side of the sidewall portion 311*b* of the first enclosure 311. For example, the second fixing part 316*b* can extend (or protrude) to have a certain length along the first direction X from the plate 311*a* and the second side of the sidewall portion 311*b* of the first enclosure 311. For example, the second fixing part 316*b* can extend (or protrude) to have a certain length along the first direction X from a second short side of the first enclosure 311. The second fixing part 316*b* can be provided as one body with the second side of the first enclosure 311. The second fixing part 316*b* and the second side of the first enclosure 311 can be configured as one body or an integration type.

According to an embodiment of the present disclosure, the first fixing part 316*a* can be a first periphery portion of the first enclosure 311 adjacent to the first short side of the first enclosure 311. The second fixing part 316*b* can be a second periphery portion of the first enclosure 311 adjacent to the second short side of the first enclosure 311. Accordingly, the first and second periphery portions of the first enclosure 311 can pass through a short side of a vibration member 331 or a short side of the second enclosure 312 and can extend (or protrude) along the first direction X. The first enclosure 311 can have a size which is greater than that of each of the vibration member 331 and the second enclosure 312 by the first and second periphery portions. For example, with respect to the second direction Y, a short-side length of the first enclosure 311 can be equal to a short-side length of each of the vibration member 331 and the second enclosure 312. With respect to the first direction X, a long-side length of the first enclosure 311 can be greater than a long-side length of each of the vibration member 331 and the second enclosure 312.

The first fixing part 316*a* can be coupled to the first supporting member 136*a* coupled to the vehicle interior material 130 to overlap the first periphery portion of the first enclosure 311. The first fixing part 316*a* can be supported by or fixed to the first supporting member 136*a* by a fastening member (or a first fastening member) 160. The fastening member (or the first fastening member) 160 can pass through (or via) each of two holes 316*h* provided at the first fixing part 316*a* and can be fastened to each of the screw hole 136*a*3 at two first supporting member 136*a*, and thus, the first fixing part 316*a* can be supported by or fixed to each of the two first supporting member 136*a* by the fastening member 160 which is fastened to the screw hole 136*a*3 of the two first supporting member 136*a*. For example, the fastening member 160 can be fastened to the screw hole 136*a*3 of each of the two first supporting members 136*a* through the hole 316*h* formed at each of the two first supporting members 136*a*. Accordingly, each of the two first supporting members 136*a* can be disposed or interposed between the vehicle interior material 130 and the first fixing part 316*a* or between the vehicle interior material 130 and the first periphery portion of the first enclosure 311. For example, each of the two first supporting members 136*a* can support or fix each corner portion of the first periphery portion of the first enclosure 311.

The second fixing part 316*b* can be coupled to the second supporting member 136*b* coupled to the vehicle interior material 130 to overlap the second periphery portion of the first enclosure 311. The second fixing part 316*b* can be supported by or fixed to the second supporting member 136*b* by a fastening member (or a second fastening member) 160. The fastening member (or the second fastening member) 160 can pass through (or via) each of two holes 316*h* provided at the second fixing part 316*b* and can be fastened to each of the screw hole 136*a*3 at two second supporting member 136*b*, and thus, the second fixing part 316*b* can be supported by or fixed to each of the two second supporting member 136*b* by the fastening member 160 which is fastened to the screw hole 136*a*3 of the two second supporting member 136*b*. For example, the fastening member 160 can be fastened to the screw hole 136*a*3 of each of the two second supporting members 136*b* through the hole 316*h* formed at each of the two second supporting members 136*b*. Accordingly, each of the two second supporting members 136*b* can be disposed or interposed between the vehicle interior material 130 and the second fixing part 316*b* or between the vehicle interior material 130 and the second periphery portion of the first enclosure 311. For example, each of the two second supporting members 136*b* can support or fix each corner portion of the second periphery portion of the first enclosure 311.

According to an embodiment of the present disclosure, four fastening members 160 can be fastened to four supporting members 136*a* and 136*b* coupled (or attached) to the vehicle interior material 130 through the four fixing parts 316*a* and 316*b* respectively configured at corner portions of the first enclosure 311, and thus, the sound apparatus 30 can be supported (or fixed) to the four supporting members 136*a* and 136*b* and can be connected (or coupled or contact) the first surface 130*s*1 of the vehicle interior material 130.

According to an embodiment of the present disclosure, the fixing part 315 configured at the enclosure 310 or the first enclosure 311 can be supported by (or fixed to) the supporting part 136 of the vehicle interior material 130 by the fastening member 160, and thus, the sound apparatus 30 or the enclosure 310 can be supported by (or fixed to) the vehicle interior material 130 by the supporting part 136 and can be connected (or coupled) to the vehicle interior material 130. For example, the enclosure 310 or the first enclosure 311 can be pressed by a fastening force of the fastening member 160 fastened to the supporting part 136 which is coupled (or attached) to the vehicle interior material 130 and can be connected to (or coupled or contact) the first surface 130*s*1 of the vehicle interior material 130. Accordingly, a process of attaching or mounting the sound apparatus 30 on the vehicle interior material 130 and/or a process of separating or detaching the sound apparatus 30 on the vehicle interior material 130 can be easily performed.

According to an embodiment of the present disclosure, in a state where the enclosure 310 is supported by (or fixed to) the supporting part 136 by the fastening member 160 and is connected (or coupled) to the first surface 130*s*1 of the vehicle interior material 130, the sound generating module 330 can generate a sound pressure level (or sound or sound wave) at an internal space 313 of the enclosure 310 to vibrate the first enclosure 311 and can vibrate the vehicle interior material 130 to output (or generate) a sound, based on a vibration of the first enclosure 311.

The sound apparatus 30 or the vehicular apparatus according to another embodiment of the present disclosure can further include a connection member 350 disposed or interposed between the vehicle interior material 130 and the sound apparatus 30. The connection member 350 can be configured to transfer a vibration of the sound apparatus 30 to the vehicle interior material 130. Accordingly, the vehicle interior material 130 in contact with the connection member 350 can vibrate based on the vibration of the sound apparatus 30 transferred through the connection member 350 to output sound. The connection member 350 can be substantially the same as the connection member described above with reference to FIGS. 3 and 4, and thus, repeated descriptions can be omitted.

The sound apparatus 30 or the vehicular apparatus according to another embodiment of the present disclosure can further include a plurality of accommodating grooves 316*g*.

The plurality of accommodating grooves 316*g* can be configured at the fixing part 316 to accommodate the supporting part 136. For example, the plurality of accommodating grooves 316*g* can be configured to be concave from a rear surface of the fixing part 316 to accommodate the supporting part 136. The plurality of accommodating grooves 316*g* can be configured to have a size and a shape which enables the supporting part 136 to be accommodated (or inserted). For example, with respect to the third direction Z, a length of each of the plurality of accommodating grooves 316*g* can be shorter than that of the supporting part 136.

The plurality of accommodating grooves 316*g* according to an embodiment of the present disclosure can be respectively configured at the first and second fixing parts 316*a* and 316*b* to respectively accommodate the one or more first supporting members 136*a* and the one or more second supporting members 136*b*. Therefore, the one or more first supporting members 136*a* and the one or more second supporting members 136*b* can be respectively inserted into the plurality of accommodating grooves 316*g* and can respectively support (or fix) the first and second fixing parts 316*a* and 316*b* by the fastening member 160. In a case where the sound apparatus 30 is coupled (or fixed) to the supporting part 136 through the fastening member 160, because the supporting part 136 is accommodated into the accommodating groove 316*g*, an alignment process between the fixing part 316 and the supporting part 136 can be omitted, and thus, productivity of the sound apparatus 30 can increase.

The sound apparatus 30 according to another embodiment of the present disclosure can further include a line part 340.

The line part 340 can be configured at one lateral surface (or one surface) of the sound apparatus 30. The line part 340 can be configured at one lateral surface (or one surface) of the enclosure 310. For example, the line part 340 can be configured at one lateral surface (or one surface) of each of the first enclosure 311 and the second enclosure 312 of the enclosure 310. For example, the line part 340 can be concavely configured at one periphery portion of the first enclosure 311 or a portion of the first fixing part 316*a*. For example, the line part 340 can be configured to horizontally pass through the one lateral surface (or one surface) of each of the first enclosure 311 and the second enclosure 312 along the first direction X. For example, the line part 340 can be configured to horizontally pass through a portion of each of the sidewall portion 311*b* of the first enclosure 311 and the sidewall portion 312*b* of the second enclosure 312. The line part 340 can be connected (or connect) to the internal space 313 of the enclosure 310. The line part 340 can be a lead-out (or an unload) groove or a lead-out (or an unload) hole of the signal cable connected to each of the first and second vibration apparatuses 333 and 335.

The sound apparatus for a vehicle and the vehicular apparatus including the same according to another embodiment of the present disclosure can vibrate at least a portion of a vehicle structure to generate (or output) a sound, based on driving (or vibration or displacement) of the sound apparatus 30 which is connected (or coupled or contact) to the at least a portion of the vehicle structure and is supported (or fixed) to the vehicle structure by the fastening member 150 and the supporting part 136, and thus, a sound characteristic and/or a sound pressure level characteristic of a sound band including a low-pitched sound band generated by driving (or vibration or displacement) of the sound apparatus 30 can be enhanced.

In the sound apparatus for a vehicle and the vehicular apparatus including the same according to an embodiment of the present disclosure, the sound apparatus 30 can be supported by (or fixed to) the supporting part 136 which is coupled (or attached) to the vehicle structure by the fastening member 150 such as a screw or the like, and can be connected (or coupled) to the vehicle structure, and thus, a process of attaching or mounting the sound apparatus 30 on the vehicle interior material 130 and/or a process of separating or detaching the sound apparatus 30 on the vehicle interior material 130 can be easily performed.

Figure 10:
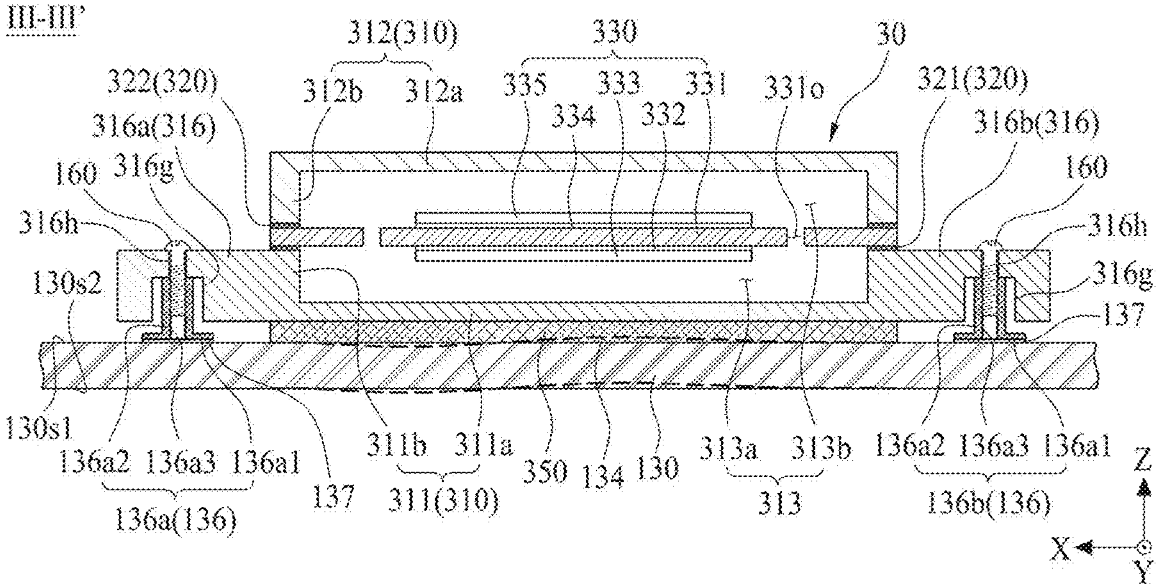
FIG. 10 is another cross-sectional view taken along line III-III' illustrated in FIG. 7 according to another embodiment of the present disclosure.

FIG. 10 is another cross-sectional view taken along line III-III' illustrated in FIG. 7 according to another embodiment of the present disclosure. FIG. 10 illustrates an embodiment where at least one hole 3310 is additionally configured in the sound apparatus 30 described above with reference to FIGS. 7 to 10. In the following description, therefore, at least one hole will be described in detail, the other elements can be substantially the same as those described above with reference to FIGS. 7 to 9, and thus, like reference numerals refer to like elements and repeated descriptions can be omitted or will be briefly given below.

Referring to FIG. 10, the sound apparatus 30 for a vehicle and the vehicular apparatus including the same according to another embodiment of the present disclosure can include at least one or more holes 3310. For example, the sound apparatus 30 according to another embodiment of the present disclosure can further include at least one or more holes 3310.

The at least one or more holes 3310 can be configured at a vibration member 331. The at least one or more holes 3310 can be configured to pass through the vibration member 331. The at least one or more holes 3310 can be configured to pass through the vibration member 331 in a thickness direction Z of the vibration member 331.

The at least one or more holes 3310 can be configured to adjust a flow of air in an internal space 313 of the enclosure 310. For example, the at least one or more holes 3310 can perform control so that air flows in the internal spaces 313 of the enclosure 310 spatially separated from each other by the vibration member 331. For example, the at least one or more holes 3310 can be configured to adjust air flow between a first space 313*a* and a second space 313*b* spatially separated from each other by the vibration member 331 in the internal space 313 of the enclosure 310. For example, the at least one or more holes 3310 can be a first hole, a vent hole, an air flow hole, a ventilation hole, a duct hole, a first connection hole, a first communication hole, or a first space connection part, but embodiments of the present disclosure are not limited thereto.

The at least one or more holes 3310 according to an embodiment of the present disclosure can be configured in a polygonal shape such as a circular shape, an oval shape, or a tetragonal shape, but embodiments of the present disclosure are not limited thereto.

The at least one or more holes 3310 can be configured to decrease an air pressure of the internal space 313 of the enclosure 310. For example, the at least one or more holes 3310 can be configured to connect, with each other, the first space 313*a* and the second space 313*b* spatially separated from each other by the vibration member 331, in the internal space 313 of the enclosure 310. For example, the first space 313*a* and the second space 313*b* of the internal space 313 in the enclosure 310 can be connected to (or connect with) each other through the at least one or more holes 3310. For example, the at least one or more holes 3310 can be configured to decrease an air pressure of the first space 313*a* of the first enclosure 311 or the first space 313*a* provided between the vibration member 331 and the first enclosure 311. Accordingly, a band (reproduction band) of a low-pitched sound band can expand, and thus, a sound characteristic and/or a sound pressure level characteristic of the low-pitched sound band can be improved. Further, the sound generating module 330 can be more stably vibrated by the at least one or more holes 3310 in the vibration member 331, and thus, a sound characteristic and/or a sound pressure level characteristic can be further improved.

According to an embodiment of the present disclosure, the internal space 313 can be connected to an opening part between a first surface of the sound generating module 330 and the first enclosure 311. The enclosure 311 can include the second space 313*b* between the second enclosure 312 and a second surface, which is opposite to the first surface, of the sound generating module 330. The internal space 313 and the second space 313*b* can be connected to (or connect with or communicate with) each other through the at least one or more holes 3310.

According to an embodiment of the present disclosure, the at least one or more holes 331*o* can be disposed adjacent to vibration apparatuses 333 and 335. For example, the at least one or more holes 3310 can be disposed at a periphery of each of the vibration apparatuses 333 and 335. For example, the at least one or more holes 3310 can be disposed adjacent to a lateral surface of each of the vibration apparatuses 333 and 335. For example, a distance between the at least one or more holes 3310 and each of the vibration apparatuses 333 and 335 can be smaller than a distance between the at least one or more holes 3310 and sidewall portions 311*b* and 312*b* of the enclosure 310. For example, when the at least one or more holes 3310 is disposed at a position farther away from each of the vibration apparatuses 333 and 335, a sound characteristic and/or a sound pressure level characteristic of a low-pitched sound band can be decreased.

According to an embodiment of the present disclosure, the at least one or more holes 331*o* can be configured at the vibration member 331 adjacent to the vibration apparatuses 333 and 335 with the vibration apparatuses 333 and 335 therebetween. For example, the vibration member 331 can include a first periphery region adjacent a first lateral surface of each of the vibration apparatuses 333 and 335 and a second periphery region, which is opposite to a second side opposite to a first side, of each of the vibration apparatuses 333 and 335. For example, with respect to a first direction X, the vibration member 331 can include the first periphery region, a vibration region, and the second periphery region. For example, in the vibration member 331, each of the first and second periphery regions can be a hole region or a non-arrangement region of each of the vibration apparatuses 333 and 335, and the vibration region can be an arrangement (or a disposition) region of the vibration apparatuses 333 and 335. For example, the at least one or more holes 3310 can be configured in each of the first periphery region and the second periphery region of the vibration member 331 to have a symmetric structure (or a horizontal symmetric structure or a left-right symmetric structure) or an asymmetric structure (or horizontal asymmetric structure or a left-right asymmetric structure), with respect to the vibration apparatuses 333 and 335.

According to an embodiment of the present disclosure, a distance (or separation distance or shortest distance) between the at least one or more holes 3310 and the short side of the vibration apparatuses 333 and 335 can represent a ratio of a short-side length of the vibration apparatuses 333 and 335. According to an embodiment of the present disclosure, a distance between the at least one or more holes 3310 and the vibration apparatuses 333 and 335 can be 60% or less of the short-side length of the vibration apparatuses 333 and 335.

The at least one or more holes 3310 can be disposed closer to the vibration apparatuses 333 and 335 than a coupling member 320. The coupling member 320 can include a first coupling member 321 and a second coupling member 322. For example, the at least one or more holes 3310 can be disposed closer to the vibration apparatuses 333 and 335 than the first coupling member 321 and the second coupling member 322. Accordingly, a sound characteristic and/or a sound pressure level characteristic of a low-pitched sound band can be enhanced. For example, a sound characteristic and/or a sound pressure level characteristic of a low-pitched sound band, for example, 400 Hz or less can be further enhanced by at least one or more holes 3310 at the vibration member 331.

The at least one or more holes 3310 described above with reference to FIG. 10 can be identically applied to the sound apparatus 30 described above with reference to FIGS. 3 to 6. For example, the sound apparatus 30 illustrated in FIGS. 3 to 6 can include at least one or more holes 331*o* configured at the vibration member 331 adjacent to the vibration apparatuses 333 and 335 with the vibration apparatuses 333 and 335 therebetween. Therefore, descriptions of the at least one or more holes illustrated in FIG. 10 can be included in the descriptions of the sound apparatus 30 illustrated in FIGS. 3 to 6.

Figure 11:
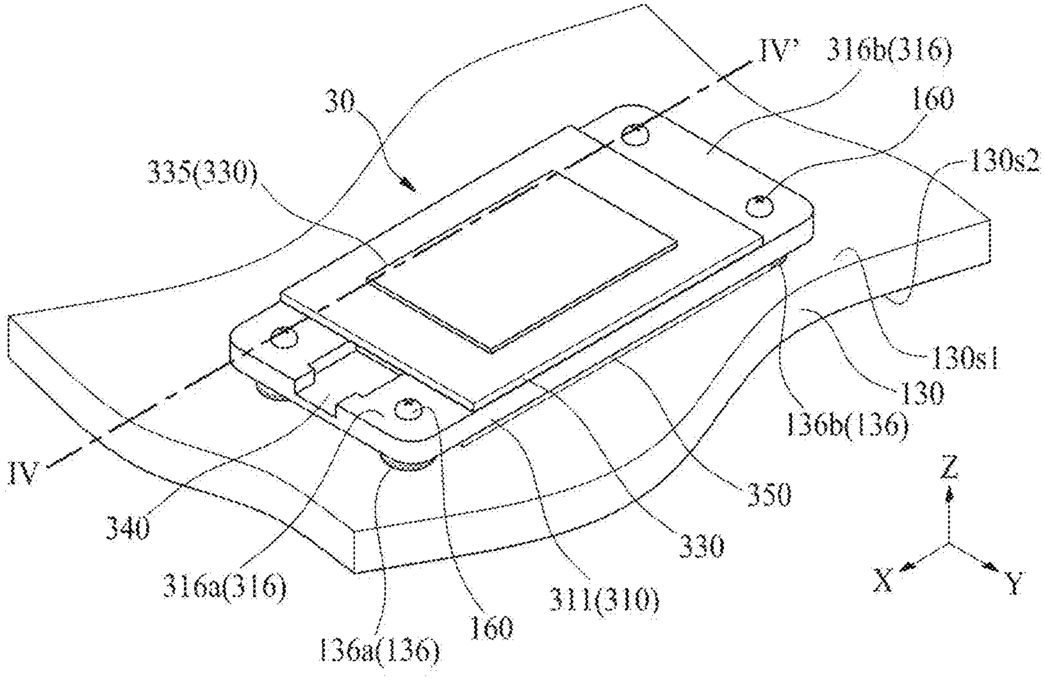
FIG. 11 illustrates a sound apparatus for a vehicle and a vehicular apparatus including the same according to another embodiment of the present disclosure.
Figure 12:
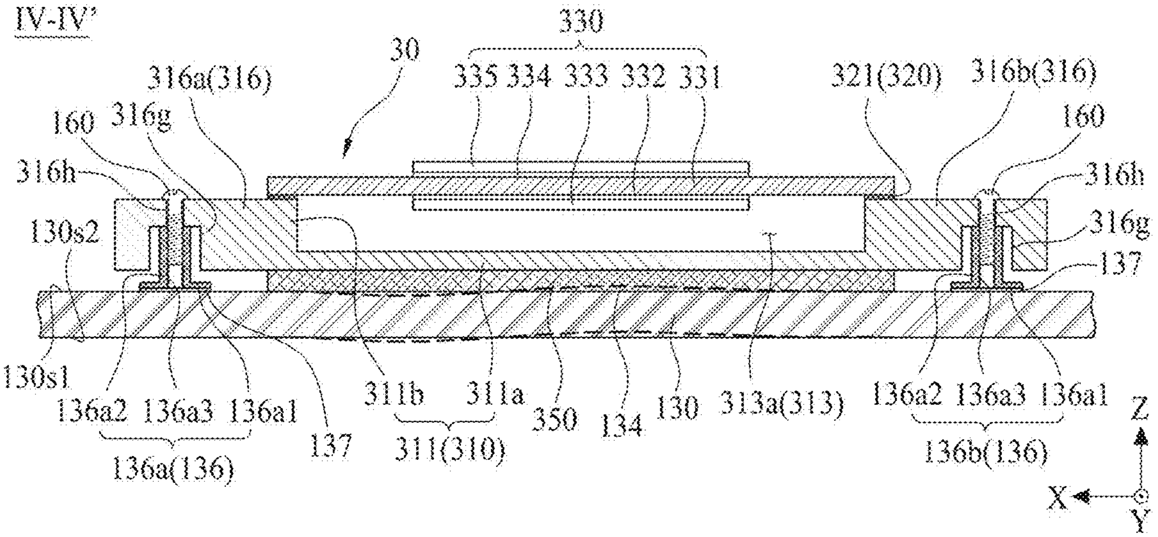
FIG. 12 is a cross-sectional view taken along line IV-IV' illustrated in FIG. 11 according to another embodiment of the present disclosure.

FIG. 11 illustrates a sound apparatus for a vehicle and a vehicular apparatus including the same according to another embodiment of the present disclosure. FIG. 12 is a cross-sectional view taken along line IV-IV' illustrated in FIG. 11 according to another embodiment of the present disclosure. FIGS. 11 and 12 illustrate an embodiment implemented by modifying an enclosure 310 in the sound apparatus described above with reference to FIGS. 7 to 9. In the following description, therefore, an enclosure will be described in detail, the other elements can be substantially the same as those described above with reference to FIGS. 7 to 9, and thus, like reference numerals refer to like elements and repeated descriptions can be omitted or will be briefly given below.

With reference to FIGS. 11 and 12, in the sound apparatus for a vehicle and the vehicular apparatus including the same according to another embodiment of the present disclosure, the enclosure 310 can include a first enclosure 311. For example, the second enclosure 312 can be removed (or omitted) in the enclosure 310 described above with reference to FIGS. 3 to 10, and thus, the enclosure 310 can be configured with only the first enclosure 311.

The enclosure 310 or the first enclosure 311 can be connected to a sound generating module 330 with an internal space 313 therebetween. The enclosure 310 or the first enclosure 311 can be connected to a rear periphery portion of a vibration member 331 with the internal space 313 therebetween.

The vibration member 331 can be configured to cover the internal space 313 of the enclosure 310 or the first enclosure 311. For example, the vibration member 331 can be configured to cover a portion of the internal space 313 of the first enclosure 311. The vibration member 331 can be configured to cover the first space 313$a$ of the first enclosure 311. For example, the vibration member 331 can be configured to cover a portion of the first space 313$a$ of the first enclosure 311.

The sound apparatus 30 according to another embodiment of the present disclosure can further include a coupling member 320 or a first coupling member 321. The first coupling member 321 can be between the vibration member 331 and the first enclosure 311. A description of the first coupling member 321 can be substantially the same as the descriptions of FIGS. 3 and 4, and thus, like reference numerals refer to like elements and repeated descriptions can be omitted or will be briefly given below.

According to an embodiment of the present disclosure, in a case where the enclosure 310 is configured with the first enclosure 311, a sound characteristic and/or a sound pressure level characteristic of a sound apparatus 30 can be further enhanced than a case where the enclosure 310 is configured with the first enclosure 311 and the second enclosure 312. For example, in a case where the enclosure 310 is configured with the first enclosure 311, a sound characteristic and/or a sound pressure level characteristic of a middle-low-pitched sound band, for example, 2 kHz or less can be further enhanced, and a sound reproduction band can further expand.

The enclosure 310 described above with reference to FIGS. 11 and 12 can be substantially identically applied to the sound apparatus 30 described above with reference to FIGS. 5 and 6. For example, in the sound apparatus 30 illustrated in FIGS. 5 and 6, the enclosure 310 can be configured only with the first enclosure 311 from which the second enclosure 312 has been removed (or omitted). Therefore, descriptions of the enclosure 310 illustrated in FIGS. 11 and 12 can be included in the descriptions of the sound apparatus 30 illustrated in FIGS. 5 and 6.

Figure 13:
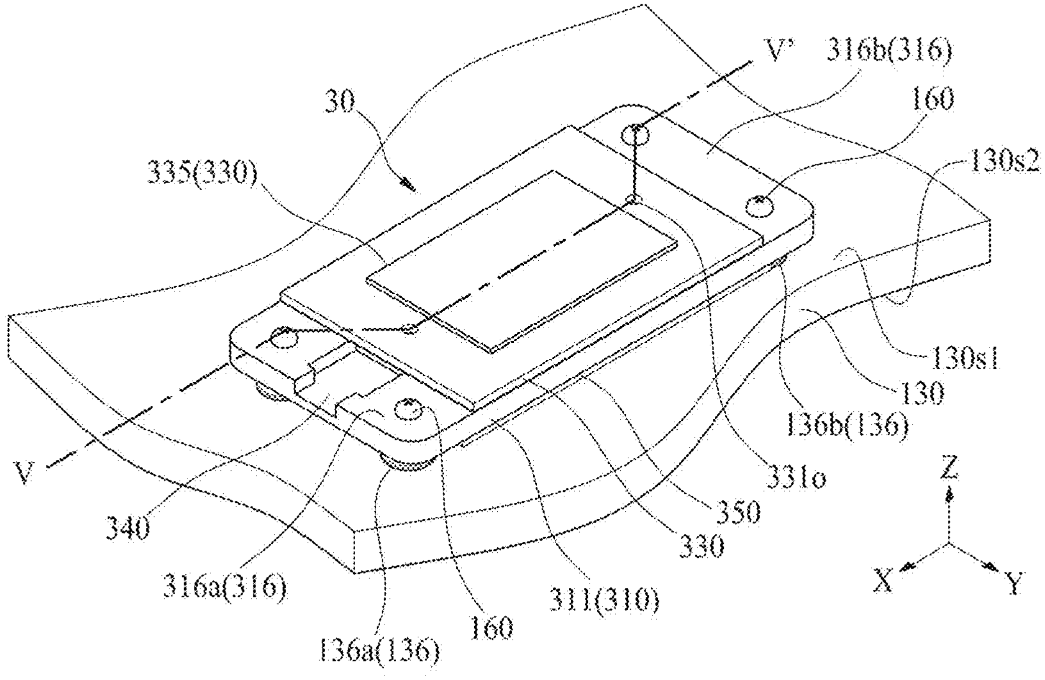
FIG. 13 illustrates a sound apparatus for a vehicle and a vehicular apparatus including the same according to another embodiment of the present disclosure.
Figure 14:
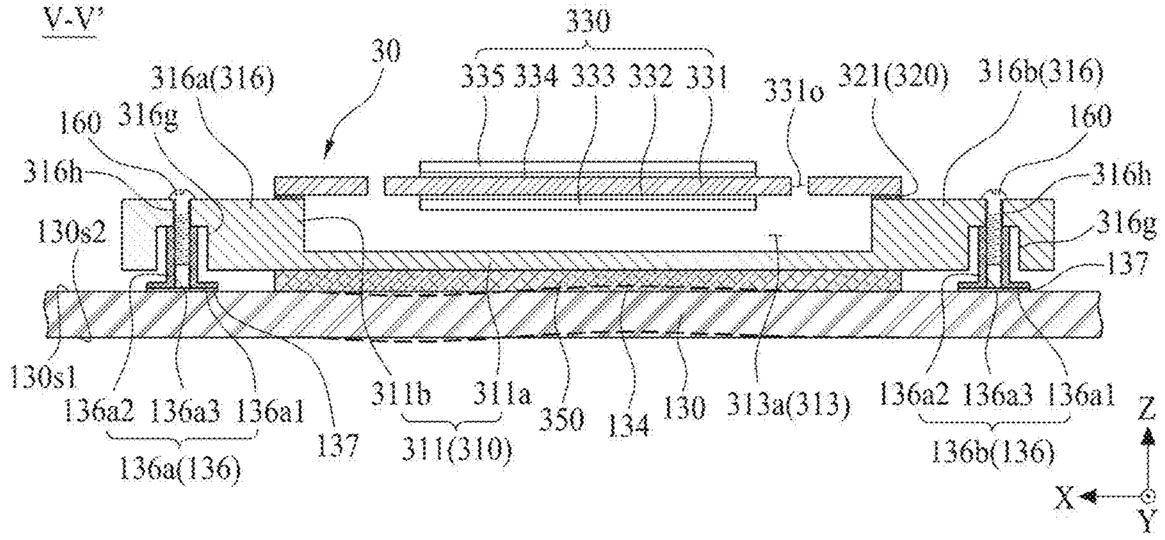
FIG. 14 is a cross-sectional view taken along line V-V' illustrated in FIG. 13 according to another embodiment of the present disclosure.

FIG. 13 illustrates a sound apparatus for a vehicle and a vehicular apparatus including the same according to another embodiment of the present disclosure. FIG. 14 is a cross-sectional view taken along line V-V' illustrated in FIG. 13 according to another embodiment of the present disclosure. FIGS. 13 and 14 illustrate an embodiment where at least one or more holes 3310 are additionally configured in the sound apparatus 30 described above with reference to FIGS. 11 and 12. In the following description, therefore, at least one or more holes will be described in detail, the other elements can be substantially the same as those described above with reference to FIGS. 7 to 12, and thus, like reference numerals refer to like elements and repeated descriptions can be omitted or will be briefly given below.

With reference to FIGS. 13 and 14, in the sound apparatus for a vehicle and the vehicular apparatus including the same according to another embodiment of the present disclosure, the sound apparatus 30 can further include at least one or more holes 3310.

The at least one or more holes 3310 can be configured at a vibration member 331. A description of the at least one or more holes 3310 can be substantially the same as descriptions above with reference to FIG. 10, and thus, like reference numerals refer to like elements and repeated descriptions are omitted or will be briefly given below.

According to another embodiment of the present disclosure, the sound apparatus 30 can include a first enclosure 311 and the at least one or more holes 3310, or can include the first enclosure 311. When the sound apparatus 30 includes the first enclosure 311 and the at least one or more holes 3310, a sound characteristic and/or a sound pressure level characteristic of each of a low-pitched sound band and a middle-pitched sound band can be further enhanced, and a sound reproduction band can further expand. When the sound apparatus 30 includes the first enclosure 311, a sound characteristic and/or a sound pressure level characteristic of a middle-low-pitched sound band can be further enhanced, and a sound reproduction band can further expand.

The sound apparatus 30 according to another embodiment of the present disclosure can further include the coupling member 320 or the first coupling member 321. The first coupling member 321 can be between the vibration member 331 and the first enclosure 311. A description of the first coupling member 321 can be substantially the same as the description of FIGS. 3 and 4, and thus, like reference numerals refer to like elements and repeated descriptions are omitted or will be briefly given below.

According to another embodiment of the present disclosure, because the sound apparatus 30 includes at least one or more of the first enclosure 311 and the at least one or more holes 3310, a sound characteristic and/or a sound pressure level characteristic of each of a low-pitched sound band and a middle-pitched sound band can be further enhanced, a sound reproduction band can expand.

At least one or more of the first enclosure 311 and the at least one or more holes 3310 described above with reference to FIGS. 13 and 14 can be identically applied to the sound apparatus 30 described above with reference to FIGS. 5 and 6. Therefore, descriptions of FIGS. 13 and 14 can be included in the descriptions of the sound apparatus 30 illustrated in FIGS. 5 and 6.

Figure 15:
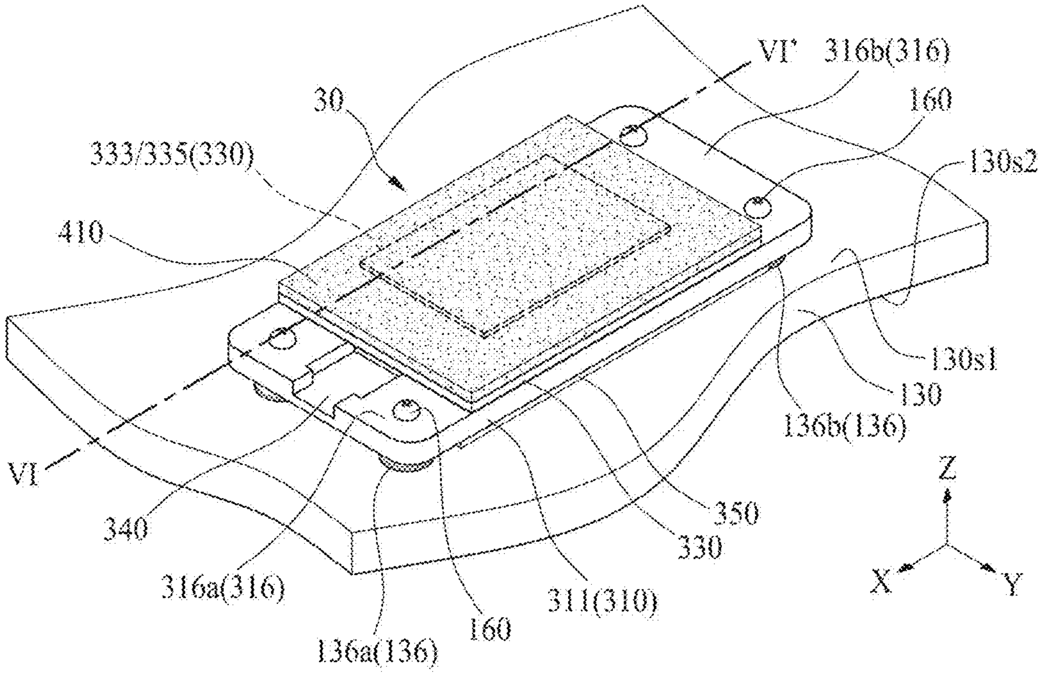
FIG. 15 illustrates a sound apparatus for a vehicle and a vehicular apparatus including the same according to another embodiment of the present disclosure.
Figure 16:
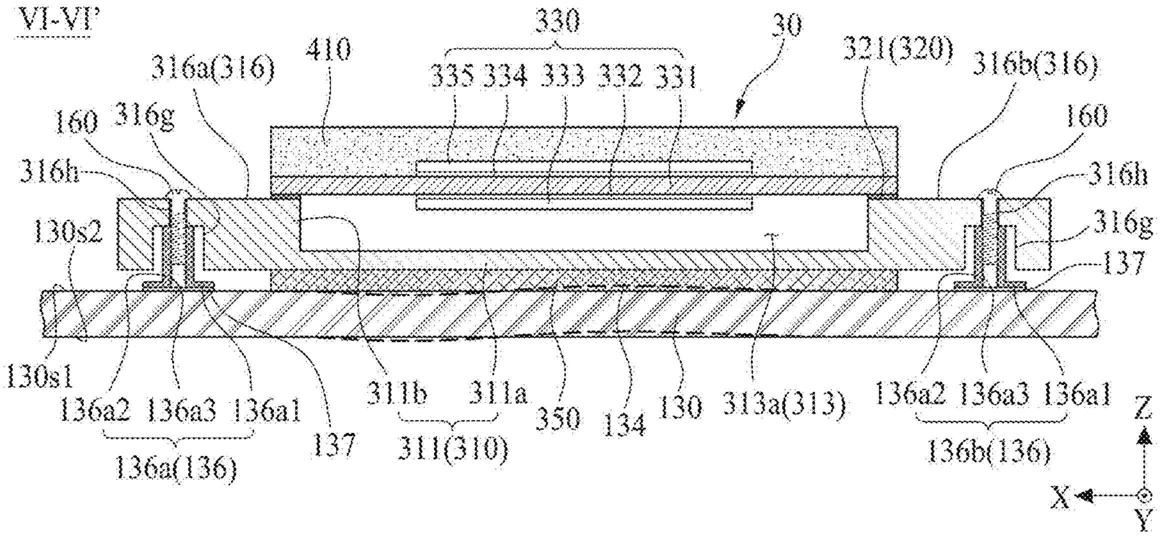
FIG. 16 is a cross-sectional view taken along line VI-VI' illustrated in FIG. 15 according to another embodiment of the present disclosure.

FIG. 15 illustrates a sound apparatus for a vehicle and a vehicular apparatus including the same according to another embodiment of the present disclosure. FIG. 16 is a cross-sectional view taken along line VI-VI' illustrated in FIG. 15 according to another embodiment of the present disclosure. FIGS. 15 and 16 illustrate an embodiment where a protection member is additionally configured in the sound apparatus 30 described above with reference to FIGS. 11 and 12. In the following description, therefore, the protection member will be described in detail, the other elements can be substantially the same as those described above with reference to FIGS. 7 to 12, and thus, like reference numerals refer to like elements and repeated descriptions can be omitted or will be briefly given below.

With reference to FIGS. 15 and 16, in the sound apparatus for a vehicle and the vehicular apparatus including the same according to another embodiment of the present disclosure, the sound apparatus 30 can further include a protection member 410.

The protection member 410 can be disposed at a sound generating module 330. For example, the protection member 410 can cover the sound generating module 330. For example, the protection member 410 can be disposed at a second vibration apparatus 335. For example, the protection member 410 can cover the second vibration apparatus 335.

The protection member 410 according to another embodiment of the present disclosure can include rubber or sponge, or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the protection member 410 can include rubber material, or can be configured in ethylene propylene diene rubber, ethylene propylene rubber, or urethane rubber. For example, the ethylene propylene rubber can be ethylene propylene diene monomer (EPDM), but embodiments of the present disclosure are not limited thereto.

According to an embodiment of the present disclosure, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, a minimum elongation rate of the EPDM can be 200%, but embodiments of the present disclosure are not limited thereto. For example, a use temperature of the EPDM can be −30° C. to 110° C., but embodiments of the present disclosure are not limited thereto. For example, the protection member 410 can be configured in high elastic rubber or low elastic rubber, but embodiments of the present disclosure are not limited thereto. For example, a thickness of the protection member 410 can be 0.5 mm to 2 mm, but embodiments of the present disclosure are not limited thereto.

According to an embodiment of the present disclosure, because the protection member 410 is configured at the sound generating module 330, a sound characteristic and/or a sound pressure level characteristic of a low-pitched sound band can be further complemented, and the sound apparatus 30 can be protected from the external impact. For example, the protection member 410 can be a sealing member, an encapsulation member, a buffer member, or an impact absorption member, but embodiments of the present disclosure are not limited thereto.

According to an embodiment of the present disclosure, the protection member 410 can include a material which differs from that of the first coupling member 321. For example, the protection member 410 can include a material having an adhesive force which differs from that of the first coupling member 321. The protection member 410 can include a material having an adhesive force which differs from that of the first coupling member 321, and thus, the protection member 410 can protect the sound apparatus 30. For example, the protection member 410 can include rubber such as EPDM, and thus, can reinforce a sound pressure level of the low-pitched sound band and can protect the sound apparatus 30 from the external impact.

According to an embodiment of the present disclosure, the protection member 410 can be connected or coupled to the vibration member 331 and/or the vibration apparatus 330. The protection member 410 can be connected or coupled to the vibration member 331 and/or the second vibration apparatus 335. For example, the protection member 410 can be configured to protect or fix the vibration member 331 and/or the vibration apparatus 330. The protection member 410 can be fixed to the vibration member 331 and/or the second vibration apparatus 335 to protect the vibration member 331 and/or the second vibration apparatus 335.

The vibration member 331 can include a first surface and a second surface which differs from (or opposite to) the first surface. For example, the enclosure 310 can be connected or coupled to the first surface of the vibration member 331. The protection member 410 can contact the second surface of the vibration member 331 and the second vibration apparatus 335. For example, the protection member 410 can be configured to cover the second surface of the vibration member 331 and the second vibration apparatus 335.

The protection member 410 can have the same size as that of the vibration member 331, but embodiments of the present disclosure are not limited thereto. For example, the protection member 410 can have a size which is greater than that of the vibration apparatus 333 and 335 and is smaller than that of the vibration member 331, but embodiments of the present disclosure are not limited thereto.

According to another embodiment of the present disclosure, because the sound apparatus 30 includes at least one or more of the first enclosure 311 and the protection member 410, a sound characteristic and/or a sound pressure level characteristic of each of the low-pitched sound band and a middle-pitched sound band can be further enhanced, a sound reproduction band can expand, and the sound apparatus 30 can be protected from the external impact.

At least one or more of the first enclosure 311 and the protection member 410 described above with reference to FIGS. 15 and 16 can be substantially identically applied to the sound apparatus 30 described above with reference to FIGS. 5 and 6. Therefore, descriptions of FIGS. 15 and 16 can be included in the descriptions of the sound apparatus 30 illustrated in FIGS. 5 and 6.

Figure 17:
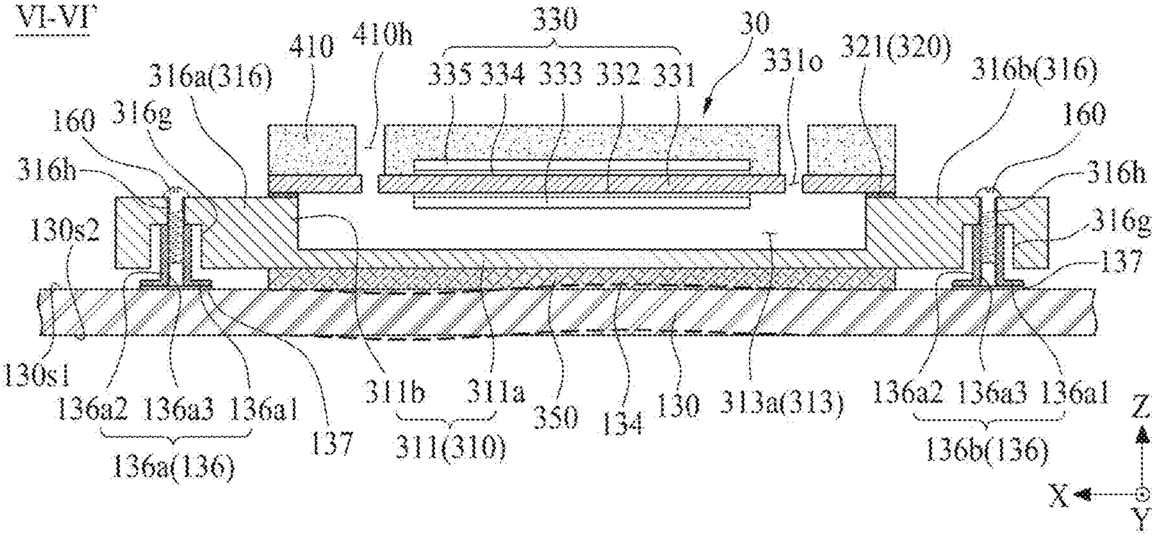
FIG. 17 is another cross-sectional view taken along line VI-VI' illustrated in FIG. 15 according to another embodiment of the present disclosure.

FIG. 17 is another cross-sectional view taken along line VI-VI' illustrated in FIG. 15 according to another embodiment of the present disclosure. FIG. 17 illustrates an embodiment where at least one or more holes are additionally configured in the protection member 410 described above with reference to FIGS. 15 and 16. In the following description, therefore, the at least one or more holes will be described in detail, the other elements can be substantially the same as those described above with reference to FIGS. 7 to 9, and thus, like reference numerals refer to like elements and repeated descriptions can be omitted or will be briefly given below.

With reference to FIG. 17, in the sound apparatus for a vehicle and the vehicular apparatus including the same according to another embodiment of the present disclosure, the sound apparatus 30 can further include at least one or more holes 3310.

The at least one or more holes 3310 can be configured at a vibration member 331. A description of the at least one or more holes 3310 can be substantially the same as the description of FIGS. 10, 13, and 14, and thus, like reference numerals refer to like elements and repeated descriptions are omitted or will be briefly given below.

The sound apparatus 30 according to another embodiment of the present disclosure can further include at least one hole **410*h* at the protection member 410**.

The at least one hole 410*h* of the protection member 410 can be configured to correspond to at least one or more holes 3310 at the vibration member 331. For example, the at least one hole 410*h* of the protection member 410 can be connected to at least one or more holes 3310 at the vibration member 331. For example, the at least one hole 410*h* can be a second hole, a vent hole, an air flow hole, a duct hole, a second connection hole, a second communication hole, or a second space connection part, but embodiments of the present disclosure are not limited thereto.

According to another embodiment of the present disclosure, because the sound apparatus 30 includes at least one or more of a first enclosure 311, the at least one or more holes 3310, and the at least one hole 410*h* of the protection member 410, a sound characteristic and/or a sound pressure level characteristic of each of the low-pitched sound band and a middle-pitched sound band can be further enhanced, a sound reproduction band can further expand.

At least one or more of the first enclosure 311, the protection member 410, the at least one or more holes 3310, and the at least one hole 410*h* of the protection member 410 described above with reference to FIG. 17 can be substantially identically applied to the sound apparatus 30 described above with reference to FIGS. 5 and 6. Therefore, descriptions of FIG. 17 can be included in the descriptions of the sound apparatus 30 illustrated in FIGS. 5 and 6.

Figure 18:
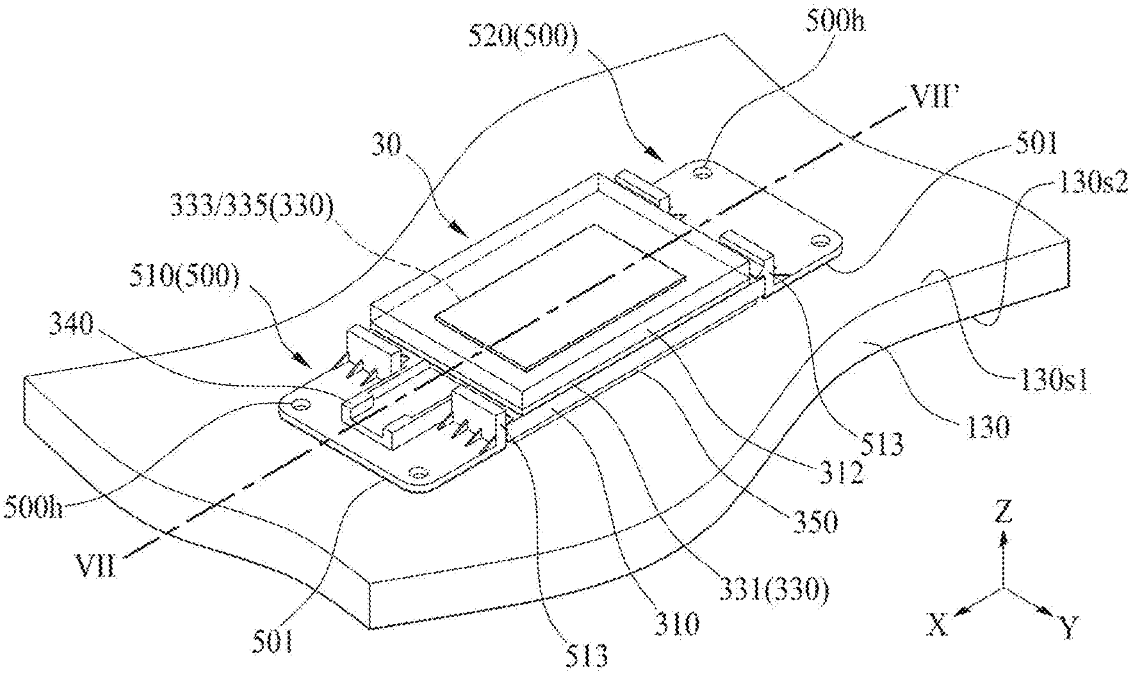
FIG. 18 illustrates a sound apparatus for a vehicle and a vehicular apparatus including the same according to another embodiment of the present disclosure.
Figure 19:
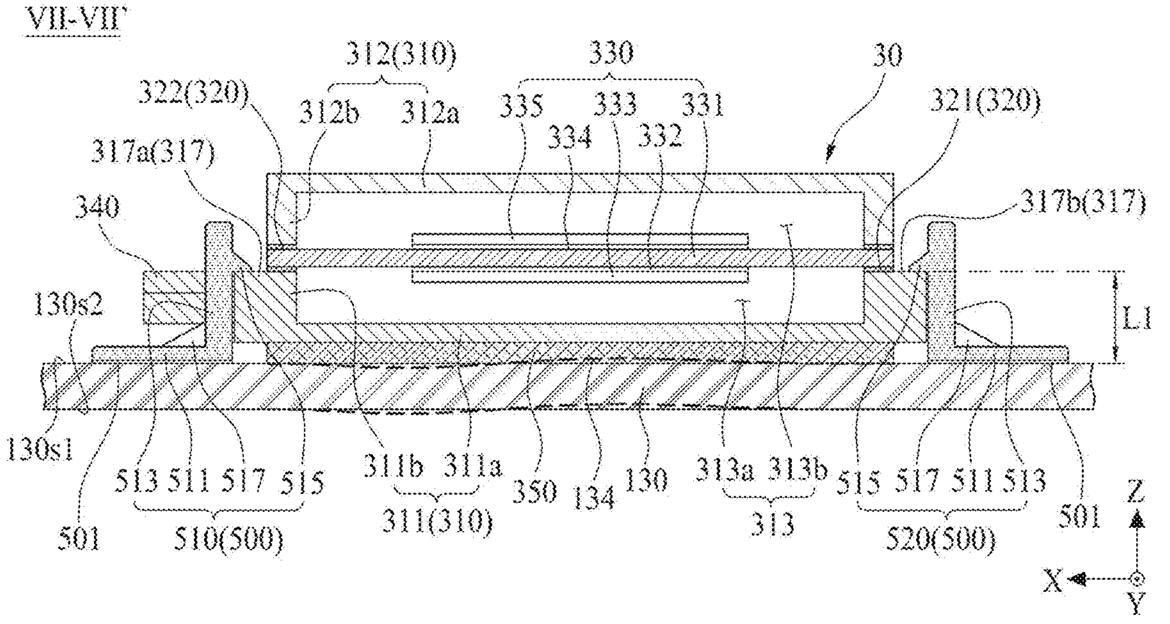
FIG. 19 is a cross-sectional view taken along line VII-VII' illustrated in FIG. 18 according to another embodiment of the present disclosure.
Figure 20:
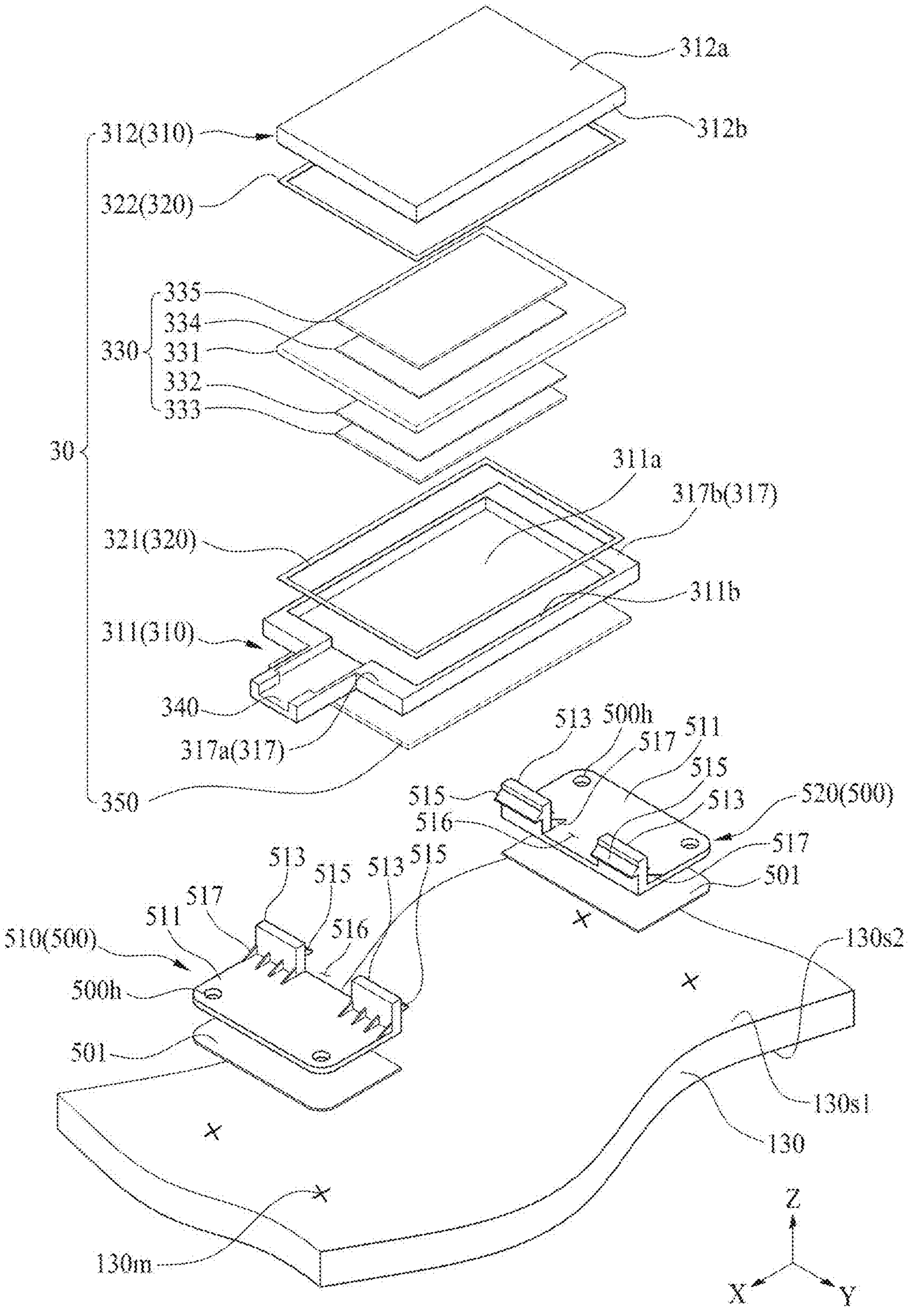
FIG. 20 is an exploded perspective view of a sound apparatus for a vehicle illustrated in FIG. 18 according to another embodiment of the present disclosure.

FIG. 18 illustrates a sound apparatus for a vehicle and a vehicular apparatus including the same according to another embodiment of the present disclosure. FIG. 19 is a cross-sectional view taken along line VII-VII' illustrated in FIG. 18 according to another embodiment of the present disclosure. FIG. 20 is an exploded perspective view of a sound apparatus for a vehicle illustrated in FIG. 18 according to another embodiment of the present disclosure. FIGS. 18 to 20 illustrate an embodiment implemented by modifying a fixing part and a supporting part in the sound apparatus for a vehicle and the vehicular apparatus including the same according to another embodiment of the present disclosure described above with reference to FIGS. 7 to 9. In the following description, therefore, a fixing part and a supporting part will be described in detail, the other elements can be substantially the same as those described above with reference to FIGS. 7 to 9, and thus, like reference numerals refer to like elements and repeated descriptions can be omitted or will be briefly given below.

With reference to FIGS. 18 to 20, in the sound apparatus for a vehicle and the vehicular apparatus including the same according to another embodiment of the present disclosure, the supporting part 500 can be configured at the vehicle interior material 130 to support (or fix) the sound apparatus 30. The supporting part 500 can be occluded or concealed by the vehicle interior material 130 together with the connection member 350 and the sound apparatus 30.

The supporting part 500 can be coupled (or attached) to a first surface 130*s*1 of the vehicle interior material 130 to support (or fix) the sound apparatus 30. For example, the supporting part 500 can be coupled (or attached) to the first surface 130*s*1 of the vehicle interior material 130 by an attachment member 501. For example, the attachment member 501 can be a double-sided tape, an adhesive, a double-sided adhesive, or a bond, but embodiments of the present disclosure are not limited thereto.

The supporting part 500 according to an embodiment of the present disclosure can include a first supporting member 510 and a second supporting member 520. For example, each of the first supporting member 510 and the second supporting member 520 can be a bracket, a supporting bracket, a screw fastening member, a screw bracket, a nut member, or a nut bracket, but embodiments of the present disclosure are not limited thereto. For example, each of the first supporting member 510 and the second supporting member 520 can include one or more materials of a metal, wood, plastic, and carbon, but embodiments of the present disclosure are not limited thereto.

The first supporting member 510 according to an embodiment of the present disclosure can be coupled (or attached) to the vehicle interior material 130 adjacent to a first side of the first enclosure 311. The first supporting member 510 can be coupled (or attached) to a predetermined first region (or one region or left region) of the first surface 130*s*1 of the vehicle interior material 130. For example, the first supporting member 510 can be coupled (or attached) to the first region of the first surface 130*s*1 of the vehicle interior material 130 by the attachment member 501. The first supporting member 510 can be coupled (or attached) to one align mark 130*m* formed at the first region of the first surface 130*s*1 of the vehicle interior material 130. For example, the first supporting member 510 can be coupled (or attached) to the align mark 130*m* by an attachment process using the attachment member 501.

The second supporting member 520 according to an embodiment of the present disclosure can be coupled (or attached) to the vehicle interior material 130 adjacent to a second side, which is opposite to the first side, of the first enclosure 311. The second supporting member 520 can be spaced apart from the first supporting member 510 along a first direction X. The second supporting member 520 can be coupled (or attached) to a predetermined second region (or the other region or right region) of the first surface 130*s*1 of the vehicle interior material 130. The second supporting member 520 can be coupled (or attached) to the second region of the first surface 130*s*1 of the vehicle interior material 130 by the attachment member 501. For example, the second supporting member 520 can be coupled (or attached) to one align mark 130*m* formed at the second region of the first surface 130*s*1 of the vehicle interior material 130. For example, the second supporting member 520 can be coupled (or attached) to the align mark 130*m* by an attachment process using the attachment member 501.

A position of the align mark 130*m* for attaching of the first supporting member 510 and a position of the align mark 130*m* for attaching of the second supporting member 520 can be adjusted to correspond to a long-side length. Each of the first supporting member 510 and the second supporting member 520 can be coupled (or attached) to the first surface 130*s*1 of the vehicle interior material 130 after position alignment based on the align mark 130*m*, and thus, a process of coupling (or attaching) each of the first supporting member 510 and the second supporting member 520 to the vehicle interior material 130 can be easily performed, thereby enhancing productivity of the sound apparatus 30.

Each of the first supporting member 510 and the second supporting member 520 can include a base plate 511 and one or more hook members 513. For example, each of the first supporting member 510 and the second supporting member 520 can include a base plate 511 and a pair of hook members 513.

The base plate 511 can include a plate shape having a certain size. For example, the base plate 511 can be a plate having a circular shape, an oval shape, or a polygonal shape, but embodiments of the present disclosure are not limited thereto. The base plate 511 can be coupled (or attached) to the first surface 130*s*1 of the vehicle interior material 130 by the attachment member 501. For example, the base plate 511 can be a prop portion, a prop frame, a supporting plate, a base frame, or a base member, but embodiments of the present disclosure are not limited thereto.

The base plate 511 can include a pair of holes (or two or more holes) 500*h*. For example, the base plate 511 can include a pair of holes 500*h* configured at each of first and second corner portions of the first periphery portion. For example, the pair of holes 500*h* can be spaced apart from each other along the second direction Y and can be configured at a same line along the second direction Y. According to an embodiment of the present disclosure, the pair of holes 500*h* can be used to align positions of the supporting members 510 and 520 at the align mark 130*m* in the vehicle interior material 130 when coupling (or attaching) the supporting part 500 to the vehicle interior material 130, and thus, the supporting members 510 and 520 can be more accurately attached on a predetermined position of the first surface 130*s*1 of the vehicle interior material 130.

The pair of hook members 513 can be connected (or coupled) to a second periphery portion, which is opposite or parallel to the first periphery portion, of the base plate 511. For example, the pair of hook members 513 can be vertically connected (or coupled) at the second periphery portion of the base plate 511 in parallel in the third direction Z. For example, the pair of hook members 513 can be spaced apart from each other with a gap space 516 therebetween. For example, the pair of hook members 513 can be a latch member and a fixing member, but embodiments of the present disclosure are not limited thereto.

The pair of hook members 513 can include a coupling boss (or a coupling protrusion) 515. The coupling boss 515 can be configured at a first lateral surface of each of the pair of hook members 513. The coupling boss 515 can protrude from a first lateral surface of each of the pair of hook members 513. For example, the coupling boss 515 can protrude to have a triangular bar shape from the first lateral surface (or an inner surface) of each of the pair of hook members 513, but embodiments of the present disclosure are not limited thereto.

The coupling boss 515 can protrude from the first lateral surface (or an inner surface) of the hook member 513 which is spaced apart from an uppermost surface of the hook member 513 by a certain distance. An upper portion of each of the pair of hook members 513 can extend or protrude onto the coupling boss 515 along the third direction Z. The upper portion of each of the pair of hook members 513 can guide an alignment position of the sound apparatus 30 in a case where the sound apparatus 30 is coupled to the vehicle interior material 130. Furthermore, the upper portion of each of the pair of hook members 513 can have a function of a lever or a handle for releasing hook coupling between the vehicle interior material 130 and the sound apparatus 30.

Each of the first supporting member 510 and the second supporting member 520 can include a plurality of ribs 517.

The plurality of ribs 517 can be configured to reinforce the stiffness of the pair of hook members 513. The plurality of ribs 517 can be disposed to have a predetermined interval (or distance) between the base plate 511 and the pair of hook members 513 and can be connected (or coupled) to the base plate 511 and the pair of hook members 513. Each of the plurality of ribs 517 can have a triangular shape which includes a first side, a second side, and an oblique side (or a slanted side). The first side of each of the plurality of ribs 517 can be connected (or coupled) to the base plate 511. The second side of each of the plurality of ribs 517 can be connected (or coupled) to a second lateral side (or an outer surface) of each of the pair of hook members 513. Accordingly, the stiffness of the pair of hook members 513 can be increased by the plurality of ribs 517.

The base plate 511, the pair of hook members 513, and the plurality of ribs 517 can be configured as one body or an integration type.

The sound apparatus 30 according to another embodiment of the present disclosure can be coupled (or fixed) to the supporting part 500 and can be configured to vibrate the vehicle interior material 130. For example, the sound apparatus 30 can be coupled (or fixed) to the supporting part 500 so as to contact (or connect with) the first surface 130*s*1 of the vehicle interior material 130 and can vibrate the vehicle interior material 130 to output a sound.

The sound apparatus for a vehicle and the vehicular apparatus including the same according to another embodiment of the present disclosure can further include a fixing part 317. For example, the enclosure 310 or the sound apparatus 30 according to another embodiment of the present disclosure can include a fixing part 317 which is coupled (or fixed) to the supporting part 500. In the sound apparatus 30 according to another embodiment of the present disclosure, the other elements except the fixing part 317 and relevant elements can be substantially the same as the sound apparatus 30 described above with reference to FIGS. 3 to 6, and thus, the other elements except the fixing part 317 and relevant elements are referred to by like reference numerals, and repeated descriptions can be omitted or will be briefly given below.

The sound apparatus 30 can include an enclosure 310 and a sound generating module 330. The enclosure 310 can include a first enclosure 311 and a second enclosure 312.

The first enclosure 311 can include a plate 311*a* and a sidewall portion 311*b*. The second enclosure 312 can include a plate 312*a* and a sidewall portion 312*b*. The first enclosure 311 can be configured to include the fixing part 317. The first enclosure 311 can have a size which is greater than that of the second enclosure 312, based on (or due to) the fixing part 317. For example, the size of the first enclosure 311 can be greater than that of the second enclosure 312 by a region combined with the supporting part 500. For example, a long-side length of the first enclosure 311 parallel to the first direction Y can be longer than a long-side length of the second enclosure 312 by a region combined with the supporting part 500.

The sound generating module 330 can include a vibration apparatus and a vibration member 331. The sound generating module 330 including the vibration apparatus and the vibration member 331 can be substantially the same as the sound generating module 330 described above with reference to FIGS. 3 and 4, and thus, repeated descriptions can be omitted. Descriptions of the sound generating module 330 illustrated in FIGS. 3 and 4 can be included in the descriptions of the sound generating module 330 illustrated in FIGS. 18 to 20.

The sound generating module 330 can further include a line part 340 which is configured at one lateral surface of each of the first enclosure 311 and the second enclosure 312 of the enclosure 310. The line part 340 configured at the first enclosure 311 can be disposed at a gap space 516 between the pair of hook members 513.

The fixing part 317 can be configured at the enclosure 310 to correspond to the supporting part 500. The fixing part 317 can be configured at the first enclosure 311 of the enclosure 310 to correspond to the supporting part 500. The fixing part 317 can be configured at both periphery portions of the first enclosure 311. The fixing part 317 can be configured at a first periphery portion, which is adjacent to a first short side, of the first enclosure 311 and a second periphery portion, which is adjacent to a second short side, of the first enclosure 311.

The fixing part 317 can be supported by or fixed to the supporting part 500. The fixing part 317 can be supported by or fixed to the hook member 513 of the supporting part 500. The fixing part 317 can be coupled to the coupling boss 515 of the hook member 513. The coupling boss 515 of the hook member 513 can contact an upper surface of the fixing part 317, and thus, the fixing part 317 can be disposed (or interposed) or fixed between the vehicle interior material 130 and the coupling boss 515.

The fixing part 317 according to another embodiment of the present disclosure can be fully (or completely) occluded or fully (or completely) concealed by the vehicle interior material 130 together with the connection member 350 and the sound apparatus 30. The fixing part 317 can include a first fixing part 317*a* and a second fixing part 317*b*.

The first fixing part 317*a* can be configured a first side of the first enclosure 311. The first fixing part 317*a* can be configured at a plate 311*a* and a first side of a sidewall portion 311*b* of the first enclosure 311. For example, the first fixing part 317*a* can extend (or protrude) to have a certain length along the first direction X from the plate 311*a* and the first side of the sidewall portion 311*b* of the first enclosure 311. For example, the first fixing part 317*a* can extend (or protrude) to have a certain length along the first direction X from a first short side of the first enclosure 311. The first fixing part 317*a* can be provided as one body with the first side of the first enclosure 311. The first fixing part 317*a* and the first side of the first enclosure 311 can be configured as one body or an integration type.

The second fixing part 317*b* can be configured at a second side of the first enclosure 311. The second fixing part 317*b* can be configured at the plate 311*a* and the second side of the sidewall portion 311*b* of the first enclosure 311. For example, the second fixing part 317*b* can extend (or protrude) to have a certain length along the first direction X from the plate 311*a* and the second side of the sidewall portion 311*b* of the first enclosure 311. For example, the second fixing part 317*b* can extend (or protrude) to have a certain length along the first direction X from a second short side of the first enclosure 311. The second fixing part 317*b* can be provided as one body with the second side of the first enclosure 311. The second fixing part 317*b* and the second side of the first enclosure 311 can be configured as one body or an integration type.

According to an embodiment of the present disclosure, the first fixing part 317*a* can be a first periphery portion of the first enclosure 311. The second fixing part 317*b* can be a second periphery portion, which is opposite to the first periphery portion, of the first enclosure 311. For example, the first fixing part 317*a* can be a first periphery portion, adjacent to the first short side, of the first enclosure 311. The second fixing part 317*b* can be a second periphery portion, adjacent to the second short side, of the first enclosure 311. Accordingly, the first and second periphery portions of the first enclosure 311 can pass through a short side of a vibration member 331 or a short side of the second enclosure 312 and can extend (or protrude) along the first direction X. The first enclosure 311 can have a size which is greater than that of each of the second enclosure 312 or the vibration member 331. The first enclosure 311 can have a size which is greater than that of each of the vibration member 331 and the second enclosure 312 by the first periphery portion (or the first fixing part 317*a*) and the second periphery portion (or the second fixing part 317*b*). For example, with respect to the second direction Y, a short-side length of the first enclosure 311 can be equal to a short-side length of each of the vibration member 331 and the second enclosure 312. With respect to the first direction X, a long-side length of the first enclosure 311 can be greater than a long-side length of each of the vibration member 331 and the second enclosure 312.

The first fixing part 317*a* can be coupled to the first supporting member 510 of the supporting part 500 which is coupled (or attached) to the vehicle interior material 130 adjacent to the first side of the first enclosure 311, based on a hook coupling scheme. The first fixing part 317*a* can be supported by or fixed to the first supporting member 510. The first fixing part 317*a* can be supported by or fixed to the hook member (or a first hook member) 513 of the first supporting member 510. The first fixing part 317*a* can be coupled to the coupling boss 515 at the hook member 513 of the first supporting member 510. The coupling boss 515 at the hook member 513 of the first supporting member 510 can contact an upper surface of the first fixing part 317*a*, and thus, the first fixing part 317*a* can be disposed (or interposed) or fixed between the vehicle interior material 130 and the coupling boss 515.

According to an embodiment of the present disclosure, a distance L1 between the coupling boss 515 of the first supporting member 510 and the first surface 130*s*1 of the vehicle interior material 130 can be smaller than a distance between an upper surface of the first enclosure 311 (or the upper surface of the first fixing part 317*a*) and the first surface 130*s*1 of the vehicle interior material 130. For example, the distance L1 between the coupling boss 515 of the first supporting member 510 and the first surface 130*s*1 of the vehicle interior material 130 can be smaller than a sum of a thickness of the first enclosure 311 and a thickness of the connection member 350. The coupling boss 515 of the first supporting member 510 can be coupled to the upper surface of the first fixing part 317*a* at the first enclosure 311, based on the hook coupling scheme. Accordingly, the first fixing part 317*a* at the first enclosure 311 can be fixed with being pressed between the coupling boss 515 of the first supporting member 510 and the first surface 130*s*1 of the vehicle interior material 130 by pressing (or elasticity) of the connection member 350. Therefore, the first supporting member 510 can support (or fix) the first periphery portion of the first enclosure 311 while surrounding the first short side of the first enclosure 311.

The second fixing part 317*b* can be coupled to the second supporting member 520 of the supporting part 500 coupled (or attached) to the vehicle interior material 130 adjacent to the second side, which is opposite to the first side, of the first enclosure 311, based on the hook coupling scheme. The second fixing part 317*b* can be supported by or fixed to the second supporting member 520. The second fixing part 317*b* can be supported by or fixed to the hook member (or a second hook member) 513 of the second supporting member 520. The second fixing part 317*b* can be coupled to the coupling boss 515 at the hook member 513 of the second supporting member 520. The coupling boss 515 at the hook member 513 of the second supporting member 520 can contact an upper surface of the second fixing part 317*b*, and thus, the second fixing part 317*b* can be disposed (or interposed) or fixed between the vehicle interior material 130 and the coupling boss 515.

According to an embodiment of the present disclosure, a distance L1 between the coupling boss 515 of the second supporting member 520 and the first surface 130*s*1 of the vehicle interior material 130 can be smaller than a distance between the upper surface of the first enclosure 311 (or the upper surface of the second fixing part 317*b*) and the first surface 130*s*1 of the vehicle interior material 130. For example, the distance L1 between the coupling boss 515 of the second supporting member 520 and the first surface 130*s*1 of the vehicle interior material 130 can be smaller than a sum of a thickness of the first enclosure 311 and a thickness of the connection member 350. The coupling boss 515 of the second supporting member 520 can be coupled to the upper surface of the second fixing part 317*b* at the first enclosure 311, based on the hook coupling scheme. Accordingly, the second fixing part 317*b* at the first enclosure 311 can be fixed with being pressed between the coupling boss 515 of the second supporting member 520 and the first surface 130*s*1 of the vehicle interior material 130 by pressing (or elasticity) of the connection member 350. Therefore, the second supporting member 520 can support (or fix) the second periphery portion of the first enclosure 311 while surrounding the second short side of the first enclosure 311.

The first supporting member 510 and the second supporting member 520 can be coupled (or attached) to the first surface 130*s*1 of the vehicle interior material 130 to have an interval corresponding to a long-side length of the sound apparatus 30 and can be hook-coupled to each of the first fixing part 317*a* and the second fixing part 317*b* at the first enclosure 311, based on the hook coupling scheme, and thus, can support (or fix) the sound apparatus 30 and can connect (or coupe or contact) the sound apparatus 30 to the first surface 130*s*1 of the vehicle interior material 130. For example, the first enclosure 311 at the sound apparatus 30 can be interposed (or disposed) between the first supporting member 510 and the second supporting member 520 and can be hook-coupled to the coupling boss 515 at the hook member 513 of each of the first supporting member 510 and the second supporting member 520, and thus, can be pressed between the first surface 130*s*1 of the vehicle interior material 130 and the coupling boss 515 at the hook member 513 and can be connected (or coupled or contact) to the first surface 130*s*1 of the vehicle interior material 130. Accordingly, based on the hook coupling scheme using the hook member 513, a coupling process between the sound apparatus 300 and a vehicle structure can be easily performed. Based on the hook coupling scheme, a process of attaching or mounting the sound apparatus 30 on the vehicle interior material 130 and/or a process of separating or detaching the sound apparatus 30 on the vehicle interior material 130 can be easily performed.

According to an embodiment of the present disclosure, in a state where the enclosure 310 is hook-coupled to the supporting part 500 by the hook coupling scheme and is connected (or coupled) to the first surface 130*s*1 of the vehicle interior material 130, the sound generating module 330 can generate a sound pressure level (or sound or sound wave) at an internal space 313 of the enclosure 310 to vibrate the first enclosure 311 and can vibrate the vehicle interior material 130 based on a vibration of the first enclosure 311 to output (or generate) a sound.

The sound apparatus for a vehicle and the vehicular apparatus including the same according to another embodiment of the present disclosure can vibrate at least a portion of a vehicle structure to generate (or output) a sound, based on driving (or vibration or displacement) of the sound apparatus 30 which is connected (or coupled or contact) to the at least a portion of the vehicle structure and is supported (or fixed) to the vehicle structure by the hook coupling scheme, and thus, a sound characteristic and/or a sound pressure level characteristic of a sound band including a low-pitched sound band generated by driving (or vibration or displacement) of the sound apparatus 30 can be enhanced.

In the sound apparatus for a vehicle and the vehicular apparatus including the same according to an embodiment of the present disclosure, the sound apparatus 30 can be supported by (or fixed to) the supporting part 500 which is coupled (or attached) to the vehicle structure by the hook coupling scheme, and can be connected (or coupled) to the vehicle structure, and thus, a process of attaching or mounting the sound apparatus 30 on the vehicle interior material 130 and/or a process of separating or detaching the sound apparatus 30 on the vehicle interior material 130 can be easily performed.

Figure 21:
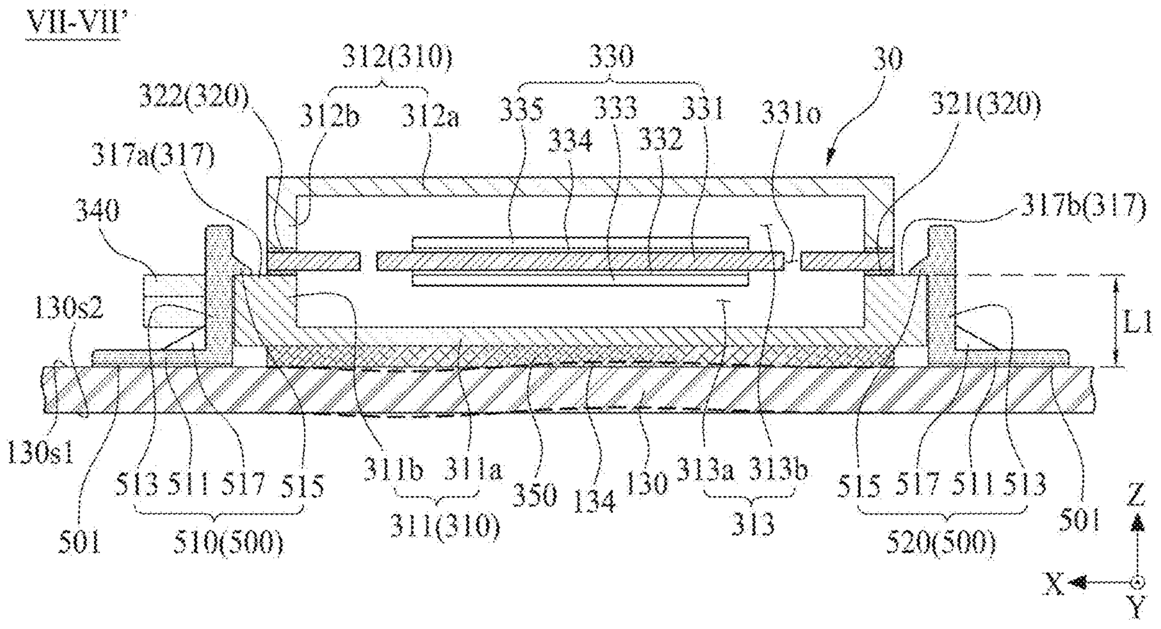
FIG. 21 is another cross-sectional view taken along line VII-VII' illustrated in FIG. 18 according to another embodiment of the present disclosure.

FIG. 21 is another cross-sectional view taken along line VII-VII' illustrated in FIG. 18 according to another embodiment of the present disclosure. FIG. 21 illustrates an embodiment where at least one hole 3310 is additionally configured in the sound apparatus 30 described above with reference to FIGS. 18 to 20. In the following description, therefore, at least one hole will be described in detail, the other elements can be substantially the same as those described above with reference to FIGS. 18 to 20, and thus, like reference numerals refer to like elements and repeated descriptions can be omitted or will be briefly given below.

Referring to FIG. 21, the sound apparatus 30 for a vehicle and the vehicular apparatus including the same according to another embodiment of the present disclosure can include at least one or more holes 3310. For example, the sound apparatus 30 according to another embodiment of the present disclosure can further include at least one or more holes 3310.

The at least one or more holes 3310 can be configured at the vibration member 331. A description of the at least one or more holes 3310 can be substantially a same as that of descriptions described above with reference to FIG. 10, and thus, like reference numerals refer to like elements and repeated descriptions can be omitted or will be briefly given below.

According to another embodiment of the present disclosure, the sound apparatus 30 can include a first enclosure 311 and the at least one or more holes 3310, or can include the first enclosure 311. When the sound apparatus 30 includes the first enclosure 311 and the at least one or more holes 3310, a sound characteristic and/or a sound pressure level characteristic of each of a low-pitched sound band and a middle-pitched sound band can be further enhanced, and a sound reproduction band can further expand. When the sound apparatus 30 includes the first enclosure 311, a sound characteristic and/or a sound pressure level characteristic of a middle-low-pitched sound band can be further enhanced, and a sound reproduction band can further expand.

Figure 22:
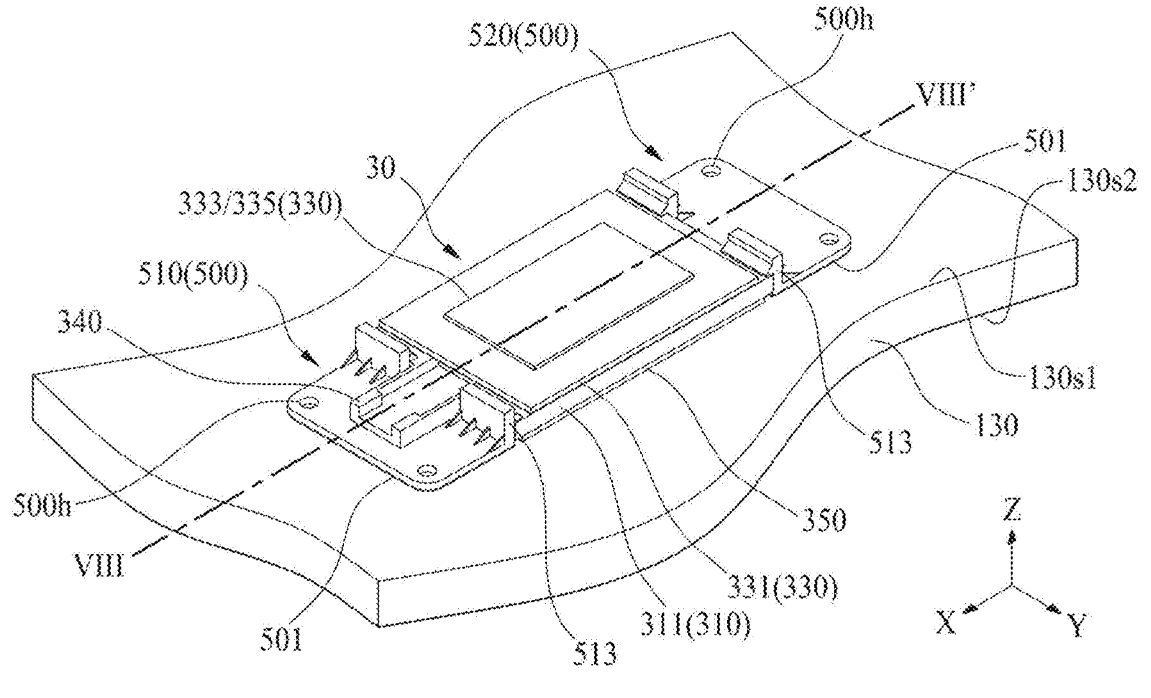
FIG. 22 illustrates a sound apparatus for a vehicle and a vehicular apparatus including the same according to another embodiment of the present disclosure.
Figure 23:
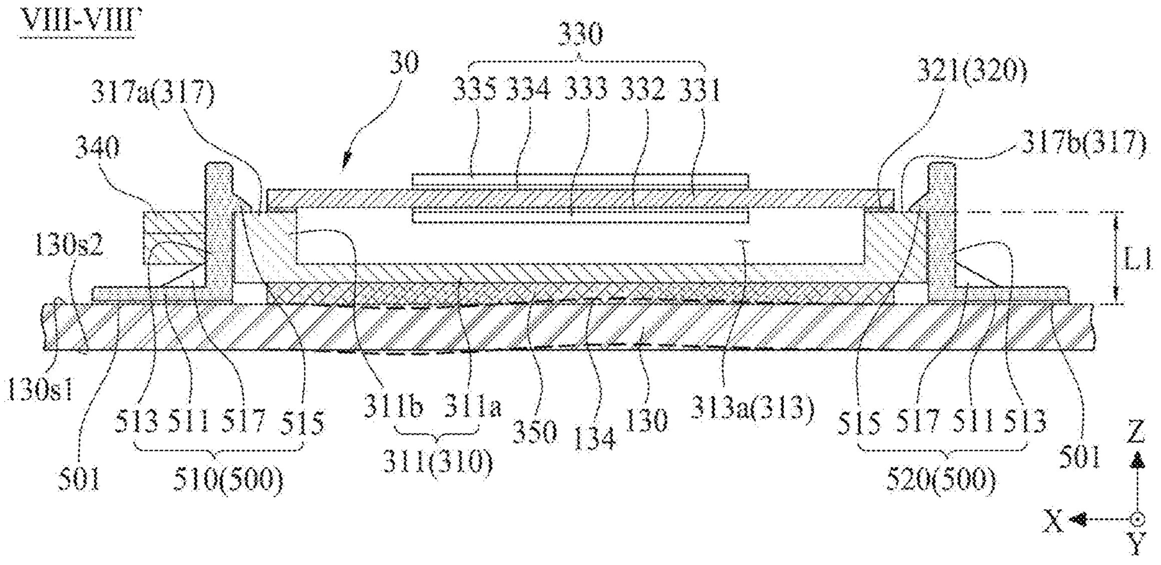
FIG. 23 is a cross-sectional view taken along line VIII-VIII' illustrated in FIG. 22 according to another embodiment of the present disclosure.

FIG. 22 illustrates a sound apparatus for a vehicle and a vehicular apparatus including the same according to another embodiment of the present disclosure. FIG. 23 is a cross-sectional view taken along line VIII-VIII' illustrated in FIG. 22 according to another embodiment of the present disclosure. FIGS. 22 and 23 illustrate an embodiment implemented by modifying an enclosure 310 in the sound apparatus described above with reference to FIGS. 18 to 20. In the following description, therefore, an enclosure will be described in detail, the other elements can be substantially the same as those described above with reference to FIGS. 18 to 20, and thus, like reference numerals refer to like elements and repeated descriptions can be omitted or will be briefly given below.

With reference to FIGS. 22 and 23, in the sound apparatus for a vehicle and the vehicular apparatus including the same according to another embodiment of the present disclosure, the enclosure 310 can include a first enclosure 311. For example, the second enclosure 312 can be removed (or omitted) in the enclosure 310 described above with reference to FIGS. 3 to 10, and thus, the enclosure 310 can be configured with only the first enclosure 311.

A description of the at least one or more holes 3310 can be substantially a same as that of descriptions described above with reference to FIG. 10, and thus, like reference numerals refer to like elements and repeated descriptions can be omitted or will be briefly given below.

The enclosure 310 or the first enclosure 311 can be connected to a sound generating module 330 with an internal space 313 therebetween. The enclosure 310 or the first enclosure 311 can be connected to a rear periphery portion of a vibration member 331 with the internal space 313 therebetween.

The vibration member 331 can be configured to cover the internal space 313 of the enclosure 310 or the first enclosure 311. For example, the vibration member 331 can be configured to cover a portion of the internal space 313 of the first enclosure 311. The vibration member 331 can be configured to cover the first space 313*a* of the first enclosure 311. For example, the vibration member 331 can be configured to cover a portion of the first space 313*a* of the first enclosure 311.

According to an embodiment of the present disclosure, in a case where the enclosure 310 is configured with the first enclosure 311, a sound characteristic and/or a sound pressure level characteristic of a sound apparatus 30 can be further enhanced than a case where the enclosure 310 is configured with the first enclosure 311 and the second enclosure 312. For example, in a case where the enclosure 310 is configured with the first enclosure 311, a sound characteristic and/or a sound pressure level characteristic of a middle-low-pitched sound band, for example, 2 kHz or less can be further enhanced, and a sound reproduction band can further expand.

Figure 24:
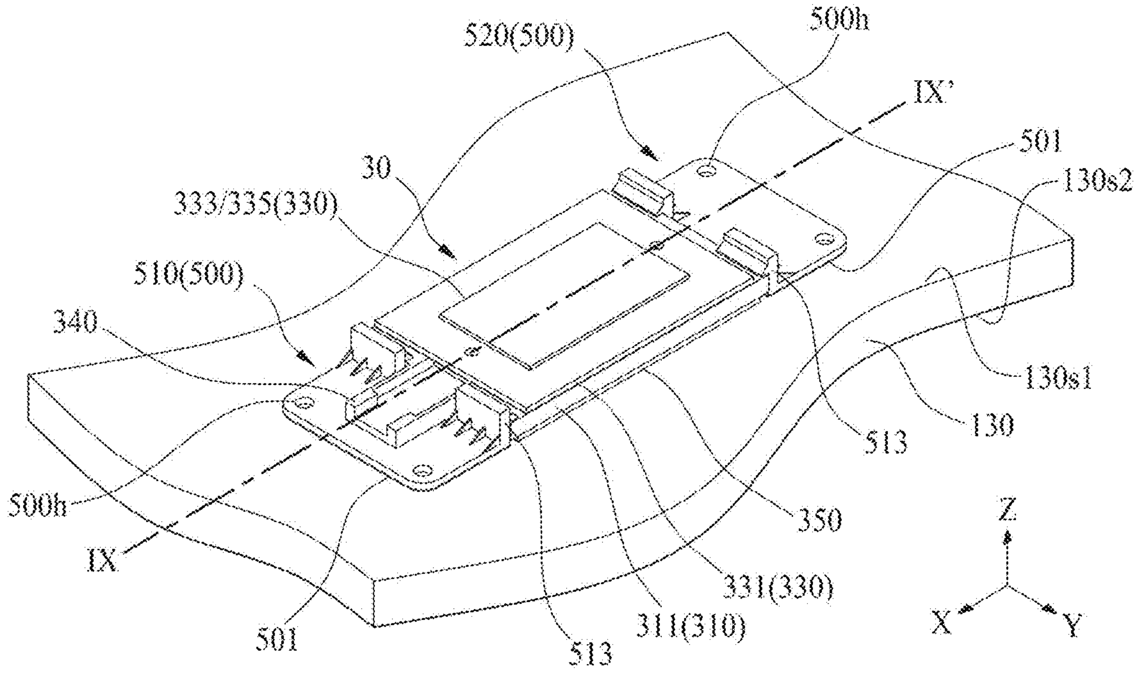
FIG. 24 illustrates a sound apparatus for a vehicle and a vehicular apparatus including the same according to another embodiment of the present disclosure.
Figure 25:
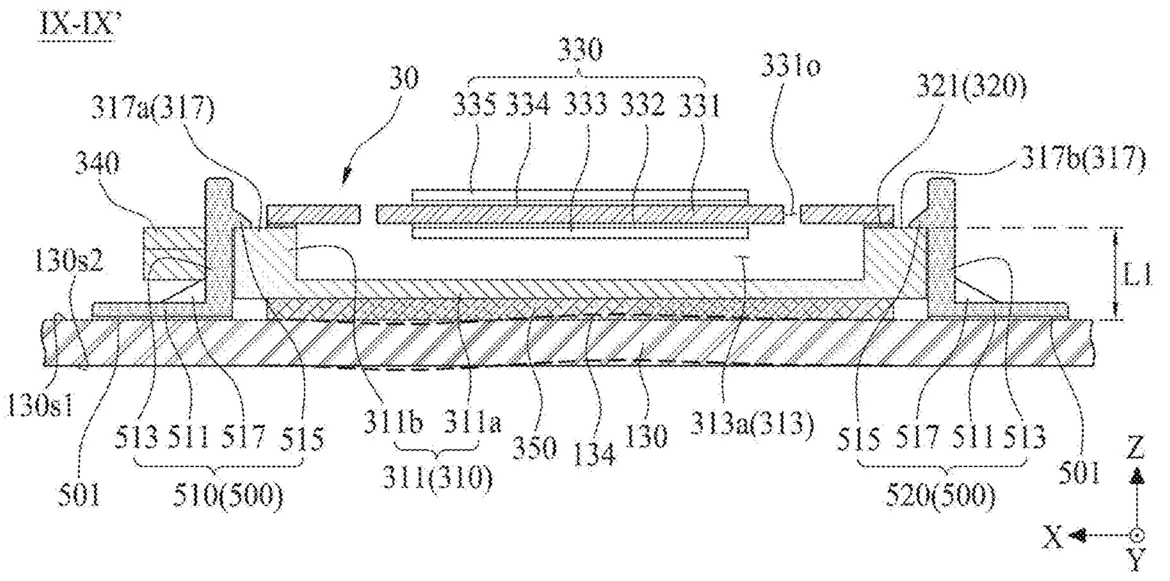
FIG. 25 is a cross-sectional view taken along line IX-IX' illustrated in FIG. 24 according to another embodiment of the present disclosure.

FIG. 24 illustrates a sound apparatus for a vehicle and a vehicular apparatus including the same according to another embodiment of the present disclosure. FIG. 25 is a cross-sectional view taken along line IX-IX' illustrated in FIG. 24 according to another embodiment of the present disclosure. FIGS. 24 and 25 illustrate an embodiment where at least one or more holes 3310 are additionally configured in the sound apparatus 30 described above with reference to FIGS. 22 and 23. In the following description, therefore, at least one or more holes will be described in detail, the other elements can be substantially the same as those described above with reference to FIGS. 18 to 23, and thus, like reference numerals refer to like elements and repeated descriptions can be omitted or will be briefly given below.

With reference to FIGS. 24 and 25, in the sound apparatus for a vehicle and the vehicular apparatus including the same according to another embodiment of the present disclosure, the sound apparatus 30 can further include at least one or more holes 3310.

The at least one or more holes 3310 can be configured at a vibration member 331. A description of the at least one or more holes 3310 can be substantially the same as described above with reference to FIG. 10, and thus, like reference numerals refer to like elements and repeated descriptions are omitted or will be briefly given below.

According to another embodiment of the present disclosure, the sound apparatus 30 can include a first enclosure 311 and the at least one or more holes 3310, or can include the first enclosure 311. When the sound apparatus 30 includes the first enclosure 311 and the at least one or more holes 3310, a sound characteristic and/or a sound pressure level characteristic of each of a low-pitched sound band and a middle-pitched sound band can be further enhanced, and a sound reproduction band can further expand. When the sound apparatus 30 includes the first enclosure 311, a sound characteristic and/or a sound pressure level characteristic of a middle-low-pitched sound band can be further enhanced, and a sound reproduction band can further expand.

According to another embodiment of the present disclosure, because the sound apparatus 30 includes at least one or more of the first enclosure 311 and the at least one or more holes 3310, a sound characteristic and/or a sound pressure level characteristic of each of a low-pitched sound band and a middle-pitched sound band can be further enhanced, a sound reproduction band can expand.

Figure 26:
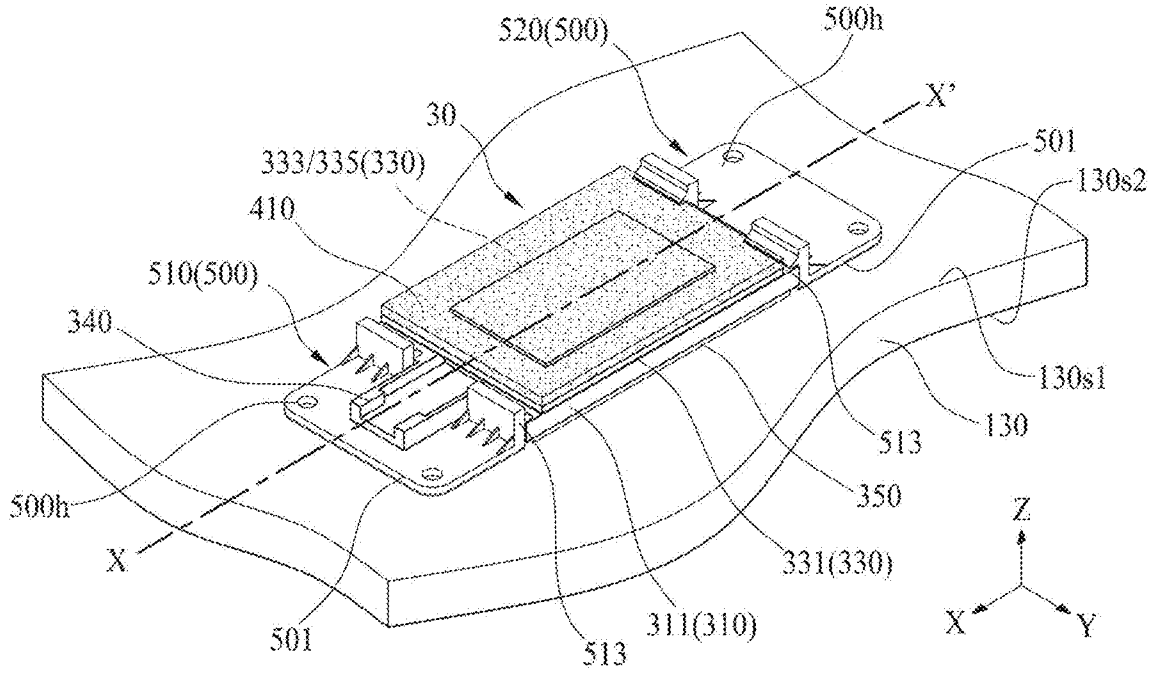
FIG. 26 illustrates a sound apparatus for a vehicle and a vehicular apparatus including the same according to another embodiment of the present disclosure.
Figure 27:
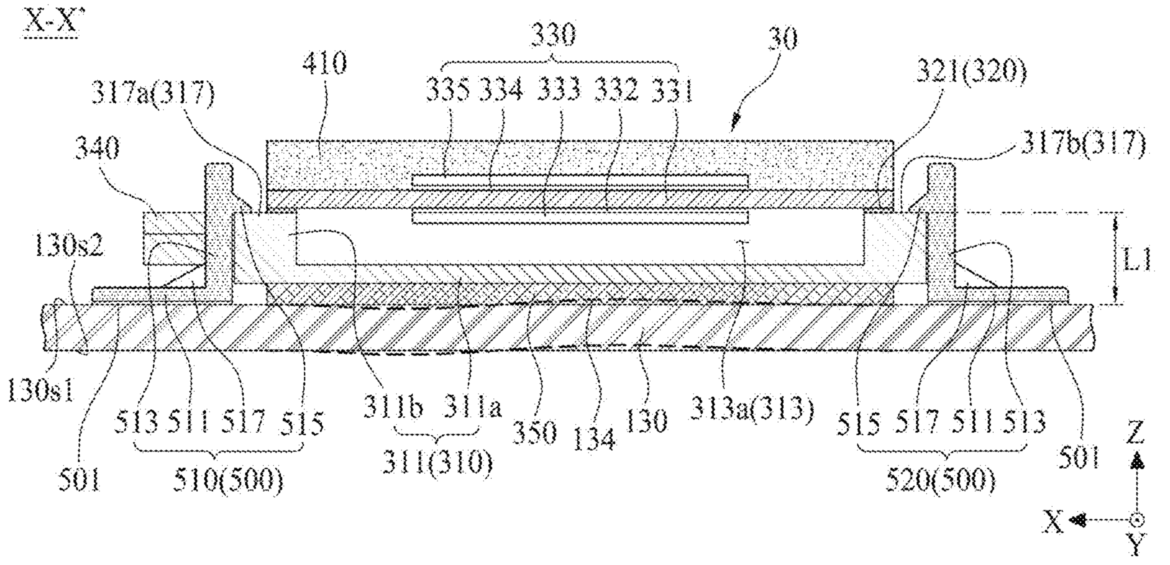
FIG. 27 is a cross-sectional view taken along line X-X' illustrated in FIG. 26 according to another embodiment of the present disclosure.

FIG. 26 illustrates a sound apparatus for a vehicle and a vehicular apparatus including the same according to another embodiment of the present disclosure. FIG. 27 is a cross-sectional view taken along line X-X' illustrated in FIG. 26 according to another embodiment of the present disclosure. FIGS. 26 and 27 illustrate an embodiment where a protection member is additionally configured in the sound apparatus 30 described above with reference to FIGS. 22 and 23. In the following description, therefore, the protection member will be described in detail, the other elements can be substantially the same as those described above with reference to FIGS. 18 to 23, and thus, like reference numerals refer to like elements and repeated descriptions can be omitted or will be briefly given below.

With reference to FIGS. 26 and 27, in the sound apparatus for a vehicle and the vehicular apparatus including the same according to another embodiment of the present disclosure, the sound apparatus 30 can further include a protection member 410.

The protection member 410 can be disposed at a sound generating module 330. For example, the protection member 410 can cover the sound generating module 330. For example, the protection member 410 can be disposed at a second vibration apparatus 335. For example, the protection member 410 can cover the second vibration apparatus 335. A description of the protection member 410 can be substantially the same as descriptions above with reference to FIGS. 15 and 16, and thus, like reference numerals refer to like elements and repeated descriptions are omitted or will be briefly given below.

According to another embodiment of the present disclosure, because the sound apparatus 30 includes at least one or more of the first enclosure 311 and the protection member 410, a sound characteristic and/or a sound pressure level characteristic of each of the low-pitched sound band and a middle-pitched sound band can be further enhanced, a sound reproduction band can expand, and the sound apparatus 30 can be protected from the external impact.

Figure 28:
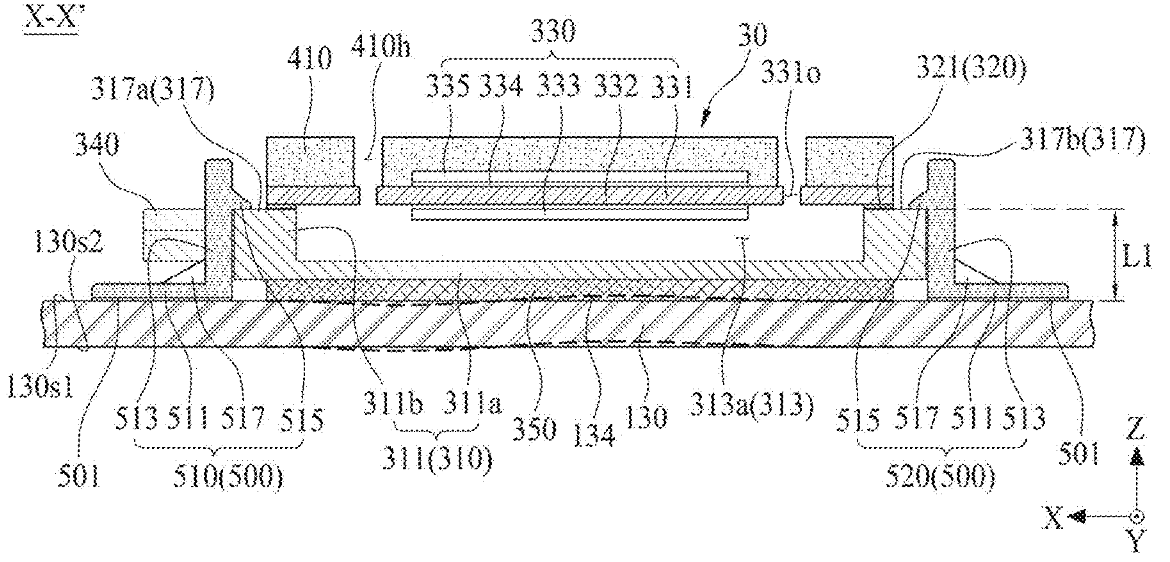
FIG. 28 is another cross-sectional view taken along line X-X' illustrated in FIG. 26 according to another embodiment of the present disclosure.

FIG. 28 is another cross-sectional view taken along line X-X' illustrated in FIG. 26 according to another embodiment of the present disclosure. FIG. 28 illustrates an embodiment where at least one or more holes are additionally configured in the protection member 410 described above with reference to FIGS. 26 and 27. In the following description, therefore, the at least one or more holes will be described in detail, the other elements can be substantially the same as those described above with reference to FIGS. 18 to 20, and thus, like reference numerals refer to like elements and repeated descriptions can be omitted or will be briefly given below.

With reference to FIG. 28, in the sound apparatus for a vehicle and the vehicular apparatus including the same according to another embodiment of the present disclosure, the sound apparatus 30 can further include at least one or more holes 3310.

The at least one or more holes 3310 can be configured at a vibration member 331. A description of the at least one or more holes 3310 can be substantially the same as the description of FIGS. 10, 13, 14, 17, 21, 24, and 25, and thus, like reference numerals refer to like elements and repeated descriptions are omitted or will be briefly given below.

The sound apparatus 30 according to another embodiment of the present disclosure can further include at least one hole 410*h* at the protection member 410.

The at least one hole 410*h* of the protection member 410 can be configured to correspond to at least one or more holes 3310 at the vibration member 331. For example, the at least one hole 410*h* of the protection member 410 can be connected to at least one or more holes 331*o* at the vibration member 331. For example, the at least one hole 410*h* can be a second hole, a vent hole, an air flow hole, a duct hole, a second connection hole, a second communication hole, or a second space connection part, but embodiments of the present disclosure are not limited thereto.

According to another embodiment of the present disclosure, because the sound apparatus 30 includes at least one or more of a first enclosure 311, the at least one or more holes 3310, and the at least one hole 410*h* of the protection member 410, a sound characteristic and/or a sound pressure level characteristic of each of the low-pitched sound band and a middle-pitched sound band can be further enhanced, a sound reproduction band can further expand.

Figure 29:
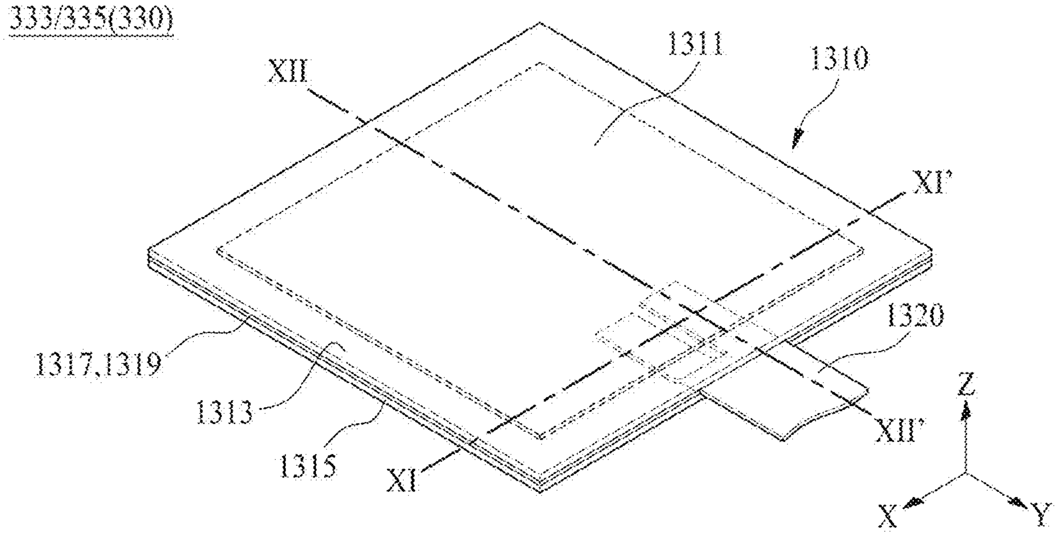
FIG. 29 illustrates a vibration apparatus according to an embodiment of the present disclosure.
Figure 30:
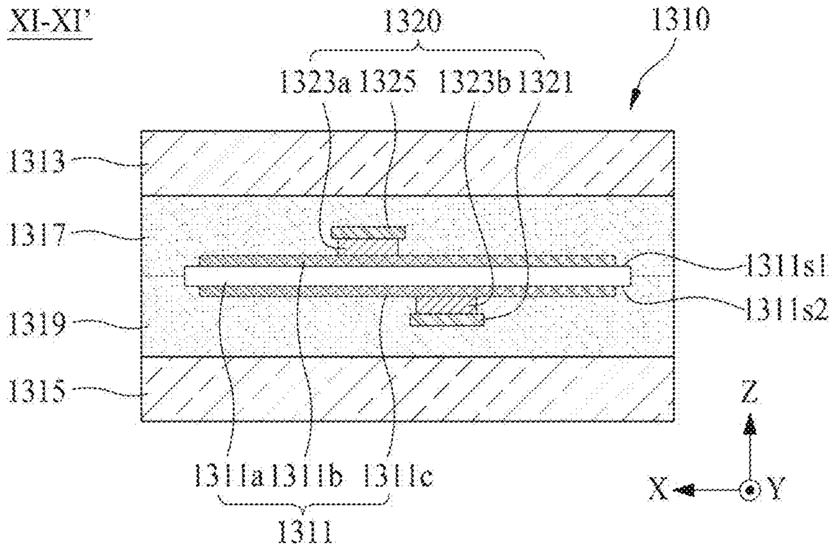
FIG. 30 is a cross-sectional view taken along line XI-XI' illustrated in FIG. 29 according to an embodiment of the present disclosure.
Figure 31:
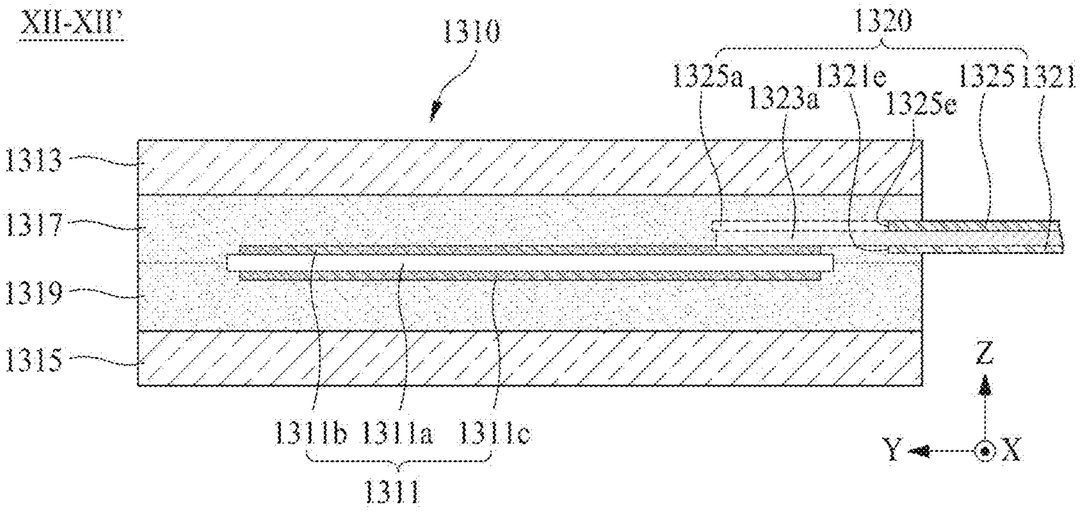
FIG. 31 is a cross-sectional view taken along line XII-XII' illustrated in FIG. 29 according to an embodiment of the present disclosure.

FIG. 29 illustrates a vibration apparatus according to an embodiment of the present disclosure. FIG. 30 is a cross-sectional view taken along line XI-XI' illustrated in FIG. 29 according to an embodiment of the present disclosure. FIG. 31 is a cross-sectional view taken along line XII-XII' illustrated in FIG. 29 according to an embodiment of the present disclosure.

With reference to FIGS. 29 to 31, a sound generating module 330 according to an embodiment of the present disclosure can include a vibration apparatus 333 and 335. The vibration apparatus 333 and 335 can include one or more vibration generators 1310.

The vibration generator 1310 can include a piezoelectric material having a piezoelectric characteristic. The vibration generator 1310 can vibrate (or displace or drive) a vibration member (or a vehicle interior material) based on a vibration (or displacement or driving) of the piezoelectric material based on an electric signal (or a voice signal or a sound signal) applied to the piezoelectric material. For example, the vibration generator 1310 can alternately repeat contraction and/or expansion by a piezoelectric effect (or a piezoelectric characteristic) to vibrate (or displace or drive). For example, the vibration generator 1310 can vibrate (or displace or drive) in a vertical direction (or a thickness direction) Z as contraction and/or expansion are alternately repeated by an inverse piezoelectric effect. For example, in the vibration generator 1310, the piezoelectric material including a piezoelectric ceramic can vibrate or mechanically displace (or vibrate or drive) in response to an electrical signal applied from an outside.

The vibration generator 1310 can be configured as a ceramic-based piezoelectric material capable of implementing a relatively strong vibration, or can be configured as a piezoelectric ceramic having a perovskite-based crystal structure. For example, the vibration generator 1310 can be a vibration generating device, a vibration film, a vibration generating film, a vibrator, an active vibrator, an active vibration generator, an actuator, an exciter, a film actuator, a film exciter, an ultrasonic actuator, an active vibration member, or the like, but embodiments of the present disclosure are not limited thereto.

The vibration generator 1310 according to an embodiment of the present disclosure can include a vibration generating part 1311.

The vibration generating part 1311 can be configured to vibrate by the piezoelectric effect based on a driving signal. For example, the vibration generating part 1311 can include a piezoelectric type vibration part or a piezoelectric vibration part. The vibration generating part 1311 can include at least one or more of a piezoelectric inorganic material and a piezoelectric organic material. For example, the vibration generating part 1311 can be a vibration device, a piezoelectric device, a piezoelectric device part, a piezoelectric device layer, a piezoelectric structure, a piezoelectric vibration part, a piezoelectric vibration layer, or the like, but embodiments of the present disclosure are not limited thereto.

The vibration generating part 1311 according to an embodiment of the present disclosure can include a vibration part 1311*a*, a first electrode part 1311*b*, and a second electrode part 1311*c*.

The vibration part 1311*a* can include a piezoelectric material or an electroactive material which includes a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and thus a vibration is generated by an electric field based on a reverse voltage applied thereto. For example, the vibration part 1311*a* can be a piezoelectric layer, a piezoelectric material layer, an electroactive layer, a piezoelectric composite layer, a piezoelectric composite, a piezoelectric ceramic composite, or the like, but embodiments of the present disclosure are not limited thereto.

The vibration part 1311*a* can be configured as a ceramic-based material capable of implementing a relatively strong vibration, or can be configured as a piezoelectric ceramic having a perovskite-based crystalline structure. The perovskite-based crystalline structure can have a piezoelectric effect and/or an inverse piezoelectric effect and can be a plate-shaped structure having orientation or alignment. The perovskite-based crystalline structure can be represented by a chemical formula "$ABO_3$". In the chemical formula, "A" can include a divalent metal element, and "B" can include a tetravalent metal element. As an embodiment of the present disclosure, in the chemical formula "$ABO_3$", "A", and "B" can be cations, and "O" can be anions. For example, the vibration part 1311*a* can include at least one or more of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)- based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration part 1311*a* can include at least one or more of calcium titanate ($CaTiO_3$), $BaTiO_3$, and $SrTiO_3$, without lead (Pb), but embodiments of the present disclosure are not limited thereto.

The first electrode part 1311*b* can be disposed at a first surface (or an upper surface or a front surface) 1311*s*1 of the vibration part 1311*a*. The first electrode part 1311*b* can have a same size as the vibration part 1311*a*, or can have a size which is smaller than the vibration part 1311*a*.

The second electrode part 1311*c* can be disposed at a second surface (or a lower surface or a rear surface) 1311*s*2 which is opposite to or different from the first surface 1311*s*1 of the vibration part 1311*a*. The second electrode part 1311*c* can have a same size as the vibration part 1311*a*, or can have a size which is smaller than the vibration part 1311*a*. For example, the second electrode part 1311*c* can have a same shape as the vibration part 1311*a*, but embodiments of the present disclosure are not limited thereto.

According to an embodiment of the present disclosure, in order to prevent electrical short circuit between the first electrode part 1311*b* and the second electrode part 1311*c*, each of the first electrode part 1311*b* and the second electrode part 1311*c* can be formed at a remaining portion except a periphery portion of the vibration part 1311*a*. For example, the first electrode part 1311*b* can be formed at an entire remaining portion except a periphery portion of the first surface 1311*s*1 of the vibration part 1311*a*. For example, the second electrode part 1311*c* can be formed at an entire remaining portion except a periphery portion of the second surface 1311*s*2 of the vibration part 1311*a*. For example, a distance between a lateral surface (or a sidewall) of each of the first electrode part 1311*b* and the second electrode part 1311*c* and a lateral surface (or a sidewall) of the vibration part 1311*a* can be at least 0.5 mm or more. For example, the distance between the lateral surface of each of the first electrode part 1311*b* and the second electrode part 1311*c* and the lateral surface of the vibration part 1311*a* can be at least 1 mm or more, but embodiments of the present disclosure are not limited thereto.

One or more of the first electrode part 1311*b* and the second electrode part 1311*c* according to an embodiment of the present disclosure can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration part 1311*a*, each of the first electrode part 1311*b* and the second electrode part 1311*c* can include silver (Ag) having a low resistivity. For example, the carbon can include one or more of carbon black, ketjen black, carbon nanotube, and a carbon material including graphite, but embodiments of the present disclosure are not limited thereto.

The vibration part 1311*a* can be polarized (or poling) by a certain voltage applied to the first electrode part 1311*b* and the second electrode part 1311*c* in a certain temperature atmosphere, or a temperature atmosphere that can be changed from a high temperature to a room temperature, but embodiments of the present disclosure are not limited thereto. For example, a polarization direction (or a poling direction) formed in the vibration part 1311*a* can be formed or aligned (or arranged) from the first electrode part 1311*b* to the second electrode part 1311*c*, but embodiments of the present disclosure are not limited thereto. For example, the polarization direction (or the poling direction) formed in the vibration part 1311*a* can be formed or aligned (or arranged) from the second electrode part 1311*c* to the first electrode part 1311*b*.

The vibration part 1311*a* can alternately and repeatedly contract and/or expand by an inverse piezoelectric effect based on a driving signal applied to the first electrode part 1311*b* and the second electrode part 1311*c* from the outside to vibrate. For example, the vibration part 1311*a* can vibrate in a vertical direction (or thickness direction) and in a planar direction by the signal applied to the first electrode part 1311*b* and the second electrode part 1311*c*. The vibration part 1311*a* can be displaced (or vibrated or driven) by contraction and/or expansion of the planar direction, thereby improving a vibration characteristic including a sound characteristic and/or a sound pressure level characteristic of the vibration generator 1310.

The vibration generator 1310 according to an embodiment of the present disclosure can further include a first cover member 1313 and a second cover member 1315.

The first cover member 1313 can be disposed at a first surface of the vibration generating part 1311. For example, the first cover member 1313 can be configured to cover the first electrode part 1311*b* of the vibration generating part 1311. For example, the first cover member 1313 can be at the first electrode part 1311*b*. For example, the first cover member 1313 can be configured to have a larger size than the vibration generating part 1311. The first cover member 1313 can be configured to protect the first surface of the vibration generating part 1311 and the first electrode part 1311*b*.

The second cover member 1315 can be disposed at a second surface of the vibration generating part 1311. For example, the second cover member 1315 can be configured to cover the second electrode part 1311*c* of the vibration generating part 1311. For example, the second cover member 1315 can be at the second electrode part 1311*c*. For example, the second cover member 1315 can be configured to have a larger size than the vibration generating part 1311 and can be configured to have a same size as the first cover member 1313. The second cover member 1315 can be configured to protect the second surface of the vibration generating part 1311 and the second electrode part 1311*c*.

The first cover member 1313 and the second cover member 1315 according to an embodiment of the present disclosure can include a same material or a different material. For example, each of the first cover member 1313 and the second cover member 1315 can be a polyimide (PI) film, a polyethylene terephthalate (PET) film, or a polyethylene naphthalate (PEN) film, but embodiments of the present disclosure are not limited thereto.

The first cover member 1313 can be connected or coupled to the first surface of the vibration generating part 1311 or the first electrode part 1311*b* by a first adhesive layer 1317. For example, the first cover member 1313 can be connected or coupled to the first surface of the vibration generating part 1311 or the first electrode part 1311*b* by a film laminating process using the first adhesive layer 1317.

The second cover member 1315 can be connected or coupled to the second surface of the vibration generating part 1311 or the second electrode part 1311*c* by a second adhesive layer 1319. For example, the second cover member 1315 can be connected or coupled to the second surface of the vibration generating part 1311 or the second electrode part 1311*c* by a film laminating process using the second adhesive layer 1319.

Each of the first adhesive layer 1317 and second adhesive layer 1319 according to an embodiment of the present disclosure can include an electrically insulating material which has adhesiveness and is capable of compression and decompression. For example, each of the first adhesive layer 1317 and the second adhesive layer 1319 can include an epoxy resin, an acrylic resin, a silicone resin, a urethane resin, an acrylic-based polymer, a silicone-based polymer, or a urethane-based polymer, but embodiments of the present disclosure are not limited thereto.

The first adhesive layer 1317 and second adhesive layer 1319 can be configured between the first cover member 1313 and the second cover member 1315 to surround the vibration generating part 1311. For example, one or more of the first adhesive layer 1317 and second adhesive layer 1319 can be configured to partially or completely surround the vibration generating part 1311.

Any one of the first cover member 1313 and the second cover member 1315 can be connected or coupled to the vibration member 331 by the adhesive member 332 and 334 illustrated in FIGS. 3 to 28.

The vibration generator 1310 according to an embodiment of the present disclosure can further include a signal supply member 1320.

The signal supply member 1320 can be configured to supply the driving signal supplied from a driving circuit part to the vibration generating part 1311. The signal supply member 1320 can be configured to be electrically connected to the vibration part 1311*a*. The signal supply member 1320 can be configured to be electrically connected to the first electrode part 1311*b* and the second electrode part 1311*c* of the vibration generating part 1311.

A portion of the signal supply member 1320 can be accommodated (or inserted) between the first cover member 1313 and the second cover member 1315. An end portion (or a distal end portion or one side) of the signal supply member 1320 can be disposed or inserted (or accommodated) between one edge portion (or one periphery portion) of the first cover member 1313 and one edge portion (or one periphery portion) of the second cover member 1315. The one edge portion of the first cover member 1313 and the one edge portion of the second cover member 1315 can accommodate or vertically (or up and down) cover the end portion (or the distal end portion or the one side) of the signal supply member 1320. Accordingly, the signal supply member 1320 can be integrated (or configured) as one body with the vibration generating part 1311. Accordingly, the sound generating module 330 or the vibration apparatus 333 and 335 can be implemented (or configured) in a film type integrated with the signal supply member 1320. For example, the signal supply member 1320 can be configured as one part (or one component) with the vibration generating part 1311, thereby realizing an effect of uni-materialization. For example, the signal supply member 1320 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 1320 according to an embodiment of the present disclosure can include a base member 1321 and a plurality of signal lines 1323*a* and 1323*b*. For example, the signal supply member 1320 can include a base member 1321, a first signal line 1323*a*, and a second signal line 1323*b*.

The base member 1321 can include a transparent or opaque plastic material, but embodiments of the present disclosure are not limited thereto. The base member 1321 can have a certain width along a first direction X and can be extended long along a second direction Y intersecting with the first direction X.

The first signal line 1323*a* and the second signal line 1323*b* can be disposed at the first surface of the base member 1321 in parallel with the second direction Y and can be spaced apart from each other or electrically separated from each other along the first direction X. The first signal line 1323*a* and the second signal line 1323*b* can be disposed in parallel to each other at the first surface of the base member 1321. For example, the first signal line 1323*a* and the second signal line 1323*b* can be implemented in a line shape by patterning of a metal layer (or a conductive layer) formed or deposited at the first surface of the base member 1321.

End portions (or distal end portions or one sides) of the first signal line 1323*a* and the second signal line 1323*b* can be separated from each other, and thus, can be individually curved or bent.

The end portion (or the distal end portion or the one side) of the first signal line 1323*a* can be electrically connected to the first electrode part 1311*b* of the vibration generating part 1311. For example, the end portion of the first signal line 1323*a* can be electrically connected to at least a portion of the first electrode part 1311*b* of the vibration generating part 1311 in the one edge portion of the first cover member 1313. For example, the end portion (or the distal end portion or the one side) of the first signal line 1323*a* can be electrically and directly connected to at least a portion of the first electrode part 1311*b* of the vibration generating part 1311. For example, the end portion (or the distal end portion or the one side) of the first signal line 1323*a* can be electrically connected to or directly contact the first electrode part 1311*b* of the vibration generating part 1311. For example, the end portion of the first signal line 1323*a* can be electrically connected to the first electrode part 1311*b* by a conductive double-sided tape. Accordingly, the first signal line 1323*a* can be configured to transfer a first driving signal, supplied from a driving circuit part (or a vibration driver), to the first electrode part 1311*b* of the vibration generating part 1311.

The end portion (or the distal end portion or the one side) of the second signal line 1323*b* can be electrically connected to the second electrode part 1311*c* of the vibration generating part 1311. For example, the end portion of the second signal line 1323*b* can be electrically connected to at least a portion of the second electrode part 1311*c* of the vibration generating part 1311 in the one edge portion of the second cover member 1315. For example, the end portion of the second signal line 1323*b* can be electrically and directly connected to at least a portion of the second electrode part 1311*c* of the vibration generating part 1311. For example, the end portion of the second signal line 1323*b* can be electrically connected to or directly contact the second electrode part 1311*c* of the vibration generating part 1311. For example, the end portion of the second signal line 1323*b* can be electrically connected to the second electrode part 1311*c* by a conductive double-sided tape. Accordingly, the second signal line 1323*b* can be configured to transfer a second driving signal, supplied from the driving circuit part (or vibration driver), to the second electrode part 1311*c* of the vibration generating part 1311.

The signal supply member 1320 according to an embodiment of the present disclosure can further include an insulation layer 1325.

The insulation layer 1325 can be disposed at the first surface of the base member 1321 to cover each of the first signal line 1323*a* and the second signal line 1323*b* other than the end portion (or one side) of the signal supply member 1320.

An end portion (or one side) of the signal supply member 1320 including an end portion (or one side) of the base member 1321 and an end portion (or one side) 1325*a* of the insulation layer 1325 can be inserted (or accommodated) between the first cover member 1313 and the second cover member 1315 and can be fixed between the first cover member 1313 and the second cover member 1315 by a first adhesive layer 1317 and the second adhesive layer 1319. Accordingly, the end portion (or one side) of the first signal line 1323*a* can be maintained with being electrically connected to the first electrode part 1311*b* of the vibration generating part 1311, and the end portion (or one side) of the second signal line 1323*b* can be maintained with being electrically connected to the second electrode part 1311*c* of the vibration generating part 1311. In addition, the end portion (or one side) of the signal supply member 1320 can be inserted (or accommodated) and fixed between the vibration generating part 1311 and the first cover member 1313, and thus, a contact defect between the vibration generator 1310 and the signal supply member 1320 caused by the movement of the signal supply member 1320 can be prevented.

In the signal supply member 1320 according to an embodiment of the present disclosure, each of the end portion (or one side) of the base member 1321 and the end portion (or one side) 1325*a* of the insulation layer 1325 can be removed. For example, each of the end portion of the first signal line 1323*a* and the end portion of the second signal line 1323*b* can be exposed at the outside without being supported or covered by each of the end portion (or one side) of the base member 1321 and the end portion (or one side) 1325*a* of the insulation layer 1325, respectively. For example, the end portion (or one side) of each of the first signal line 1323*a* and the second signal line 1323*b* can protrude (or extend) to have a certain length from an end 1321*e* of the base member 1321 or an end 1325*e* of the insulation layer 1325. Accordingly, each of the end portion (or the distal end portion or the one side) of each of the first signal line 1323*a* and the second signal line 1323*b* can be individually or independently bent.

The end portion (or one side) of the first signal line 1323*a*, which is not supported by the end portion (or one side) of the base member 1321 and the end portion 1325*a* of the insulation layer 1325, can be directly connected to or directly contact the first electrode part 1311*b* of the vibration generating part 1311. The end portion (or one side) of the second signal line 1323*b*, which is not supported by the end portion (or one side) of the base member 1321 and the end portion 1325*a* of the insulation layer 1325, can be directly connected to or directly contact the second electrode part 1311*c* of the vibration generating part 1311.

According to an embodiment of the present disclosure, a portion of the signal supply member 1320 or a portion of the base member 1321 can be disposed or inserted (or accommodated) between the first cover member 1313 and the second cover member 1315, and thus, the signal supply member 1320 can be integrated (or configured) as one body with the vibration generating part 1311. Accordingly, the vibration generating part 1311 and the signal supply member 1320 can be configured as one part (or one component), and thus, an effect of uni-materialization can be obtained.

According to an embodiment of the present disclosure, the first signal line 1323*a* and the second signal line 1323*b* of the signal supply member 1320 can be integrated (or configured) as one body with the vibration generator 1310, and thus, a soldering process for an electrical connection between the vibration generator 1310 and the signal supply member 1320 may not be needed. Accordingly, a manufacturing process and a structure of the vibration apparatus 333 and 335 can be simplified, and hazards associated with the soldering process can be reduced.

The signal supply member 1320 can be unloaded to the outside through the line part 340 illustrated in FIGS. 3, 5, 7, 9, 11, 13, 15, and 18 to 28 and electrically connected to the driving circuit part.

Figure 32:
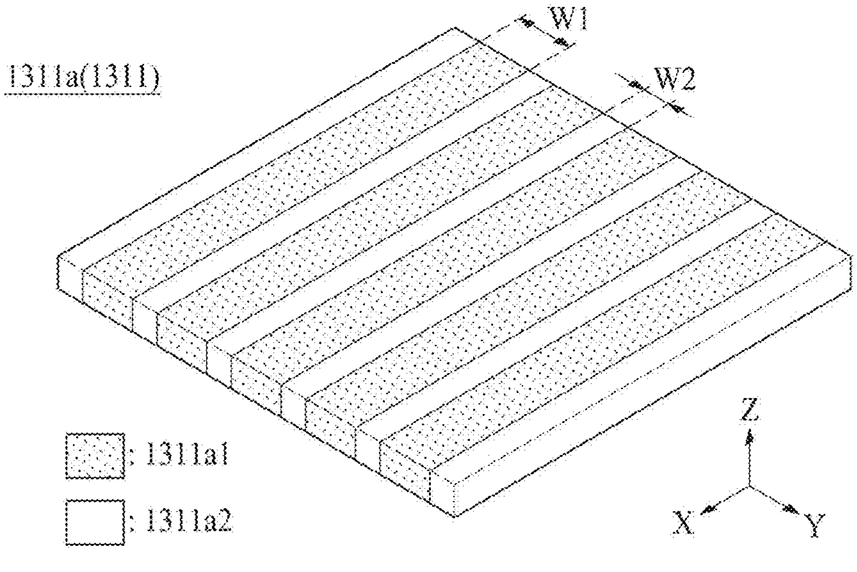
FIG. 32 illustrates a vibration part according to another embodiment of the present disclosure.

FIG. 32 illustrates a vibration part according to another embodiment of the present disclosure. FIG. 32 illustrates another embodiment of the vibration part described above with reference to FIGS. 29 to 31.

With reference to FIGS. 30 and 32, the vibration part 1311*a* according to another embodiment of the present disclosure can include a plurality of first portions 1311*a*1 and a plurality of second portions 1311*a*2. For example, the plurality of first portions 1311*a*1 and the plurality of second portions 1311*a*2 can be alternately and repeatedly disposed along a second direction Y (or a first direction X).

Each of the plurality of first portions 1311*a*1 can include an inorganic material portion having a piezoelectric effect (or a piezoelectric characteristic). For example, each of the plurality of first portions 1311*a*1 can include at least one or more of a piezoelectric inorganic material and a piezoelectric organic material. For example, each of the plurality of first portions 1311*a*1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 1311*a*1 can have a first width W1 parallel to the second direction Y (or the first direction X) and can be extended along the first direction X (or the second direction Y). Each of the plurality of first portions 1311*a*1 can be substantially the same as a vibration part 1311*a* described above with reference to FIGS. 29 to 31, and thus, repeated descriptions are omitted or will be briefly given below.

Each of the plurality of second portions 1311*a*2 can be disposed between the plurality of first portions 1311*a*1. For example, each of the plurality of first portions 1311*a*1 can be disposed between two adjacent second portions 1311*a*2 of the plurality of second portions 1311*a*2. Each of the plurality of second portions 1311*a*2 can have a second width W2 parallel to the second direction Y (or the first direction X) and can be extended along the first direction X (or the second direction Y). The first width W1 can be the same as or different from the second width W2. For example, the first width W1 can be greater than the second width W2. For example, the first portion 1311*a*1 and the second portion 1311*a*2 can include a line shape or a stripe shape which has a same size or different sizes.

Each of the plurality of second portions 1311*a*2 can be configured to fill a gap between two adjacent first portions of the plurality of first portions 1311*a*1. Each of the plurality of second portions 1311*a*2 can be configured to fill a gap between two adjacent first portions of the plurality of first portions 1311*a*1, and thus, can be connected to or attached on lateral surfaces of the first portion 1311*a*1 adjacent thereto. According to an embodiment of the present disclosure, each of the plurality of first portions 1311*a*1 and the plurality of second portions 1311*a*2 can be disposed (or arranged) at a same plane (or a same layer) in parallel with each other. Therefore, the vibration part 1311*a* can be expanded to a desired size or length by a lateral coupling (or connection) of the first portions 1311*a*1 and the second portions 1311*a*2.

According to an embodiment of the present disclosure, each of the plurality of second portions 1311*a*2 can absorb an impact applied to the first portions 1311*a*1, and thus, can enhance the total durability of the first portions 1311*a*1 and provide flexibility to the vibration part 1311*a*. Each of the plurality of second portions 1311*a*2 can include an organic material having a ductile (or an elastic) characteristic. For example, each of the plurality of second portions 1311*a*2 can include one or more of an epoxy-based polymer, an acrylic-based polymer, and a silicone-based polymer, but embodiments of the present disclosure are not limited thereto. For example, each of the plurality of second portions 1311*a*2 can be an organic portion, an organic material portion, an adhesive portion, a stretch portion, a bending portion, a damping portion, or a ductile portion, but embodiments of the present disclosure are not limited thereto.

A first surface of each of the plurality of first portions 1311*a*1 and the plurality of second portions 1311*a*2 can be connected to the first electrode part 1311*b* in common. A second surface of each of the plurality of first portions 1311*a*1 and the plurality of second portions 1311*a*2 can be connected to the second electrode part 1311*c* in common. For example, one or both of the first electrode part 1311*b* and the second electrode part 1311*c* can be formed as pattern-shaped electrodes to correspond only to the plurality of first portions 1311*a*1.

The plurality of first portions 1311*a*1 and the plurality of second portion 1311*a*2 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*1 having a vibration characteristic and can be bent in a curved shape by the second portion 1311*a*2 having flexibility.

Figure 33:
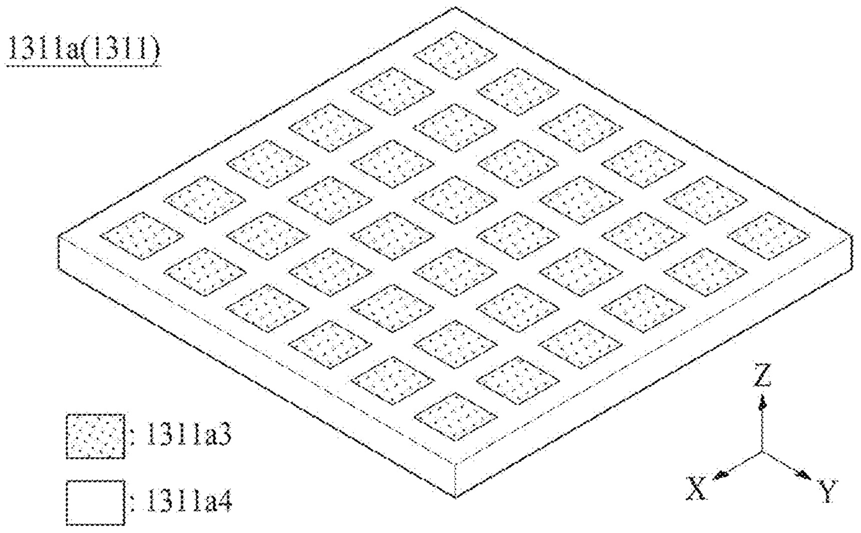
FIG. 33 illustrates a vibration part according to another embodiment of the present disclosure.

FIG. 33 illustrates a vibration part according to another embodiment of the present disclosure. FIG. 33 illustrates another embodiment of the vibration part described above with reference to FIGS. 29 to 31.

With reference to FIGS. 30 and 33, the vibration part 1311*a* according to another embodiment of the present disclosure can include a plurality of first portions 1311*a*3 and a second portion 1311*a*4 disposed between the plurality of first portions 1311*a*3.

Each of the plurality of first portions 1311*a*3 can be disposed to be spaced apart from one another along each of the first direction X and the second direction Y. For example, each of the plurality of first portions 1311*a*3 can have a hexahedral shape having a same size and can be disposed in a lattice shape, but embodiments of the present disclosure are not limited thereto. For example, each of the plurality of first portions 1311*a*3 can have a circular shape plate, an oval shape plate, or a polygonal shape plate, which has a same size as each other, but embodiments of the present disclosure are not limited thereto.

Each of the plurality of first portions 1311*a*3 can be substantially the same as the first portion 1311*a*1 described above with reference to FIG. 32, and thus, repeated descriptions are omitted or will be briefly given below.

The second portion 1311*a*4 can be disposed between the plurality of first portions 1311*a*3 along each of the first direction X and the second direction Y. The second portion 1311*a*4 can be configured to fill a gap between two adjacent first portions 1311*a*3, or to be adjacent to each of the plurality of first portions 1311*a*3 or to surround each of the plurality of first portions 1311*a*3, and thus, the second portion 1311*a*4 can be connected to or attached on the first portion 1311*a*3 adjacent thereto. The second portion 1311*a*4 can be substantially the same as the second portion 1311*a*2 described above with reference to FIG. 32, and thus, repeated descriptions are omitted or will be briefly given below.

A first surface of each of the plurality of first portions 1311*a*3 and the second portions 1311*a*4 can be connected to the first electrode part 1311*b* in common. A second surface of each of the plurality of first portions 1311*a*3 and the second portions 1311*a*4 can be connected to the second electrode part 1311*c* in common. For example, one or both of the first electrode part 1311*b* and the second electrode part 1311*c* can be formed as pattern-shaped electrodes to correspond only to the plurality of first portions 1311*a*3.

The plurality of first portions 1311*a*3 and the second portion 1311*a*4 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*3 having a vibration characteristic and can be bent in a curved shape by the second portion 1311*a*4 having flexibility.

Figure 34:
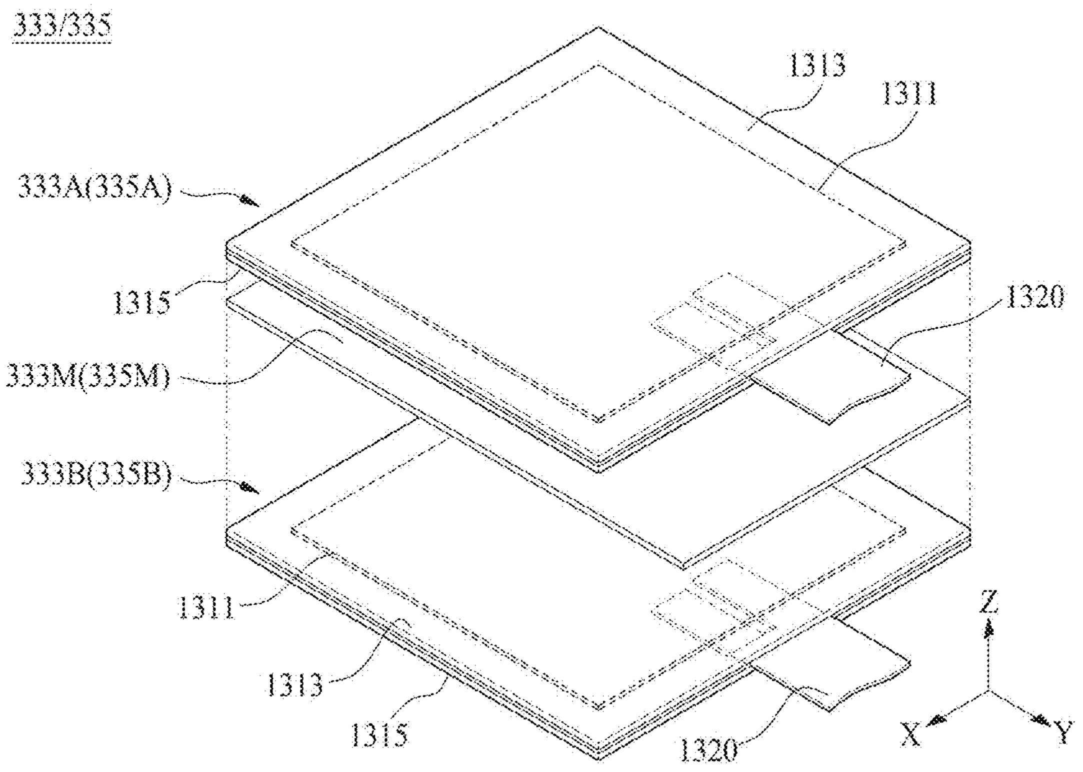
FIG. 34 illustrates a vibration apparatus according to another embodiment of the present disclosure.

FIG. 34 illustrates a vibration apparatus according to another embodiment of the present disclosure. FIG. 34 illustrates a vibration apparatus including one or more vibration generators according to another embodiment of the present disclosure.

With reference to FIG. 34, the vibration apparatus 333 and 335 according to another embodiment of the present disclosure can include two or more vibration generators 333A, 333B, 335A, and 335B. For example, the vibration apparatus 333 and 335 can include a first vibration generator 333A and 335A and a second vibration generator 333B and 335B.

The first vibration generator 333A and 335A and the second vibration generator 333B and 335B can overlap or be stacked with each other to be displaced (or driven or vibrated) in a same direction to maximize an amplitude displacement of the vibration apparatus 333 and 335 or an amplitude displacement of a vibration member 331. For example, the first vibration generator 333A and 335A and the second vibration generator 333B and 335B can have substantially the same size, but embodiments of the present disclosure are not limited thereto. For example, the first vibration generator 333A and 335A and the second vibration generator 333B and 335B can have substantially the same size within an error range of a manufacturing process, but embodiments of the present disclosure are not limited thereto. Therefore, the first vibration generator 333A and 335A and the second vibration generator 333B and 335B can maximize the amplitude displacement of the vibration apparatus 333 and 335 and/or the amplitude displacement of the vibration member 331.

According to an embodiment of the present disclosure, any one of the first vibration generator 333A and 335A and the second vibration generator 333B and 335B can be connected or coupled to the vibration member 331 by an adhesive member 332 and 334 illustrated in FIGS. 3 to 28. For example, the first vibration generator 333A and 335A can be connected or coupled to the vibration member 331 by the adhesive member 332 and 334.

Each of the first vibration generator 333A and 335A and the second vibration generator 333B and 335B can be the same as or substantially the same as the vibration generating part 1311 described above with reference to FIGS. 29 to 33, and thus, like reference numeral refer to like element and repeated descriptions are omitted or will be briefly given below.

The vibration apparatus 333 and 335 according to another embodiment of the present disclosure can further include an intermediate member 333M and 335M.

The intermediate member 333M and 335M can be disposed or connected between the first vibration generator 333A and 335A and the second vibration generator 333B and 335B. For example, the intermediate member 333M and 335M can be disposed or connected between the second cover member 1315 of the first vibration generator 333A and 335A and the first cover member 1313 of the second vibration generator 333B and 335B. For example, the intermediate member 333M and 335M can be an adhesive member or a connection member, but embodiments of the present disclosure are not limited thereto.

The intermediate member 333M and 335M according to an embodiment of the present disclosure can be configured in a material including an adhesive layer which is good in adhesive force or attaching force with respect to each of the first vibration generator 333A and 335A and the second vibration generator 333B and 335B. For example, the intermediate member 333M and 335M can include a foam pad, a double-sided tape, a double-sided foam tape, a double-sided pad, a double-sided foam pad, or an adhesive, or the like, but embodiments of the present disclosure are not limited thereto. For example, an adhesive layer of the intermediate member 333M and 335M can include epoxy, acrylic, silicone, or urethane, but embodiments of the present disclosure are not limited thereto. For example, the adhesive layer of the intermediate member 333M and 335M can include a urethane-based material (or substance) having relatively ductile characteristic. Accordingly, the vibration loss caused by displacement interference between the first vibration generator 333A and 335A and the second vibration generator 333B and 335B can be reduced or minimized, or each of the first vibration generator 333A and 335A and the second vibration generator 333B and 335B can be freely displaced (or vibrated or driven).

The vibration apparatus 333 and 335 according to another embodiment of the present disclosure can include the first vibration generator 333A and 335A and the second vibration generator 333B and 335B which are stacked (or piled or overlap) to vibrate (or displace or drive) in the same direction, and thus, the amount of displacement or an amplitude displacement can be maximized or increase. Accordingly, the amount of displacement (or a bending force or a driving force) or an amplitude of displacement of the vibration member 331 can be maximized or increased.

Figure 35:
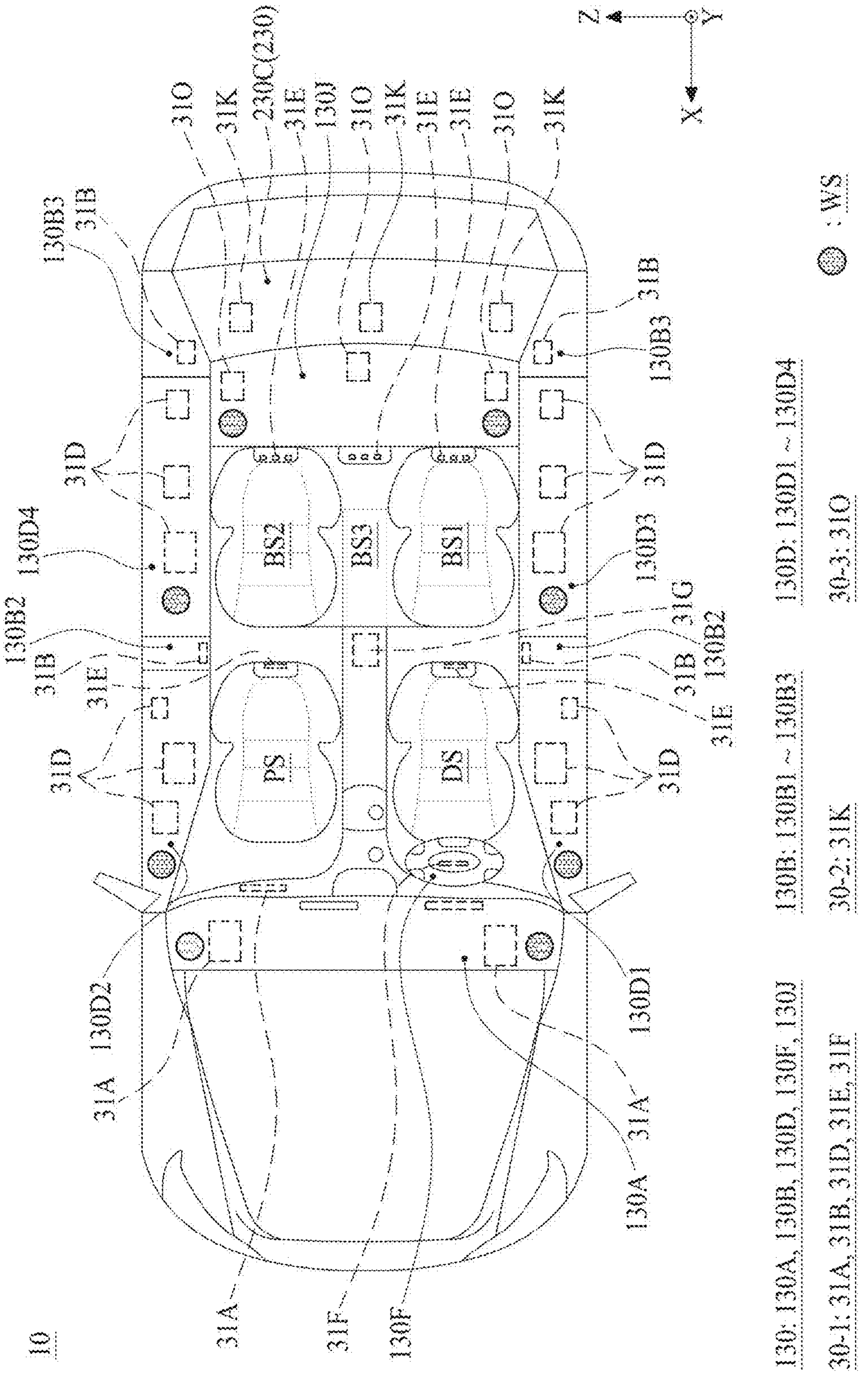
FIG. 35 illustrates a vehicular apparatus according to an embodiment of the present disclosure.
Figure 36:
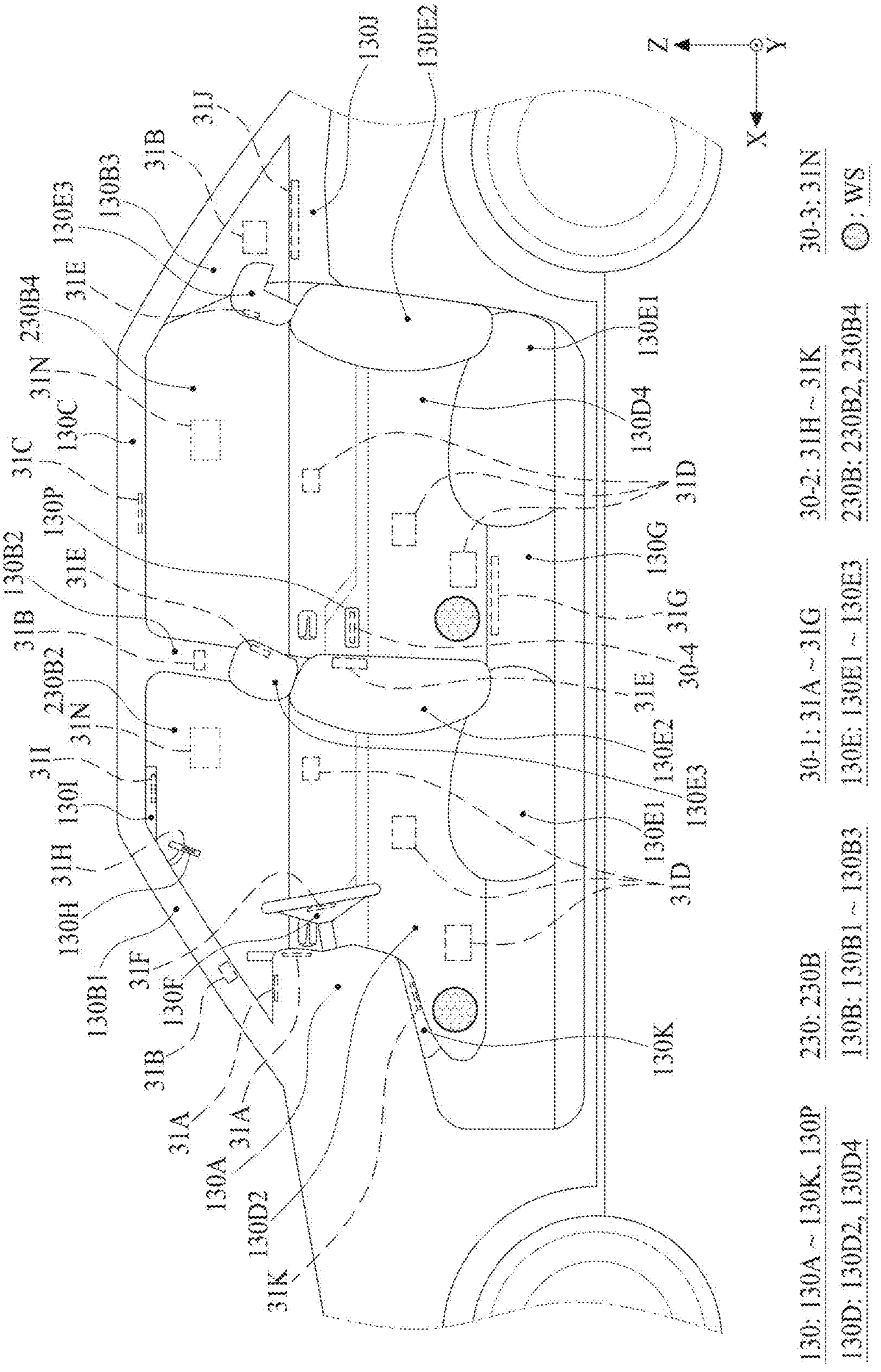
FIG. 36 illustrates a vehicular apparatus according to an embodiment of the present disclosure.
Figure 37:
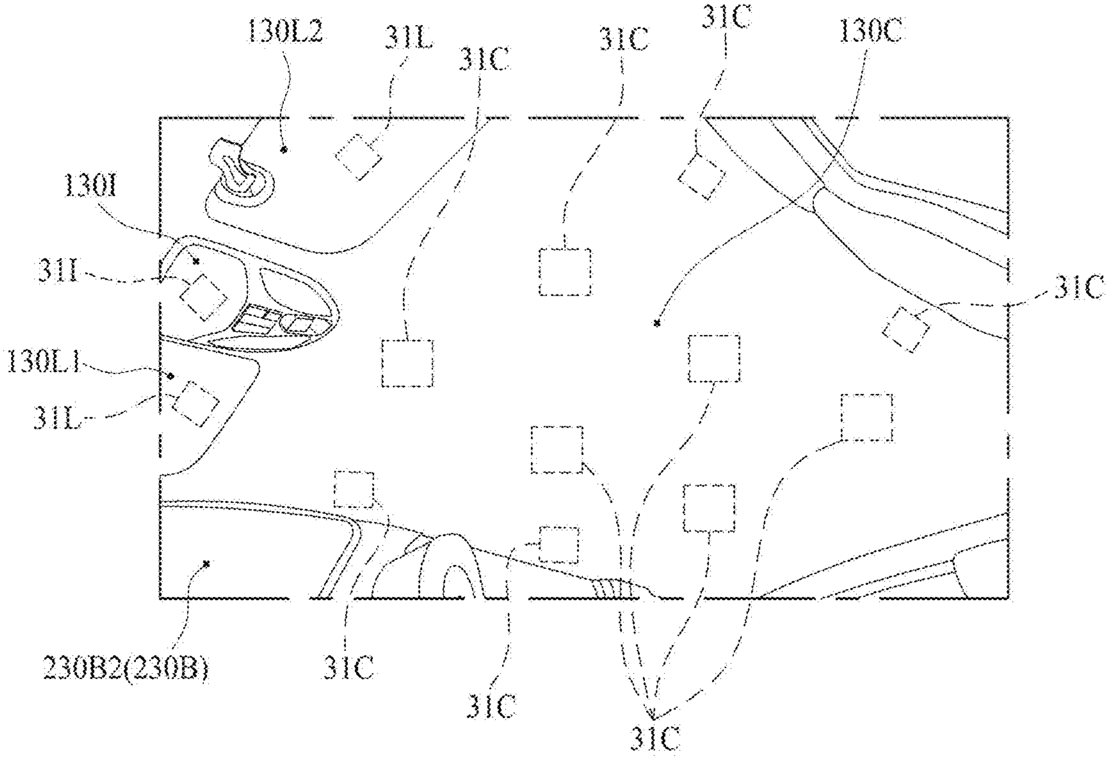
FIG. 37 illustrates a sound generating apparatus disposed at a roof of a vehicular apparatus illustrated in FIGS. 35 and 36 according to an embodiment of the present disclosure.
Figure 38:
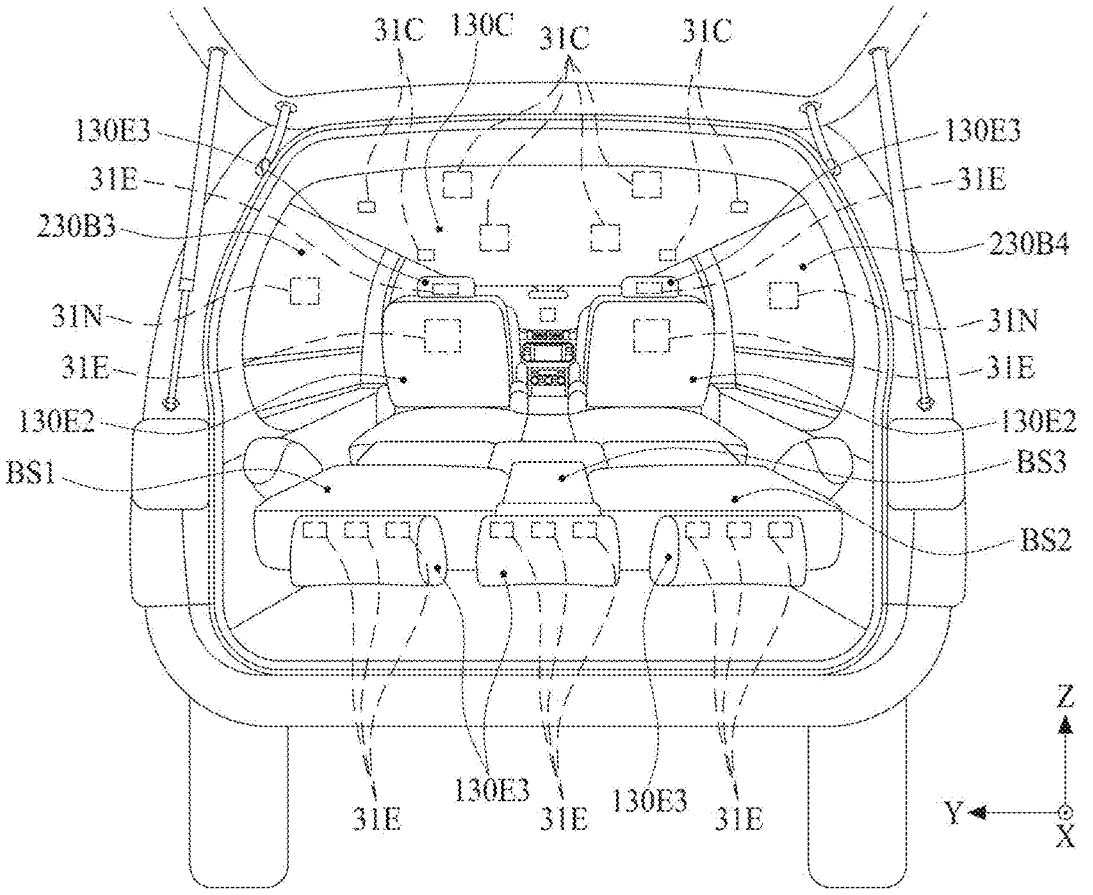
FIG. 38 illustrates a sound generating apparatus disposed at a roof and a seat of a vehicular apparatus illustrated in FIGS. 35 and 36 according to an embodiment of the present disclosure.

FIG. 35 illustrates a vehicular apparatus according to an embodiment of the present disclosure. FIG. 36 illustrates a vehicular apparatus according to an embodiment of the present disclosure. FIG. 37 illustrates a sound generating apparatus disposed at a roof of a vehicular apparatus illustrated in FIGS. 35 and 36 according to an embodiment of the present disclosure. FIG. 38 illustrates a sound generating apparatus disposed at a roof and a seat of a vehicular apparatus illustrated in FIGS. 35 and 36 according to an embodiment of the present disclosure. Descriptions of FIGS. 35 to 38 can be described with reference to FIGS. 1 and 2.

With reference to FIGS. 35 to 38, a vehicular apparatus 10 according to an embodiment of the present disclosure can include a vehicle interior material 130 and one or more sound generating apparatuses 30-1, 30-2, and 30-3.

According to an embodiment of the present disclosure, a vehicle interior material 130 can include at least one or more of a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto. The one or more sound generating apparatuses 30-1, 30-2, and 30-3 mat vibrate at least one or more of the dashboard, the pillar interior material (or the pillar trim), the floor interior material (or the floor carpet), the roof interior material (or the headliner), the door interior material (or the door trim), the handle interior material (or the steering cover), the seat interior material, the rear package interior material (or the back seat shelf), the overhead console (or the indoor illumination interior material), the rear view mirror, the glove box, and the sun visor.

With reference to FIG. 35 in conjunction with FIGS. 1 and 2, the one or more sound generating apparatuses 30-1, 30-2, and 30-3 or a sound apparatus 30 can be configured at a region between the vehicle interior material 130 and the main structure 110, or a region between the vehicle interior material 130 and the exterior material 120. The one or more sound generating apparatuses 30-1, 30-2, and 30-3 or the sound apparatus 30 can be disposed at a region between the vehicle interior material 130 and the main structure 110, or a region between the vehicle interior material 130 and the exterior material 120, and can indirectly or directly vibrate one or more of the region between the vehicle interior material 130 and the main structure 110 or the region between the vehicle interior material 130 and the exterior material 120 to output sound.

With reference to FIG. 35 in conjunction with FIGS. 1, 2, and 47, the protection member 410 at at least one or more sound generating apparatuses 30-1, 30-2, and 30-3 according to an embodiment of the present disclosure can be disposed closer to at least one of the main structure 110 and the exterior material 120 than the vehicle interior material 130. For example, the protection member 410 in the at least one or more sound generating apparatuses 30-1, 30-2, and 30-3 can be spaced apart from each of the main structure 110 or the exterior material 120. For example, a space between the protection member 410 in the at least one or more sound generating apparatuses 30-1, 30-2, and 30-3 and the main structure 110 can be further included. For example, a space between the protection member 410 in the at least one or more sound generating apparatuses 30-1, 30-2, and 30-3 and the exterior material 120 can be further included. For example, a space between the protection member 410 in the at least one or more sound generating apparatuses 30-1, 30-2, and 30-3 and the main structure 110 and/or a space between the protection member 410 in the at least one or more sound generating apparatuses 30-1, 30-2, and 30-3 and the exterior material 120 can be further included. For example, the vehicular apparatus 10 according to an embodiment of the present disclosure can further include a space between the protection member 410 and one or more of the main structure 110 and the exterior material 120.

The vehicular apparatus 10 according to an embodiment of the present disclosure can include a first sound generating apparatus 30-1 which is configured to output a sound at the main structure 110, the exterior material 120, and a region between the main structure 110 and the vehicle interior material 130. For example, the first sound generating apparatus 30-1 can be disposed at at least one or more of between the main structure 110 and the exterior material 120 of the vehicular apparatus 10, between the main structure 110 and the vehicle interior material 130, the exterior material 120, the vehicle interior material 130, and between the exterior material 120 and the vehicle interior material 130 to output a sound. For example, the vehicle interior material 130 can output a sound based on a vibration of one or more first sound generating apparatuses 30-1. For example, the vehicle interior material 130 can be exposed at an interior space IS.

The first sound generating apparatus 30-1 can include at least one or more sound generating modules 31A to 31G which are disposed at at least one or more of the dashboard 130A, the pillar interior material 130B, the roof interior material 130C, the door interior material 130D, the seat interior material 130E, the handle interior material 130F, and the floor interior material 130G. For example, the first sound generating apparatus 30-1 can include at least one or more of the first to seventh sound generating modules 31A to 31G, and thus, can output sounds of one or more channels.

With reference to FIGS. 35 to 38, the first sound generating module 31A according to an embodiment of the present disclosure can be disposed between the dashboard 130A and a dash panel and can vibrate the dashboard 130A to output a sound based on a vibration of the dashboard 130A. For example, the first sound generating module 31A can be configured to directly vibrate the dashboard 130A to output a sound based on a vibration of the dashboard 130A. For example, the first sound generating module 31A can include a sound generating module 330 or a sound apparatus 30 described above with reference to FIGS. 3 to 34, and thus, repeated descriptions are omitted. For example, the first sound generating module 31A can be a dashboard speaker.

According to an embodiment of the present disclosure, at least one or more of the dash panel and the dashboard 130A can include a first region corresponding to a driver seat DS, a second region corresponding to a passenger seat PS, and a third region (or a middle region) between the first region and the second region. At least one or more of the dash panel and the dashboard 130A can include a fourth region which is inclined to face the passenger seat PS. According to an embodiment of the present disclosure, the first sound generating module 31A can be disposed to vibrate at least one or more of the first to fourth regions of the dashboard 130A. For example, the first sound generating module 31A can be disposed at each of the first and second regions of the dashboard 130A, or can be disposed at each of the first to fourth regions of the dashboard 130A. For example, the first sound generating module 31A can be disposed at each of the first and second regions of the dashboard 130A, or can be disposed at at least one or more of the first to fourth regions of the dashboard 130A. For example, the first sound generating module 31A can be configured to output a sound of about 150 Hz to about 20 kHz. For example, the first sound generating module 31A configured to vibrate at least one or more of the first to fourth regions of the dashboard 130A can have a same sound output characteristic or different sound output characteristics. For example, the first sound generating module 31A configured to vibrate each of the first to fourth regions of the dashboard 130A can have a same sound output characteristic or different sound output characteristics.

The second sound generating module 31B according to an embodiment of the present disclosure can be disposed between the pillar interior material 130B and a pillar panel and can vibrate the pillar interior material 130B to output a sound based on a vibration of the pillar interior material 130B. For example, the second sound generating module 31B can directly vibrate the pillar interior material 130B to output a sound based on a vibration of the pillar interior material 130B. For example, the second sound generating module 31B can include a sound generating module 330 or a sound apparatus 30 described above with reference to FIGS. 3 to 34, and thus, repeated descriptions are omitted. For example, the second sound generating module 31B can be a pillar speaker or a tweeter speaker.

According to an embodiment of the present disclosure, the pillar panel can include a first pillar (or an A pillar) disposed at both sides of a front window, a second pillar (or a B pillar) disposed at both sides of a center of a vehicle body, and a third pillar (or a C pillar) disposed at both sides of a rear portion of the vehicle body. The pillar interior material 130B can include a first pillar interior material 130B1 covering the first pillar, a second pillar interior material 130B2 covering the second pillar, and a third pillar interior material 130B3 covering the third pillar. According to an embodiment of the present disclosure, the second sound generating module 31B can be disposed at at least one or more of a region between the first pillar and the first pillar interior material 130B1, a region between the second pillar and the second pillar interior material 130B2, and a region between the third pillar and the third pillar interior material 130B3, and thus, can vibrate at least one or more of the first to third pillar interior materials 130B1 to 130B3. For example, the second sound generating module 31B can be configured to output a sound at about 2 kHz to about 20 kHz, but embodiments of the present disclosure are not limited thereto. For example, the second sound generating module 31B can be configured to output a sound at about 150 Hz to about 20 kHz. For example, the second sound generating module 31B configured to vibrate at least one or more of the first to third pillar interior materials 130B1 to 130B3 can have a same sound output characteristic or different sound output characteristics. The various sound generating modules can be provided in a vehicle display 150, such as a speedometer 151 or a passenger display 170 such as a detachable tablet or other displays 171.

With reference to FIGS. 36 to 38, the third sound generating module 31C according to an embodiment of the present disclosure can be disposed between the roof interior material 130C and a roof frame (or a roof panel) and can vibrate the roof interior material 130C to output a sound based on a vibration of the roof interior material 130C. For example, the third sound generating module 31C can directly vibrate the roof interior material 130C to output a sound based on a vibration of the roof interior material 130C. For example, the third sound generating module 31C can include a sound generating module 330 or a sound apparatus 30 described above with reference to FIGS. 3 to 34, and thus, repeated descriptions are omitted. For example, the third sound generating module 31C can be a roof speaker.

With reference to FIG. 37, at least one or more the third sound generating modules 31C can be disposed at the roof interior material 130C. For example, at least six or more third sound generating modules 31C can be disposed at the roof interior material 130C, but embodiments of the present disclosure are not limited thereto.

According to an embodiment of the present disclosure, at least one or more of the roof frame and the roof interior material 130C covering the roof frame can include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound generating module 31C can be disposed to vibrate at least one or more among the first to seventh regions of the roof interior material 130C. For example, the third sound generating module 31C can be disposed to vibrate at least one or more of the first to seventh regions of the roof interior material 130C. For example, the third sound generating module 31C can be configured to output a sound of about 150 Hz to about 20 kHz. For example, the third sound generating module 31C configured to vibrate at least one or more of the first to seventh regions of the roof interior material 130C can have a same sound output characteristic or different sound output characteristics. For example, the third sound generating module 31C configured to vibrate each of the first to seventh regions of the roof interior material 130C can have a same sound output characteristic or different sound output characteristics. For example, at least one or more third sound generating modules 31C configured to vibrate at least one or more of the first to seventh regions of the roof interior material 130C can be configured to output a sound of about 2 kHz to about 20 kHz, and the other third sound generating modules 31C can be configured to output a sound of about 150 Hz to about 20 kHz. For example, at least one or more third sound generating modules 31C configured to vibrate each of the first to seventh regions of the roof interior material 130C can be configured to output a sound of about 2 kHz to about 20 kHz, and the other third sound generating modules 31C can be configured to output a sound of about 150 Hz to about 20 KHz.

With reference to FIGS. 35 and 36, the fourth sound generating module 31D according to an embodiment of the present disclosure can be disposed between the door frame and the door interior material 130D and can vibrate the door interior material 130D to output a sound based on a vibration of the door interior material 130D. For example, the fourth sound generating module 31D can directly vibrate the door interior material 130D to output a sound based on a vibration of the door interior material 130D. According to an embodiment of the present disclosure, the fourth sound generating module 31D can include a sound generating module 330 or a sound apparatus 30 described above with reference to FIGS. 3 to 34, and thus, repeated descriptions are omitted. For example, the fourth sound generating module 31D can be a door speaker.

According to an embodiment of the present disclosure, at least one or more of the door frame and the door interior material 130D can include an upper region, a middle region, and a lower region with respect to a height direction Z of the vehicular apparatus 10. For example, the fourth sound generating module 31D can be disposed at at least one or more of the upper region, the middle region, and the lower region between the door frame and the door interior material 130D, and thus, can vibrate at least one or more of the upper region, the middle region, and the lower region of the door interior material 130D.

According to an embodiment of the present disclosure, the upper region of the door interior material 130D can have a relatively small curvature radius. The fourth sound generating module 31D for vibrating the upper region of the door interior material 130D can include the sound apparatus having a flexible characteristic described above with reference to FIGS. 32 and 33.

According to an embodiment of the present disclosure, the door frame can include a first door frame (or a left front door frame), a second door frame (or a right front door frame), a third door frame (or a left rear door frame), and a fourth door frame (or a right rear door frame). According to an embodiment of the present disclosure, the door interior material 130D can include a first door interior material (or a left front door interior material) 130D1 covering the first door frame, a second door interior material (or a right front door interior material) 130D2 covering the second door frame, a third door interior material (or a left rear door interior material) 130D3 covering the third door frame, and a fourth door interior material (or a right rear door interior material) 130D4 covering the fourth door frame. For example, the fourth sound generating module 31D can be disposed at at least one or more of an upper region, a middle region, and a lower region between each of the first to fourth door frames and the first to fourth door interior materials 130D1 to 130D4 and can vibrate at least one or more of the upper region, the middle region, and the lower region of each of the first to fourth door interior materials 130D1 to 130D4.

According to an embodiment of the present disclosure, the fourth sound generating module 31D configured to vibrate the upper region of each of the first to fourth door interior materials 130D1 to 130D4 can be configured to output a sound of about 2 kHz to about 20 kHz, or can be configured to output a sound of about 150 Hz to about 20 kHz. For example, the fourth sound generating module 31D configured to vibrate the upper regions of at least one or more of the first to fourth door interior materials 130D1 to 130D4 can be configured to output a sound of about 2 kHz to about 20 kHz, or can be configured to output a sound of about 150 Hz to about 20 KHz.

According to an embodiment of the present disclosure, the fourth sound generating module 31D configured to vibrate the middle regions and the lower regions of at least one or more of the first to fourth door interior materials 130D1 to 130D4 can be configured to output a sound of about 150 Hz to about 20 kHz. The fourth sound generating module 31D configured to vibrate the middle region and the lower region of each of the first to fourth door interior materials 130D1 to 130D4 can be configured to output a sound of about 150 Hz to about 20 kHz. For example, the fourth sound generating module 31D configured to vibrate the middle regions and the lower regions of at least one or more of the first to fourth door interior materials 130D1 to 130D4 can be one or more of a woofer, a mid-woofer, and a sub-woofer. For example, the fourth sound generating module 31D configured to vibrate the middle region and the lower region of each of the first to fourth door interior materials 130D1 to 130D4 can be one or more of a woofer, a mid-woofer, and a sub-woofer.

Sounds, which are respectively output from the fourth sound generating module 31D disposed at the first door interior material 130D1 and the fourth sound generating module 31D disposed at the second door interior material 130D2, can be combined and output. For example, sounds, which are respectively output from at least one or more of the fourth sound generating modules 31D disposed at the first door interior material 130D1 and the fourth sound generating module 31D disposed at the second door interior material 130D2, can be combined and output. In addition, sounds, which are respectively output from the fourth sound generating module 31D disposed at the third door interior material 130D3 and the fourth sound generating module 31D disposed at the fourth door interior material 130D4 can be combined and output.

According to an embodiment of the present disclosure, the upper region of each of the first to fourth door interior materials 130D1 to 130D4 can include a first upper region adjacent to the dashboard 130A, a second upper region adjacent to the rear seats BS1, BS2, and BS3, and a third upper region between the first upper region and the second upper region. For example, the fourth sound generating module 31D can be disposed at one or more of the first to third upper regions of each of the first to fourth door interior materials 130D1 to 130D4. For example, the fourth sound generating module 31D can be disposed at the first upper region of each of the first and second door interior materials 130D1 and 130D2 and can be disposed at one or more of the second and third upper regions of each of the first and second door interior materials 130D1 and 130D2. For example, the fourth sound generating module 31D can be disposed at one or more among the first to third upper regions of one or more of the first to fourth door interior materials 130D1 to 130D4. For example, the fourth sound generating module 31D configured to vibrate the first upper regions of one or more of the first and second door interior materials 130D1 and 130D2 can be configured to output a sound of about 2 kHz to about 20 kHz, and the fourth sound generating module 31D configured to vibrate one or more among the second and third upper regions of each of the first and second door interior materials 130D1 and 130D2 can be configured to output a sound of about 2 kHz to about 20 kHz, or can be configured to output a sound of about 150 Hz to about 20 kHz. For example, the fourth sound generating module 31D configured to vibrate one or more among the second and third upper regions of at least one or more of the first and second door interior materials 130D1 and 130D2 can be configured to output a sound of about 2 kHz to about 20 kHz, or can be configured to output a sound of about 150 Hz to about 20 KHz.

With reference to FIGS. 35, 36, and 38, the fifth sound generating module 31E according to an embodiment of the present disclosure can be disposed between a seat frame and the seat interior material 130E and can vibrate the seat interior material 130E to output a sound based on a vibration of the seat interior material 130E. For example, the fifth sound generating module 31E can directly vibrate the seat interior material 130E to output a sound based on a vibration of the seat interior material 130E. According to an embodiment of the present disclosure, the fifth sound generating module 31E can include a sound generating module 330 or a sound apparatus 30 described above with reference to FIGS. 3 to 34, and thus, repeated descriptions are omitted. For example, the fifth sound generating module 31E can be a sheet speaker or a headrest speaker.

According to an embodiment of the present disclosure, the seat frame can include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 130E can include the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more of the first to fifth seat frames can include a seat bottom frame, a seat back frame, and a headrest frame. The seat interior material 130E can include a seat bottom interior material 130E1 surrounding the seat bottom frame, a seat back interior material 130E2 surrounding the seat back frame, and a headrest interior material 130E3 surrounding the headrest frame. At least one or more of the seat bottom interior material 130E1, the seat back interior material 130E2, and the headrest interior material 130E3 can include an inner interior material and an outer interior material. For example, the inner interior material can include a foam layer. For example, as described above with reference to FIG. 2, the outer interior material can include an outer member including a fiber or leather. For example, the outer interior material can further include a base member including a plastic material which supports the outer member.

According to an embodiment of the present disclosure, the fifth sound generating module 31E can be disposed at at least one or more of a region between the seat back frame and the seat back interior material 130E2 and a region between the headrest frame and the headrest interior material 130E3, and thus, can vibrate at least one or more of the outer interior material of the seat back interior material 130E2 and the outer interior material of the headrest interior material 130E3.

According to an embodiment of the present disclosure, the fifth sound generating module 31E disposed at at least one or more of the driver seat DS and the passenger seat PS can be disposed at at least one or more of the region between the seat back frame and the seat back interior material 130E2 and the region between the headrest frame and the headrest interior material 130E3.

According to an embodiment of the present disclosure, the fifth sound generating module 31E disposed at at least one or more of the first to third rear seats BS1, BS2, and BS3 can be disposed between the headrest frame and the headrest interior material 130E3. For example, at least one or more of the first to third rear seats BS1, BS2, and BS3 can include at least one or more fifth sound generating modules 31E disposed between the headrest frame and the headrest interior material 130E3.

According to an embodiment of the present disclosure, the fifth sound generating module 31E vibrating the seat back interior materials 130E2 of at least one or more of the driver seat DS and the passenger seat PS can be configured to output a sound of about 150 Hz to about 20 KHz.

According to an embodiment of the present disclosure, the fifth sound generating module 31E vibrating the headrest interior materials 130E3 of at least one or more of the driver seat DS, the passenger seat PS, and the first to third rear seats BS1, BS2, and BS3 can be configured to output a sound of about 2 kHz to about 20 kHz, or can be configured to output a sound of about 150 Hz to about 20 kHz.

With reference to FIGS. 35 and 36, the sixth sound generating module 31F according to an embodiment of the present disclosure can be disposed between a handle frame and the handle interior material 130F and can vibrate the handle interior material 130F to output a sound based on a vibration of the handle interior material 130F. For example, the sixth sound generating module 31F can directly vibrate the handle interior material 130F to output a sound based on a vibration of the handle interior material 130F. According to an embodiment of the present disclosure, the sixth sound generating module 31F can include a sound generating module 330 or a sound apparatus 30 described above with reference to FIGS. 3 to 34, and thus, repeated descriptions are omitted. For example, the sixth sound generating module 31F can be a handle speaker or a steering speaker.

According to an embodiment of the present disclosure, the sixth sound generating module 31F can vibrate the handle interior material 130F to provide a driver with a sound based on a vibration of the handle interior material 130F. For example, the sixth sound generating module 31F can directly vibrate the handle interior material 130F to provide the driver with the sound based on the vibration of the handle interior material 130F. A sound output by the sixth sound generating module 31F can be a sound which is the same as or different from a sound output from each of the first to fifth sound generating modules 31A to 31E. For example, a sound output by the sixth sound generating module 31F can be a sound which is the same as or different from sounds output from at least one or more of the first to fifth sound generating modules 31A to 31E. As an embodiment of the present disclosure, the sixth sound generating module 31F can output a sound which is to be provided to only the driver. As another embodiment of the present disclosure, the sound output by the sixth sound generating module 31F and a sound output by each of the first to fifth sound generating modules 31A to 31E can be combined and output. For example, the sound output by the sixth sound generating module 31F and the sound output by at least one or more of the first to fifth sound generating modules 31A to 31E can be combined and output.

With reference to FIGS. 35 and 36, the seventh sound generating module 31G can be disposed between the floor panel and the floor interior material 130G and can vibrate the floor interior material 130G to output a sound based on a vibration of the floor interior material 130G. For example, the seventh sound generating module 31G can directly vibrate the floor interior material 130G to output the sound based on the vibration of the floor interior material 130G.

The seventh sound generating module 31G can be disposed between the floor panel and the floor interior material 130G disposed between the front seats DS and PS and the third rear seat BS3. For example, the seventh sound generating module 31G can include a sound generating module 330 or a sound apparatus 30 described above with reference to FIGS. 3 to 34, and thus, repeated descriptions are omitted. For example, the seventh sound generating module 31G can be configured to output a sound of about 150 Hz to about 20 kHz. For example, the seventh sound generating module 31G can be a floor speaker, a bottom speaker, or an under speaker.

With reference to FIGS. 35 to 37, the vehicular apparatus or the vehicle 10 according to an embodiment of the present disclosure can further include a second sound generating apparatus 30-2 which is disposed at the vehicle interior material 130 exposed at an interior space. For example, the vehicular apparatus or the vehicle 10 according to an embodiment of the present disclosure can include only the second sound generating apparatus 30-2 instead of the first sound generating apparatus 30-1, or can include all of the first sound generating apparatus 30-1 and the second sound generating apparatus 30-2.

According to an embodiment of the present disclosure, the vehicle interior material 130 can further include a rear view mirror 130H, an overhead console 130I, a rear package interior material 130J, a glove box 130K, and a sun visor 130L, or the like.

The second sound generating apparatus 30-2 can include at least one or more sound generating modules 31H to 31L which are disposed at at least one or more of the rear view mirror 130H, the overhead console 130I, the rear package interior material 130J, the glove box 130K, and the sun visor 130L. For example, the second sound generating apparatus 30-2 can include at least one or more of eighth to twelfth sound generating modules 31H to 31L, and thus, can output sounds of one or more channels.

With reference to FIGS. 35 to 37, the eighth sound generating module 31H can be disposed at the rear view mirror 130H and can vibrate the rear view mirror 130H to output a sound based on a vibration of the rear view mirror 130H. For example, the eighth sound generating module 31H can be configured to directly vibrate the rear view mirror 130H to output the sound based on the vibration of the rear view mirror 130H.

The eighth sound generating module 31H can be disposed between a mirror housing connected to a vehicle body structure and the rear view mirror 130H supported by the mirror housing. According to an embodiment of the present disclosure, the eighth sound generating module 31H can include a sound generating module 330 or a sound apparatus 30 described above with reference to FIGS. 3 to 34, and thus, repeated descriptions are omitted. For example, the eighth sound generating module 31H can be configured to output a sound of about 150 Hz to about 20 kHz. For example, the eighth sound generating module 31H can be a mirror speaker.

With reference to FIGS. 37 and 38, the ninth sound generating module 31I can be disposed at the overhead console 130I and can vibrate a console cover of the overhead console 130I to output a sound based on a vibration of an interior material (or the console cover) of the overhead console 130I. For example, the ninth sound generating module 31I can be configured to directly vibrate the console cover of the overhead console 130I to output the sound based on the vibration of the interior material (or the console cover) of the overhead console 130I.

According to an embodiment of the present disclosure, the overhead console 130I can include a console box buried (or embedded) into the roof panel, a lighting device disposed at the console box, and the console cover covering the lighting device and the console box.

The ninth sound generating module 31I can be disposed between the console cover and the console box of the overhead console 130I and can vibrate the console cover. For example, the ninth sound generating module 31I can be disposed between the console cover and the console box of the overhead console 130I and can directly vibrate the console cover. According to an embodiment of the present disclosure, the ninth sound generating module 31I can include a sound generating module 330 or a sound apparatus 30 described above with reference to FIGS. 3 to 34, and thus, repeated descriptions are omitted. For example, the ninth sound generating module 31I can be configured to output a sound of about 150 Hz to about 20 kHz. For example, the ninth sound generating module 31I can be a console speaker or a lighting speaker.

According to an embodiment of the present disclosure, the vehicular apparatus or the vehicle 10 can further include a center lighting box disposed at a center region of the roof interior material 130C, a center lighting device disposed at the center lighting box, and a center lighting cover covering the center lighting device. In this case, the ninth sound generating module 31I can be further disposed between a center lighting cover and a center lighting box of the center lighting device and can additionally vibrate the center lighting cover.

With reference to FIGS. 35 and 37, the tenth sound generating module 31J can be disposed at the rear package interior material 130J and can vibrate the rear package interior material 130J to output a sound based on a vibration of the rear package interior material 130J. For example, the ninth sound generating module 31I can be configured to directly vibrate the rear package interior material 130J to output the sound based on the vibration of the rear package interior material 130J.

The rear package interior material 130J can be disposed behind the first to third rear seats BS1, BS2, and BS3. For example, a portion of the rear package interior material 130J can be disposed under a rear window 230C.

The tenth sound generating module 31J can be disposed at a rear surface of the rear package interior material 130J and can vibrate the rear package interior material 130J. For example, the tenth sound generating module 31J can directly vibrate the rear package interior material 130J. According to an embodiment of the present disclosure, the tenth sound generating module 31J can include a sound generating module 330 or a sound apparatus 30 described above with reference to FIGS. 3 to 34, and thus, repeated descriptions are omitted. For example, the tenth sound generating module 31J can be a rear speaker.

According to an embodiment of the present disclosure, the rear package interior material 130J can include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the tenth sound generating module 31J can be disposed to vibrate at least one or more of the first to third regions of the rear package interior material 130J. For example, the tenth sound generating module 31J can be disposed at each of the first and second regions of the rear package interior material 130J, or can be disposed at each of the first to third regions of the rear package interior material 130J. For example, the tenth sound generating module 31J can be disposed at at least one or more of the first and second regions of the rear package interior material 130J, or can be disposed at at least one or more of the first to third regions of the rear package interior material 130J. For example, the tenth sound generating module 31J can be configured to output a sound of about 150 Hz to about 20 kHz. For example, the tenth sound generating module 31J configured to vibrate each of the first to third regions of the rear package interior material 130J can have a same sound output characteristic or different sound output characteristics. For example, the tenth sound generating module 31J configured to vibrate at least one or more of the first to third regions of the rear package interior material 130J can have a same sound output characteristic or different sound output characteristics.

With reference to FIGS. 35 and 37, the eleventh sound generating module 31K can be disposed at a glove box 130K and can vibrate the glove box 130K to output a sound based on a vibration of the glove box 130K. For example, the eleventh sound generating module 31K can directly vibrate the glove box 130K to output the sound based on the vibration of the glove box 130K.

The glove box 130K can be disposed at a dashboard 130A corresponding to a front portion of the passenger seat PS.

The eleventh sound generating module 31K can be disposed at an inner surface of the glove box 130K and can vibrate the glove box 130K. For example, the eleventh sound generating module 31K can directly vibrate the glove box 130K. According to an embodiment of the present disclosure, the eleventh sound generating module 31K can include a sound generating module 330 or a sound apparatus 30 described above with reference to FIGS. 3 to 34, and thus, repeated descriptions are omitted. For example, the eleventh sound generating module 31K can be configured to output a sound of about 150 Hz to about 20 kHz, or can be one or more of a woofer, a mid-woofer, and a sub-woofer. For example, the eleventh sound generating module 31K can be a glove box speaker.

With reference to FIG. 37, the twelfth sound generating module 31L can be disposed at the sun visor 130L and can vibrate the sun visor 130L to output a sound based on a vibration of the sun visor 130L. For example, the twelfth sound generating module 31L can directly vibrate the sun visor 130L to output the sound based on the vibration of the sun visor 130L.

The sun visor 130L can include a first sun visor 130L1 corresponding to the driver seat DS and a second sun visor 130L2 corresponding to the passenger seat PS.

The twelfth sound generating module 31L can be disposed at at least one or more of the first sun visor 130L1 and the second sun visor 130L2 and can vibrate at least one or more of the first sun visor 130L1 and the second sun visor 130L2. For example, the twelfth sound generating module 31L can directly vibrate at least one or more of the first sun visor 130L1 and the second sun visor 130L2. According to an embodiment of the present disclosure, the twelfth sound generating module 31L can include a sound generating module 330 or a sound apparatus 30 described above with reference to FIGS. 3 to 34, and thus, repeated descriptions are omitted. For example, the twelfth sound generating module 31L can be configured to output a sound of about 150 Hz to about 20 kHz. For example, the twelfth sound generating module 31L can be a sun visor speaker.

According to an embodiment of the present disclosure, at least one or more of the first sun visor 130L1 and the second sun visor 130L2 can further include a sun visor mirror. In this case, the twelfth sound generating module 31L can be configured to vibrate a sun visor mirror of at least one or more of the first sun visor 130L1 and the second sun visor 130L2. The twelfth sound generating module 31L can directly vibrate the sun visor mirror of at least one or more of the first sun visor 130L1 and the second sun visor 130L2. The twelfth sound generating module 31L vibrating the sun visor mirror can include a sound generating module 330 or a sound apparatus 30 described above with reference to FIGS. 3 to 34, and thus, repeated descriptions are omitted.

With reference to FIGS. 35 to 37, the vehicular apparatus or the vehicle 10 according to an embodiment of the present disclosure can further include a third sound generating apparatus 30-3 disposed at a vehicle window 230. For example, the vehicular apparatus or the vehicle 10 according to an embodiment of the present disclosure can include the third sound generating apparatus 30-3 instead of at least one or more of the first and second sound generating apparatuses 30-1 and 30-2, or can include all of the first to third sound generating apparatuses 30-1 to 30-3.

The third sound generating apparatus 30-3 can include at least one or more sound generating modules 31N to 31O disposed at the vehicle window 230. For example, the third sound generating apparatus 30-3 can include at least one or more of thirteenth and fourteenth sound generating modules 31N and 31O, and thus, can output sounds of one or more channels. For example, the third sound generating apparatus 30-3 can be a transparent sound generating apparatus.

The vehicle window 230 of the vehicular apparatus or the vehicle 10 can include at least one or more of a front window and a side glass window. The vehicle window 230 of the vehicular apparatus can further include at least one or more of a rear window and a roof window.

The vehicle window 230 according to an embodiment of the present disclosure can be configured to be entirely transparent. The vehicle window 230 according to another embodiment of the present disclosure can include a transparent portion and a semitransparent portion surrounding the transparent portion. The vehicle window 230 according to another embodiment of the present disclosure can include a transparent portion and an opaque portion surrounding the transparent portion.

The sound generating module 330 described above with reference to FIGS. 3 to 34 can be configured to be transparent or semitransparent. For example, when the vehicle window 230 is wholly transparent, the sound generating module 330 can be configured to be transparent and can be disposed at a middle region or a peripheral region of the vehicle window 230. When the vehicle window 230 includes the semitransparent portion or the opaque portion, the sound generating module 330 can be configured to be semitransparent or opaque and can be disposed at the semitransparent portion or the opaque portion of the vehicle window 230. For example, the sound generating module 330 can be a transparent sound generating module.

With reference to FIGS. 35 to 38 in conjunction with FIG. 1, the sound generating module 330 can be disposed at one surface (or an indoor surface) of the vehicle window 230 exposed at inside and/or an interior space IS of the vehicular apparatus or the vehicle 10. For example, a sound generating apparatus 30-1, 30-2, and 30-2 for vehicles can include at least one or more sound generating modules 330 disposed at the vehicle window 230 or a plurality of sound generating modules 330 disposed at the vehicle window 230. As an embodiment of the present disclosure, the sound generating module 330 can be disposed at at least one or more of the front window and the side window and can be further disposed at at least one or more of the rear window and the roof window.

The at least one or more of the thirteenth and fourteenth sound generating modules 31N and 31O can include the transparent or semitransparent sound generating module 330. For example, when the at least one or more of the thirteenth and fourteenth sound generating modules 31N and 31O includes the sound generating module 330, the at least one or more of the thirteenth and fourteenth sound generating modules 31N and 31O can vibrate the vehicle window 230 to output a sound based on a vibration of the vehicle window 230. For example, the at least one or more of the thirteenth and fourteenth sound generating modules 31N and 31O can directly vibrate the vehicle window 230 to output a sound based on a vibration of the vehicle window 230.

According to an embodiment of the present disclosure, the vehicle window 230 can include the front window, the side window 230B, and the rear window. According to an embodiment of the present disclosure, the vehicle window 230 can further include the roof window 230D. For example, when the vehicular apparatus or the vehicle 10 includes the roof window 230D, a portion of a region of the roof frame and the roof interior material 130C can be replaced with the roof window 230D. For example, when the vehicular apparatus or the vehicle 10 includes the roof window 230D, the third sound generating module 31C can be configured to vibrate a periphery portion of the roof interior material 130C surrounding the roof window 230D.

With reference to FIGS. 36 to 38, the thirteenth sound generating module 31N according to an embodiment of the present disclosure can be disposed at the side window 230B and can be configured to output a sound by vibrating itself (or self-vibration thereof), or can be configured to indirectly or directly vibrate the side window 230B to output a sound based on a vibration of the side window 230B. For example, the thirteenth sound generating module 31N can directly vibrate the side window 230B to output a sound based on the vibration of the side window 230B.

According to an embodiment of the present disclosure, the side window 230B can include a first side window (or a right front window) 230B2, a second side window (or a left rear window) 230B3, a third side window (or a right rear window) 230B4, and a fourth side window (or a left front window).

According to an embodiment of the present disclosure, the thirteenth sound generating module 31N can be disposed at at least one or more of the first to third side windows 230B2, 230B3, and 230B4. For example, at least one or more of the first to third side windows 230B2, 230B3, and 230B4 can include at least one or more thirteenth sound generating modules 31N.

According to an embodiment of the present disclosure, the thirteenth sound generating module 31N can be disposed at at least one or more of the first to third side windows 230B2, 230B3, and 230B4 and can output a sound by vibrating itself (or self-vibration thereof), or can vibrate a corresponding side windows 230B2, 230B3, and 230B4 to output a sound. For example, the thirteenth sound generating module 31N can directly vibrate the side windows 230B2, 230B3, and 230B4 to output the sound. For example, the thirteenth sound generating module 31N can be configured to output the sound of 150 Hz to 20 kHz. For example, the thirteenth sound generating module 31N disposed at at least one or more of the first to third side windows 230B2, 230B3, and 230B4 can have a same sound output characteristic or different sound output characteristics. For example, the thirteenth sound generating module 31N can be configured to output the sound of 150 Hz to 20 kHz. For example, the thirteenth sound generating module 31N can be a side window speaker.

With reference to FIG. 35, the fourteenth sound generating module 31O according to an embodiment of the present disclosure can be disposed at the rear window 230C and can output a sound by vibrating itself (or self-vibration thereof), or can vibrate the rear window 230C to output a sound based on a vibration of the rear window 230C. For example, the fourteenth sound generating module 31O can directly vibrate the rear window 230C to output the sound based on the vibration of the rear window 230C.

According to an embodiment of the present disclosure, the rear window 230C can include a first region corresponding to a rear portion of the first rear seat BS1, a second region corresponding to a rear portion of the second rear seat BS2, and a third region corresponding to a rear portion of the third rear seat BS3. According to an embodiment of the present disclosure, the fourteenth sound generating module 31O can be disposed at at least one or more of the first and second regions of the rear window 230C. For example, the fourteenth sound generating module 31O can be disposed at at least one or more of the first to third regions of the rear window 230C. For example, the fourteenth sound generating module 31O can be disposed at at least one or more of the first and second regions of the rear window 230C, or can be disposed at at least one or more of the first to third regions of the rear window 230C. For example, the fourteenth sound generating module 31O can be configured to output a sound of about 150 Hz to about 20 kHz. For example, the fourteenth sound generating module 31O disposed at at least one or more of the first to third regions of the rear window 230C can have a same sound output characteristic or different sound output characteristics. For example, the fourteenth sound generating module 31O disposed at at least one or more of the first to third regions of the rear window 230C can have a same sound output characteristic or different sound output characteristics. For example, the fourteenth sound generating module 31O disposed at at least one or more of the first and second regions of the rear window 230C can be configured to output a sound of about 150 Hz to about 20 kHz, or can be one or more of a woofer, a mid-woofer, and a sub-woofer. For example, the fourteenth sound generating module 31O can be a rear window speaker.

With reference to FIGS. 35 and 36, the vehicular apparatus or the vehicle 10 according to an embodiment of the present disclosure can further include a woofer speaker WS which is disposed at at least one or more of the dashboard 130A, the door frame 130B, and the rear package interior material 130J.

The woofer speaker WS according to an embodiment of the present disclosure can include at least one or more of a woofer, a mid-woofer, and a sub-woofer. For example, the woofer speaker WS can be a speaker which outputs a sound of about 60 Hz to about 150 Hz. Therefore, the woofer speaker WS can output a sound of about 60 Hz to about 150 Hz, and thus, can enhance a low-pitched sound band characteristic of a sound which is output to an interior space.

According to an embodiment of the present disclosure, the woofer speaker WS can be disposed at at least one or more of first and second regions of the dashboard 130A. According to an embodiment of the present disclosure, the woofer speaker WS can be disposed at each of first to fourth door frames of the door frame and can be exposed at a lower region of each of the first to fourth door interior materials 130D1 to 130D4 of the door interior material 130D. For example, the woofer speaker WS can be disposed at at least one or more of the first to fourth door frames of the door frame and can be exposed at the lower regions of at least one or more of the first to fourth door interior materials 130D1 to 130D4 of the door interior material 130D. According to an embodiment of the present disclosure, the woofer speaker WS can be disposed at at least one or more of the first and second regions of the rear package interior material 130J. For example, the fourth sound generating module 31D disposed at the lower region of at least one or more of the first to fourth door interior materials 130D1 to 130D4 can be replaced by the woofer speaker WS.

The vehicular apparatus 10 according to an embodiment of the present disclosure can further include a garnish member 130P which covers a portion of the vehicle interior material 130 exposed at the interior space, and a fourth sound generating apparatus 30-4. For example, the fourth sound generating apparatus 30-4 can be disposed at the garnish member 130P and the vehicle interior material 130 to output a sound. For example, at least one or more of the garnish member 130P and the vehicle interior material 130 can output a sound based on vibrations of fourth sound generating apparatus 30-4.

The garnish member 130P can be configured to cover a portion of the door interior material 130D exposed at the interior space, but embodiments of the present disclosure are not limited thereto. For example, the garnish member 130P can be configured to cover a portion of one or more of the dashboard 130A, the pillar interior material 130B, and the roof interior material 130C, which are exposed at the interior space.

The garnish member 130P according to an embodiment of the present disclosure can include a metal material or a nonmetal material (or a composite nonmetal material) having a material characteristic suitable for generating a sound based on a vibration. For example, a metal material of the garnish member 130P can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 130P can include one or more of wood, plastic, glass, cloth, fiber, rubber, paper, carbon, and leather, but embodiments of the present disclosure are not limited thereto. For example, the garnish member 130P can include a metal material having a material characteristic suitable for generating a sound of a high-pitched sound band, but embodiments of the present disclosure are not limited thereto. For example, the high-pitched sound band can have a frequency of 1 kHz or more or 3 kHz or more, but embodiments of the present disclosure are not limited thereto.

The fourth sound generating apparatus 30-4 can be disposed between the garnish member 130P and the vehicle interior material 130. For example, the fourth sound generating apparatus 30-4 can be a garnish speaker or the like, but embodiments of the present disclosure are not limited thereto.

The fourth sound generating apparatus 30-4 according to an embodiment of the present disclosure can include one or more of the sound generating modules 330 described above with reference to FIGS. 3 to 34. The fourth sound generating apparatus 30-4 can be disposed at a main interior material or the vehicle interior material 130 and a garnish member 130P and can be connected or coupled to the garnish member 130P.

The fourth sound generating apparatus 30-4 according to an embodiment of the present disclosure can be configured to indirectly or directly vibrate the garnish member 130P to output a sound into the interior space of the vehicular apparatus 10. For example, the fourth sound generating apparatus 30-4 can be configured to output a sound of a high-pitched sound band, but embodiments of the present disclosure are not limited thereto.

The vehicular apparatus or the vehicle 10 according to an embodiment of the present disclosure can output a sound to the interior space IS through at least one or more of the first sound generating apparatus 30-1 disposed at the vehicle interior material 130, the second sound generating apparatus 30-2 disposed at the vehicle interior material 130 exposed at the interior space, the third sound generating apparatus 30-3 disposed at the vehicle window 230, and the fourth sound generating apparatus 30-4 disposed at the garnish member 130P, and thus, can output the sound by a vehicle interior material 130 as a vibration plate or a sound vibration plate, thereby outputting a multichannel surround stereo sound.

Figure 39A:
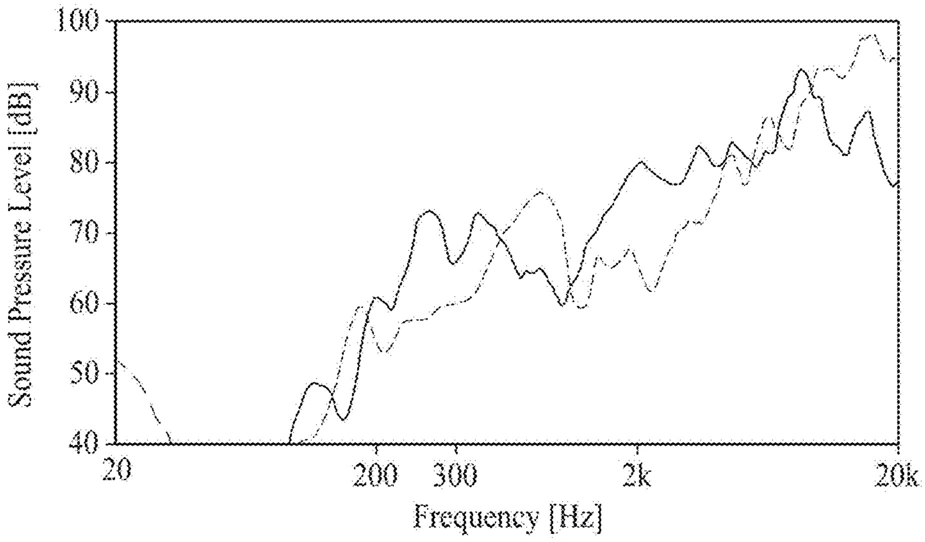
FIG. 39A illustrates a sound output characteristic of an apparatus according to an embodiment of the present disclosure and an experimental example.
Figure 39B:
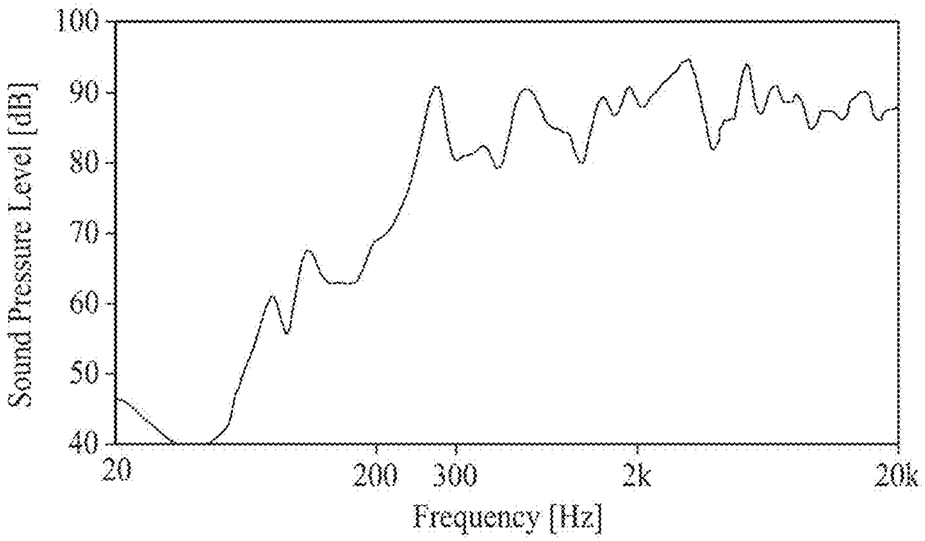
FIG. 39B illustrates a sound output characteristic of an apparatus according to an embodiment of the present disclosure illustrated in FIG. 11.
Figure 39C:
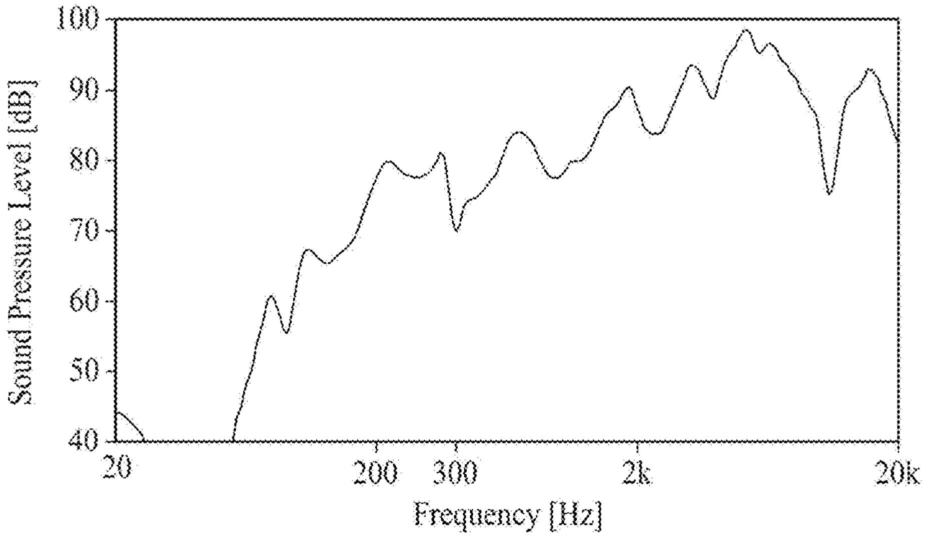
FIG. 39C illustrates a sound output characteristic of an apparatus according to an embodiment of the present disclosure illustrated in FIG. 22.

FIG. 39A illustrates a sound output characteristic of an apparatus according to an embodiment of the present disclosure and an experimental example. FIG. 39B illustrates a sound output characteristic of an apparatus according to an embodiment of the present disclosure illustrated in FIG. 11. FIG. 39C illustrates a sound output characteristic of an apparatus according to an embodiment of the present disclosure illustrated in FIG. 22.

In FIG. 39A, the abscissa axis represents a frequency in hertz (Hz), and the ordinate axis represents a sound pressure level (SPL) in decibels (dB).

The sound output characteristic can be measured by sound analysis equipment. The sound analysis equipment can include a control PC, a sound card for transmitting and receiving sound, an amplifier for amplifying and transmitting the sound generated from the sound card to the sound apparatus, and a microphone for collecting the sound generated in the apparatus based on driving of the vibration apparatus. The sound collected by the microphone is input to the control PC through the sound card, and the sound is checked in a control program to analyze the sound of the apparatus.

The sound output characteristic has been measured in an anechoic chamber, which is closed in all directions. When measuring, an applied frequency signal is applied as a sine sweep within a range of 20 Hz to 20 kHz, and ⅙ octave smoothing has been performed on a measurement result. A separation distance between the apparatus and the microphone is adjusted to be 1 m. However, a measurement method of the sound output characteristic can be not limited thereto.

In FIG. 39A, a solid line represents a sound output characteristic of an apparatus according to an embodiment of the present disclosure illustrated in FIG. 3. A dotted line represents a sound output characteristic of an apparatus according to a comparative example coupled to the interior material 130 by a double-sided tape without the supporting part and the fixing part of FIG. 3.

With reference to FIG. 39A, comparing with the dotted line, in the solid line, it can be seen that a flatness characteristic of a sound pressure level is enhanced.

Comparing with the dotted line, in the solid line, it can be seen that a sound pressure level increases in a pitched sound band of about 190 Hz to 400 Hz, a sound pressure level increases in a pitched sound band of about 650 Hz to 4 kHz, and an undesired sound pressure level is reduced in a high-pitched sound band of 5 kHz or more. Accordingly, in an apparatus including a sound apparatus according to an embodiment of the present disclosure, a sound characteristic and/or a sound pressure level characteristic of a low-pitched sound band can be enhanced, and a balance characteristic or a flatness characteristic of a sound pressure level can be enhanced in a full-range sound band.

With reference to FIG. 39B, it can be seen that the apparatus according to an embodiment of the present disclosure illustrated in FIG. 11 has a sound pressure level of about 70 dB or more in a pitched sound band of about 200 Hz or more, and particularly, has a sound pressure level of about 80 dB or more in a pitched sound band of about 250 Hz or more, and an undesired sound pressure level in a high pitched sound band of 2 kHz or more is reduced. Accordingly, in an apparatus including a sound apparatus according to an embodiment of the present disclosure, a sound characteristic and/or a sound pressure level characteristic of a low-pitched sound band can be enhanced, and a balance characteristic or a flatness characteristic of a sound pressure level can be enhanced in a full-range sound band.

With reference to FIG. 39C, it can be seen that the apparatus according to an embodiment of the present disclosure illustrated in FIG. 22 has a sound pressure level of about 70 dB or more in a pitched sound band of about 180 Hz or more, and particularly, has a sound pressure level of about 80 dB or more in a pitched sound band of about 200 Hz or more, and an undesired sound pressure level in a high pitched sound band of 2 kHz or more is reduced. Accordingly, in an apparatus including a sound apparatus according to an embodiment of the present disclosure, a sound characteristic and/or a sound pressure level characteristic of a low-pitched sound band can be enhanced, and a balance characteristic or a flatness characteristic of a sound pressure level can be enhanced in a full-range sound band.

A sound apparatus for a vehicle and a vehicular apparatus including the same according to one or more embodiments of the present disclosure can be described below.

A sound apparatus for a vehicle according to one or more embodiments can comprise an enclosure including an internal space and a sound generating module at the internal space, and a fixing part configured at the enclosure. The fixing part can be fixed to a supporting part at a vehicle structure.

According to one or more embodiments of the present disclosure, the enclosure can vibrate based on driving of the sound generating module. The vehicle structure can vibrate based on a vibration of the enclosure to output a sound.

According to one or more embodiments of the present disclosure, the sound generating module can comprise a vibration member configured at the internal space and connected to the enclosure, and a vibration apparatus configured at the vibration member.

According to one or more embodiments of the present disclosure, the vibration member can comprise a metal material, or can comprise a single nonmetal material or a composite nonmetal material of one or more of wood, rubber, plastic, carbon, glass, fiber, cloth, paper, mirror, and leather.

According to one or more embodiments of the present disclosure, the enclosure can comprise a first enclosure connected to a first surface of the vibration member and connected to the vehicle structure, and a second enclosure connected to a second surface of the vibration member being different from the first surface of the vibration member. The fixing part can be configured at a side surface of the first enclosure or a side surface of the second enclosure.

According to one or more embodiments of the present disclosure, a size of the first enclosure can be greater than a size of the vibration member.

According to one or more embodiments of the present disclosure, the internal space can comprise a first space between the first surface of the vibration member and the first enclosure, and a second space between the second surface of the vibration member and the second enclosure.

According to one or more embodiments of the present disclosure, the vibration member can comprise at least one or more holes at a periphery of the vibration apparatus. The first space and the second space can be connected to each other through the at least one or more holes of the vibration member.

According to one or more embodiments of the present disclosure, the fixing part can comprise a first fixing member configured in a bar shape at a first side of the first enclosure or the second enclosure and fixed to a first supporting member of the supporting part by a first fastening member, and a second fixing member configured in a bar shape at a second side opposite to the first side of the first enclosure or the second enclosure and fixed to a second supporting member of the supporting part by a second fastening member.

According to one or more embodiments of the present disclosure, the enclosure can comprise a first enclosure connected to the vibration member with the internal space therebetween. The fixing part can be configured at the first enclosure.

According to one or more embodiments of the present disclosure, a size of the first enclosure can be greater than a size of the vibration member.

According to one or more embodiments of the present disclosure, the vibration member can comprise at least one or more holes at a periphery of the vibration apparatus.

According to one or more embodiments of the present disclosure, the fixing part can comprise a first fixing part configured to extend from a first side of the first enclosure and fixed to a first supporting part of the supporting part by a first fastening member, and a second fixing member configured to extend from a second side of the first enclosure and fixed to a second supporting member of the supporting part by a second fastening member.

According to one or more embodiments of the present disclosure, the first fastening member can be fastened to a screw hole (or a fastening hole) at the first supporting member through a hole formed at the first fixing part. The second fastening member can be fastened to a screw hole (or a fastening hole) at the second supporting member through a hole formed at the second fixing part.

According to one or more embodiments of the present disclosure, the fixing part can comprise a first fixing part configured to extend from a first side of the first enclosure and fixed to a first supporting member of the supporting part by a hook coupling scheme; and a second fixing part configured to extend from a second side opposite to the first side of the first enclosure and fixed to a second supporting member of the supporting part by a hook coupling scheme.

According to one or more embodiments of the present disclosure, the vibration apparatus can comprise a first vibration apparatus configured at a first surface of the vibration member, and a second vibration apparatus configured at a second surface of the vibration member being different from the first surface of the vibration member.

According to one or more embodiments of the present disclosure, the sound apparatus for a vehicle can further comprise a protection member at the second vibration apparatus.

According to one or more embodiments of the present disclosure, the protection member can be configured to contact the second vibration apparatus and the second surface of the vibration member, or can be configured to cover the second vibration apparatus and the second surface of the vibration member.

According to one or more embodiments of the present disclosure, the vibration member can comprise at least one or more holes at a periphery of the vibration apparatus. The protection member can comprise at least one or more connection holes connected to the at least one or more holes of the vibration member.

According to one or more embodiments of the present disclosure, the vibration apparatus can comprise one or more vibration generators. The one or more vibration generators can comprise a vibration part including a piezoelectric material, a first electrode part at a first surface of the vibration part, and a second electrode part at a second surface different from the first surface of the vibration part.

According to one or more embodiments of the present disclosure, the vibration part can comprise a plurality of inorganic material portions having the piezoelectric material, and an organic material portion between the plurality of inorganic material portions.

According to one or more embodiments of the present disclosure, the one or more vibration generators can further comprise a first cover member at the first electrode part, and a second cover member at the second electrode part.

According to one or more embodiments of the present disclosure, the one or more vibration generators can further comprise a signal supply member electrically connected to the first electrode part and the second electrode part. A portion of the signal supply member can be accommodated between the first cover member and the second cover member.

According to one or more embodiments of the present disclosure, the vibration apparatus can comprise a first vibration generator and a second vibration generator stacked on each other. Each of the first vibration generator and the second vibration generator can comprise a vibration part, a first electrode part at a first surface of the vibration part, and a second electrode part at a second surface different from the first surface of the vibration part.

A vehicular apparatus according to one or more embodiments of the present disclosure can comprise a vehicle structure, a supporting part at the vehicle structure, and a sound apparatus coupled to the supporting part and configured to vibrate a portion of the vehicle structure to generate a sound. The sound apparatus and the supporting part can be concealed by the vehicle structure.

According to one or more embodiments of the present disclosure, the vehicular apparatus can further comprise a fixing part configured at the sound apparatus and coupled to the supporting part. The fixing part can be concealed by the vehicle structure.

According to one or more embodiments of the present disclosure, the vehicular apparatus can further comprise a connection member between the vehicle structure and the sound apparatus. The connection member can be concealed by the vehicle structure.

According to one or more embodiments of the present disclosure, the connection member can comprise a rubber material, or can comprise ethylene propylene diene monomer, ethylene propylene rubber, or urethane rubber.

According to one or more embodiments of the present disclosure, the sound apparatus can comprise an enclosure including an internal space, and a sound generating module at the internal space. The fixing part can be configured at the enclosure.

According to one or more embodiments of the present disclosure, the sound generating module can comprise a vibration member configured at the internal space and connected to the enclosure, and a vibration apparatus configured at the vibration member.

According to one or more embodiments of the present disclosure, the vibration member can comprise a metal material, or can comprise a single nonmetal material or a composite nonmetal material of one or more of wood, rubber, plastic, carbon, glass, fiber, cloth, paper, mirror, and leather.

According to one or more embodiments of the present disclosure, the enclosure can comprise a first enclosure connected to a first surface of the vibration member and connected to the vehicle structure, and a second enclosure connected to a second surface of the vibration member being different from the first surface of the vibration member. The fixing part can be configured at a side surface of the first enclosure or a side surface of the second enclosure.

According to one or more embodiments of the present disclosure, a size of the first enclosure can be greater than a size of the vibration member.

According to one or more embodiments of the present disclosure, the internal space can comprise a first space between the first surface of the vibration member and the first enclosure, and a second space between the second surface of the vibration member and the second enclosure.

According to one or more embodiments of the present disclosure, the vibration member can comprise at least one or more holes at a periphery of the vibration apparatus. The first space and the second space can be connected to each other through the at least one or more holes.

According to one or more embodiments of the present disclosure, the supporting part can comprise a first supporting member configured at the vehicle structure adjacent to a first side of the sound apparatus, and a second supporting member configured at the vehicle structure adjacent to a second side opposite to the first side of the sound apparatus. The fixing part can comprise a first fixing member configured in a bar shape at a first side of the first enclosure or the second enclosure and fixed to the first supporting member by a first fastening member; and a second fixing member configured in a bar shape at a second side opposite to the first side of the first enclosure or the second enclosure and fixed to the second supporting member by a second fastening member.

According to one or more embodiments of the present disclosure, the enclosure can comprise a first enclosure connected to the vibration member with the internal space therebetween. The fixing part can be configured at the first enclosure.

According to one or more embodiments of the present disclosure, a size of the first enclosure can be greater than a size of the vibration member.

According to one or more embodiments of the present disclosure, the vibration member can comprise at least one or more holes at a periphery of the vibration apparatus.

According to one or more embodiments of the present disclosure, the supporting part can comprise one or more first supporting members coupled to the vehicle structure overlapping a first periphery portion of the first enclosure and coupled to the fixing part, and one or more second supporting members coupled to the vehicle structure overlapping a second periphery portion opposite to the first periphery portion of the first enclosure and coupled to the fixing part.

According to one or more embodiments of the present disclosure, the fixing part can comprise a first fixing part configured to extend from a first side of the first enclosure and fixed to the first supporting member by one or more first fastening members, and a second fixing part configured to extend from a second side opposite to the first side of the first enclosure and fixed to the second supporting member by one or more second fastening members.

According to one or more embodiments of the present disclosure, the one or more first fastening members can be fastened to a screw hole (or a fastening hole) at the one or more first supporting members through one or more holes formed at the first fixing part. The one or more second fastening members can be fastened to a screw hole (or a fastening hole) at the one or more second supporting members through one or more holes formed at the second fixing part.

According to one or more embodiments of the present disclosure, the supporting part can comprise a first supporting member coupled to the vehicle structure adjacent to a first side of the first enclosure and coupled to the fixing part by a hook coupling scheme, and a second supporting member coupled to the vehicle structure adjacent to a second side opposite to the first side of the first enclosure and coupled to the fixing part by a hook coupling scheme.

According to one or more embodiments of the present disclosure, each of the first supporting member and the second supporting member can comprise a base plate coupled to the vehicle structure, and a hook member vertically connected to one periphery portion of the base plate. The hook member can comprise a coupling boss formed at the hook member.

According to one or more embodiments of the present disclosure, a distance between the vehicle structure and the coupling boss can be smaller than a distance between the vehicle structure and an upper surface of the first enclosure.

According to one or more embodiments of the present disclosure, the fixing part can comprise a first fixing part configured to extend from a first side of the first enclosure and coupled to the first supporting member by a hook coupling scheme, and a second fixing part configured to extend from a second side of the first enclosure and coupled to the second supporting member by a hook coupling scheme.

According to one or more embodiments of the present disclosure, the vibration apparatus can comprise a first vibration apparatus configured at a first surface of the vibration member, and a second vibration apparatus configured at a second surface different from the first surface of the vibration member.

According to one or more embodiments of the present disclosure, the vehicular apparatus can further comprise a protection member at the second vibration apparatus.

According to one or more embodiments of the present disclosure, the protection member can be configured to contact the second vibration apparatus and the second surface of the vibration member, or configured to cover the second vibration apparatus and the second surface of the vibration member.

According to one or more embodiments of the present disclosure, the vibration member can comprise at least one or more holes at a periphery of the vibration apparatus. The protection member can comprise at least one or more connection holes connected to the at least one or more holes of the vibration member.

According to one or more embodiments of the present disclosure, the vehicle structure can comprise a main structure, an exterior material covering an outer portion of the main structure, and an interior material configured to cover one or more of the main structure and the exterior material at an interior space. The sound apparatus can be configured to vibrate a portion of any one of the main structure, the exterior material, and the interior material, to generate a sound.

According to one or more embodiments of the present disclosure, the interior material can comprise one or more materials of metal, wood, rubber, plastic, carbon, glass, fiber, cloth, paper, a mirror, and leather.

According to one or more embodiments of the present disclosure, the interior material can comprise at least one or more of a dashboard, a pillar interior material, a roof interior material, a door interior material, a seat interior material, a handle interior material, a floor interior material, a rear package interior material, an overhead console, a rear view mirror, a glove box, and a sun visor. The sound apparatus can be configured to vibrate at least one or more of the dashboard, the pillar interior material, the roof interior material, the door interior material, the seat interior material, the handle interior material, the floor interior material, the rear package interior material, the overhead console, the rear view mirror, the glove box, and the sun visor, to generate a sound.

A vehicular apparatus according to one or more embodiments of the present disclosure can comprise a vehicle structure, a supporting part at the vehicle structure, and a sound apparatus for vehicle as described above, configured to vibrate a portion of the vehicle structure to generate a sound. The sound apparatus for a vehicle and the supporting part can be concealed by the vehicle structure.

According to one or more embodiments of the present disclosure, the vehicular apparatus may further comprise a connection member between the vehicle structure and the sound apparatus for vehicle. The connection member can be concealed by the vehicle structure.

According to one or more embodiments of the present disclosure, the vehicle structure can comprise a main structure, an exterior material covering an outer portion of the main structure, and an interior material configured to cover one or more of the main structure and the exterior material at an interior space. The sound apparatus for the vehicle can be configured to vibrate a portion of any one of the main structure, the exterior material, and the interior material, to generate a sound.

A sound apparatus according to an embodiment of the present disclosure can be applied to or included in a sound disposed at an apparatus or a display apparatus. The apparatus or the display apparatus according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Further, the vibration apparatus according to one or more embodiments of the present disclosure can be applied to or included in an organic light-emitting lighting apparatus or an inorganic light-emitting lighting apparatus. When the vibration apparatus is applied to or included in the lighting apparatuses, the lighting apparatuses can act as lighting and a speaker. In addition, when the vibration apparatus according to one or more embodiments of the present disclosure is applied to or included in the mobile apparatuses, or the like, the sound apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure that come within the scope of the claims and their equivalents.

What is claimed is:

1. A sound apparatus for a vehicle, the sound apparatus comprising:

an enclosure having an internal space and a sound generating module at the internal space; and a fixing part disposed at the enclosure, wherein the fixing part is fixed to a supporting part in a vehicle structure, wherein the sound generating module comprises:

a vibration member disposed in the internal space and connected to the enclosure; and a vibration apparatus configured at the vibration member, and wherein the vibration apparatus comprises:

a first vibration apparatus configured at a first surface of the vibration member; and a second vibration apparatus configured at a second surface of the vibration member being different from the first surface of the vibration member.

2. The sound apparatus of claim 1, wherein the enclosure vibrates based on a driving of the sound generating module, and wherein the vehicle structure vibrates based on a vibration of the enclosure to output a sound.

3. The sound apparatus of claim 1, wherein the enclosure comprises:

a first enclosure connected to a first surface of the vibration member and connected to the vehicle structure; and a second enclosure connected to a second surface of the vibration member being different from the first surface of the vibration member, and wherein the fixing part is configured at a side surface of the first enclosure or a side surface of the second enclosure.

4. The sound apparatus of claim 3, wherein the internal space comprises:

a first space disposed between the first surface of the vibration member and the first enclosure; and a second space disposed between the second surface of the vibration member and the second enclosure.

5. The sound apparatus of claim 4, wherein the vibration member comprises at least one or more holes at a periphery of the vibration apparatus, and wherein the first space and the second space are connected to each other through the at least one or more holes of the vibration member.

6. The sound apparatus of claim 3, wherein the fixing part comprises:

a first fixing member configured in a bar shape at a first side of the first enclosure or the second enclosure, and fixed to a first supporting member of the supporting part by a first fastening member; and a second fixing member configured in a bar shape at a second side opposite to the first side of the first enclosure or the second enclosure, and fixed to a second supporting member of the supporting part by a second fastening member.

7. The sound apparatus of claim 1, wherein the enclosure comprises a first enclosure connected to the vibration member with the internal space therebetween, and wherein the fixing part is configured at the first enclosure of the enclosure.

8. The sound apparatus of claim 7, wherein the vibration member comprises one or more holes at a periphery of the vibration apparatus.

9. The sound apparatus of claim 7, wherein the fixing part comprises:

a first fixing part configured to extend from a first side of the first enclosure and fixed to a first supporting member of the supporting part by a first fastening member; and a second fixing part configured to extend from a second side of the first enclosure and fixed to a second supporting member of the supporting part by a second fastening member.

10. The sound apparatus of claim 9, wherein the first fastening member is fastened to a fastening hole at the first supporting member through a hole formed at the first fixing part, and wherein the second fastening member is fastened to a fastening hole at the second supporting member through a hole formed at the second fixing part.

11. The sound apparatus of claim 7, wherein the fixing part comprises:

a first fixing part configured to extend from a first side of the first enclosure and fixed to a first supporting member of the supporting part by a hook coupling scheme; and a second fixing part configured to extend from a second side opposite to the first side of the first enclosure and fixed to a second supporting member of the supporting part by a hook coupling scheme.

12. The sound apparatus of claim 1, further comprising a protection member at the second vibration apparatus.

13. The sound apparatus of claim 12, wherein the vibration member comprises at least one or more holes at a periphery of the vibration apparatus, and wherein the protection member comprises at least one or more connection holes connected to the at least one or more holes of the vibration member.

14. The sound apparatus of claim 1, wherein the vibration apparatus comprises one or more vibration generators, and wherein the one or more vibration generators comprise:

a vibration part including a piezoelectric material;

a first electrode part at a first surface of the vibration part; and a second electrode part at a second surface different from the first surface of the vibration part.

15. The sound apparatus of claim 14, wherein the one or more vibration generators further comprise:

a first cover member at the first electrode part;

a second cover member at the second electrode part; and a signal supply member electrically connected to the first electrode part and the second electrode part, and wherein a portion of the signal supply member is accommodated between the first cover member and the second cover member.

16. A vehicular apparatus, comprising:

a vehicle structure;

a supporting part disposed at the vehicle structure;

a sound apparatus coupled to the supporting part and configured to vibrate a portion of the vehicle structure to generate a sound; and a fixing part disposed at the sound apparatus and coupled to the supporting part, wherein the sound apparatus comprises:

an enclosure including an internal space and the fixing part; and a sound generating module at the internal space, wherein the sound generating module comprises:

a vibration member configured in the internal space and connected to the enclosure; and a vibration apparatus configured at the vibration member, wherein the vibration apparatus comprises:

a first vibration apparatus configured at a first surface of the vibration member; and a second vibration apparatus configured at a second surface of the vibration member being different from the first surface of the vibration member, and wherein the sound apparatus and the supporting part are concealed by the vehicle structure.

17. The vehicular apparatus of claim 16, wherein the fixing part is concealed by the vehicle structure.

18. The vehicular apparatus of claim 16, further comprising a connection member disposed between the vehicle structure and the sound apparatus, wherein the connection member is concealed by the vehicle structure.

19. The vehicular apparatus of claim 18, wherein the connection member comprises a rubber material, or comprises ethylene propylene diene monomer, ethylene propylene rubber, or urethane rubber.

20. The vehicular apparatus of claim 16, wherein the fixing part is configured at the enclosure.

21. The vehicular apparatus of claim 16, wherein the enclosure comprises:

a first enclosure connected to a first surface of the vibration member and connected to the vehicle structure; and a second enclosure connected to a second surface of the vibration member being different from the first surface of the vibration member, and wherein the fixing part is configured at a side surface of the first enclosure or a side surface of the second enclosure.

22. The vehicular apparatus of claim 21, wherein the internal space comprises:

a first space disposed between the first surface of the vibration member and the first enclosure; and a second space disposed between the second surface of the vibration member and the second enclosure.

23. The vehicular apparatus of claim 22, wherein the vibration member comprises at least one or more holes at a periphery of the vibration apparatus, and wherein the first space and the second space are connected to each other through the at least one or more holes of the vibration member.

24. The vehicular apparatus of claim 21, wherein the supporting part comprises:

a first supporting member configured at the vehicle structure adjacent to a first side of the sound apparatus; and a second supporting member configured at the vehicle structure adjacent to a second side opposite to the first side of the sound apparatus, and wherein the fixing part comprises:

a first fixing member configured in a bar shape at a first side of the first enclosure or the second enclosure and fixed to the first supporting member by a first fastening member; and a second fixing member configured in a bar shape at a second side opposite to the first side of the first enclosure or the second enclosure and fixed to the second supporting member by a second fastening member.

25. The vehicular apparatus of claim 16, wherein the enclosure comprises a first enclosure connected to the vibration member with the internal space therebetween, and wherein the fixing part is configured at the first enclosure.

26. The vehicular apparatus of claim 25, wherein the vibration member comprises at least one or more holes at a periphery of the vibration apparatus.

27. The vehicular apparatus of claim 25, wherein the supporting part comprises:

one or more first supporting members coupled to the vehicle structure overlapping a first periphery portion of the first enclosure and coupled to the fixing part; and one or more second supporting members coupled to the vehicle structure overlapping a second periphery portion opposite to the first periphery portion of the first enclosure and coupled to the fixing part.

28. The vehicular apparatus of claim 27, wherein the fixing part comprises:

a first fixing part configured to extend from a first side of the first enclosure and fixed to the one or more first supporting members by one or more first fastening members; and a second fixing part configured to extend from a second side opposite to the first side of the first enclosure and fixed to the one or more second supporting members by one or more second fastening members.

29. The vehicular apparatus of claim 28, wherein the one or more first fastening members are fastened to a fastening hole at the one or more first supporting members through one or more holes formed at the first fixing part, and wherein the one or more second fastening members are fastened to a fastening hole at the one or more second supporting members through one or more holes formed at the second fixing part.

* * * * *